United States Patent [19]

Hirata et al.

[11] 4,365,875
[45] Dec. 28, 1982

[54] MOTION PICTURE CAMERA

[75] Inventors: Noritsugu Hirata, Yokohama; Hiroyuki Takimoto, Urawa, both of Japan

[73] Assignee: Canon Kabushiki Kaisha, Tokyo, Japan

[21] Appl. No.: 929,240

[22] Filed: Jul. 31, 1978

[30] Foreign Application Priority Data

Aug. 12, 1977 [JP] Japan .................................. 52-97294
Aug. 23, 1977 [JP] Japan .................................. 52-101259
Aug. 23, 1977 [JP] Japan .................................. 52-101262

[51] Int. Cl.³ ........................ G03B 9/10; G03B 21/36; G03B 31/02
[52] U.S. Cl. .................................... 352/25; 352/91 S; 352/217
[58] Field of Search ................. 352/91 R, 91 C, 91 S, 352/217, 216, 25, 27; 310/83, 89, 273

[56] References Cited

U.S. PATENT DOCUMENTS

| 3,635,549 | 1/1972 | Stieringer | 352/91 S |
| 3,950,083 | 4/1976 | Yoshimura et al. | 352/91 C |
| 3,972,604 | 8/1976 | Yoshimura et al. | 352/91 C |
| 4,006,975 | 2/1977 | Wagensonner et al. | 352/91 S |
| 4,006,975 | 2/1977 | Wagensonner et al. | 352/91 C |
| 4,106,864 | 8/1978 | Burgermann | 352/91 S |
| 4,106,865 | 8/1978 | Burgermann | 352/91 S |
| 4,124,283 | 11/1978 | Shigeru et al. | 352/91 C |

Primary Examiner—L. T. Hix
Assistant Examiner—William B. Perkey
Attorney, Agent, or Firm—Fitzpatrick, Cella, Harper & Scinto

[57] ABSTRACT

A motion picture camera is equipped with a shutter opening angle adjusting device capable of changing the opening angle of a shutter including a plurality of concentrically disposed shutter blades form 0° to a predetermined opening angle by changing on relative position of the shutter blades. The opening angle adjusting device includes a mechanism for varying the relative position of the shutter blades, a cam mechanism for actuating said varying mechanism, and a motor for exclusively actuating the cam mechanism. The adjusting device is further provided with a control device for detecting the speed of the motor and controlling the rotational speed of the motor to a substantially constant speed, whereby the camera can perform fading photography which is assured of fading time and overlap photography having a fading effect.

29 Claims, 60 Drawing Figures

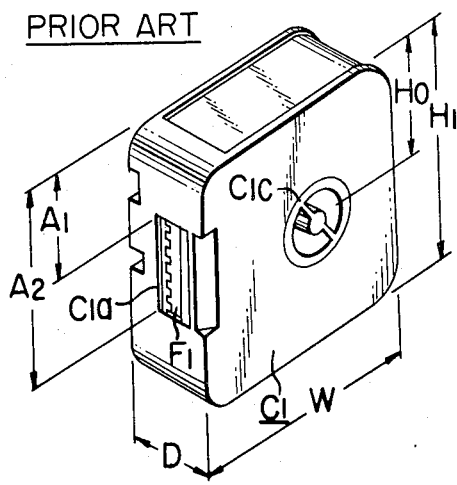
FIG. IA
PRIOR ART
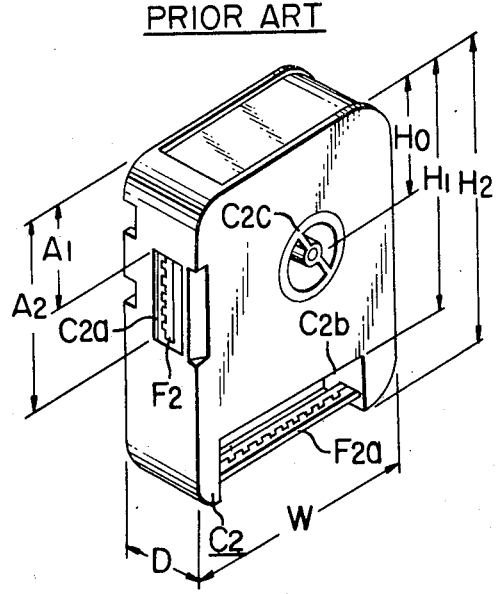
FIG. IB
PRIOR ART
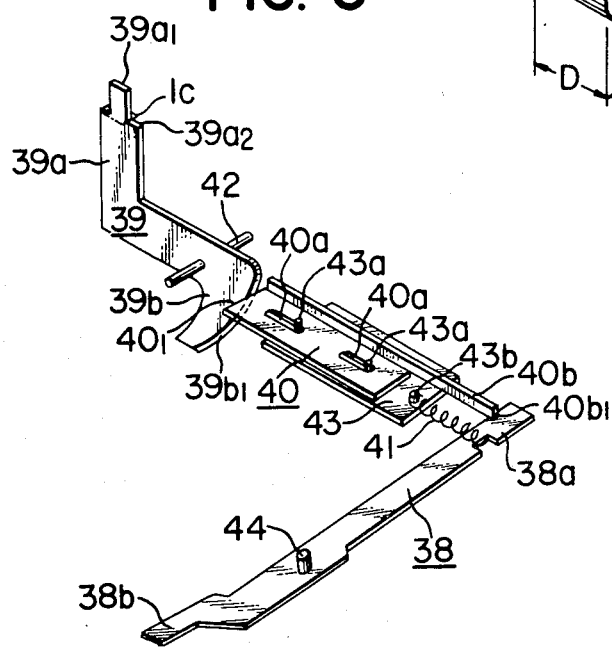
FIG. 5

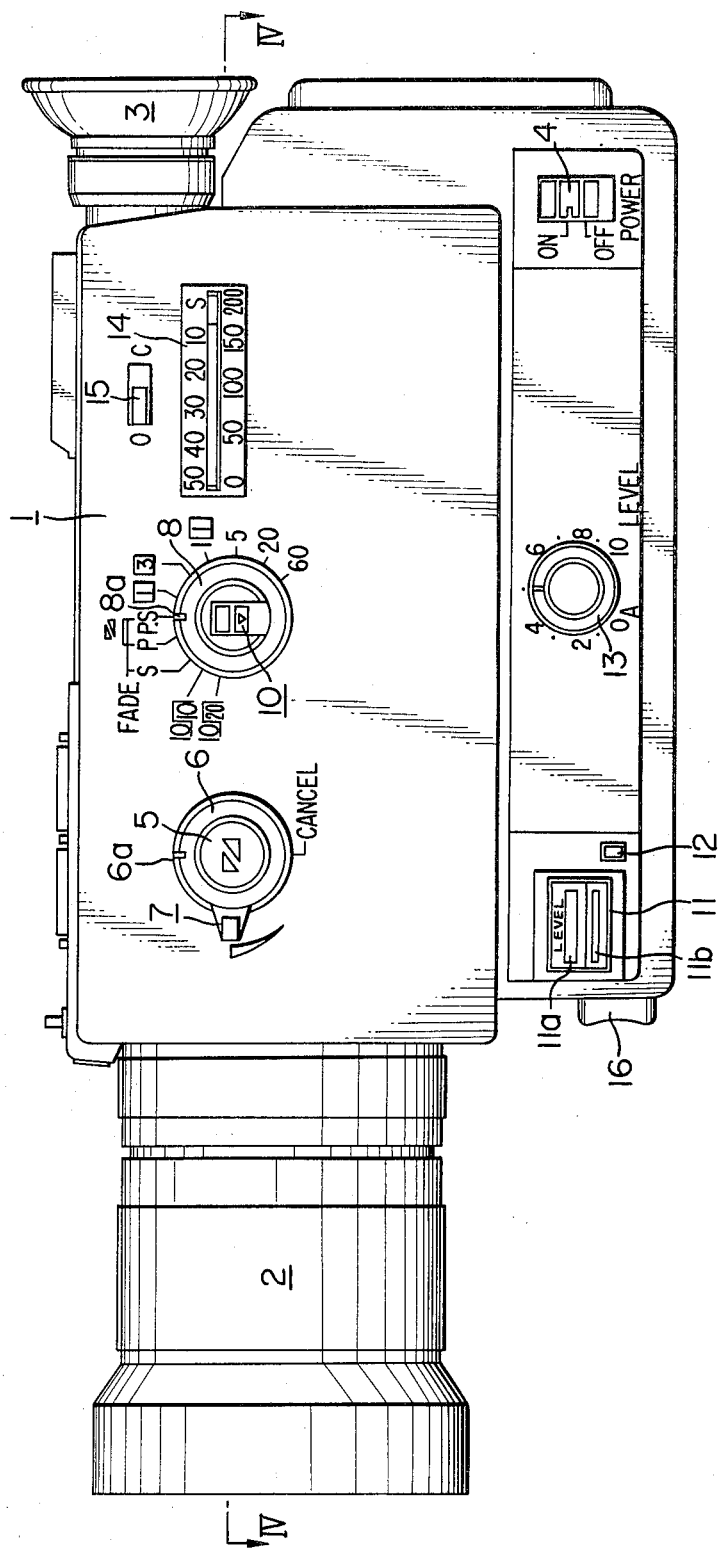

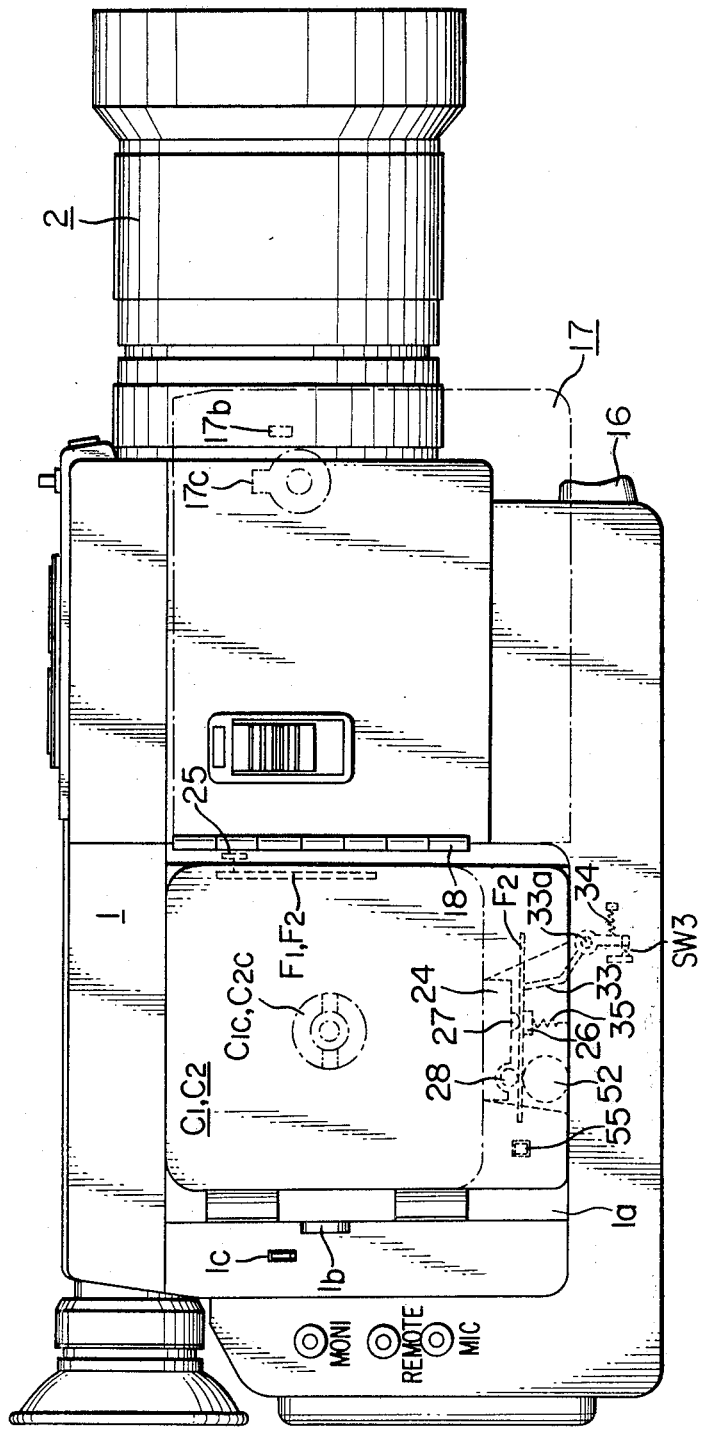

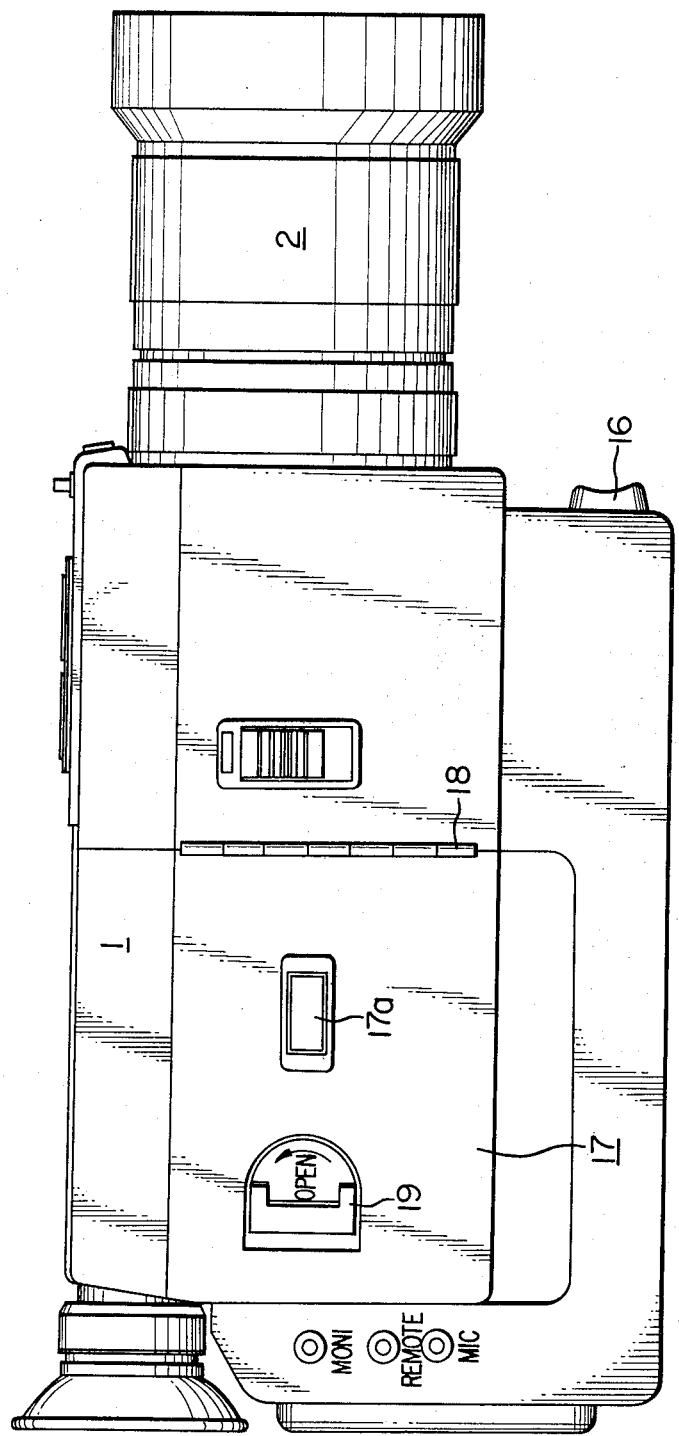

| FIG. 3A | FIG. 3B |

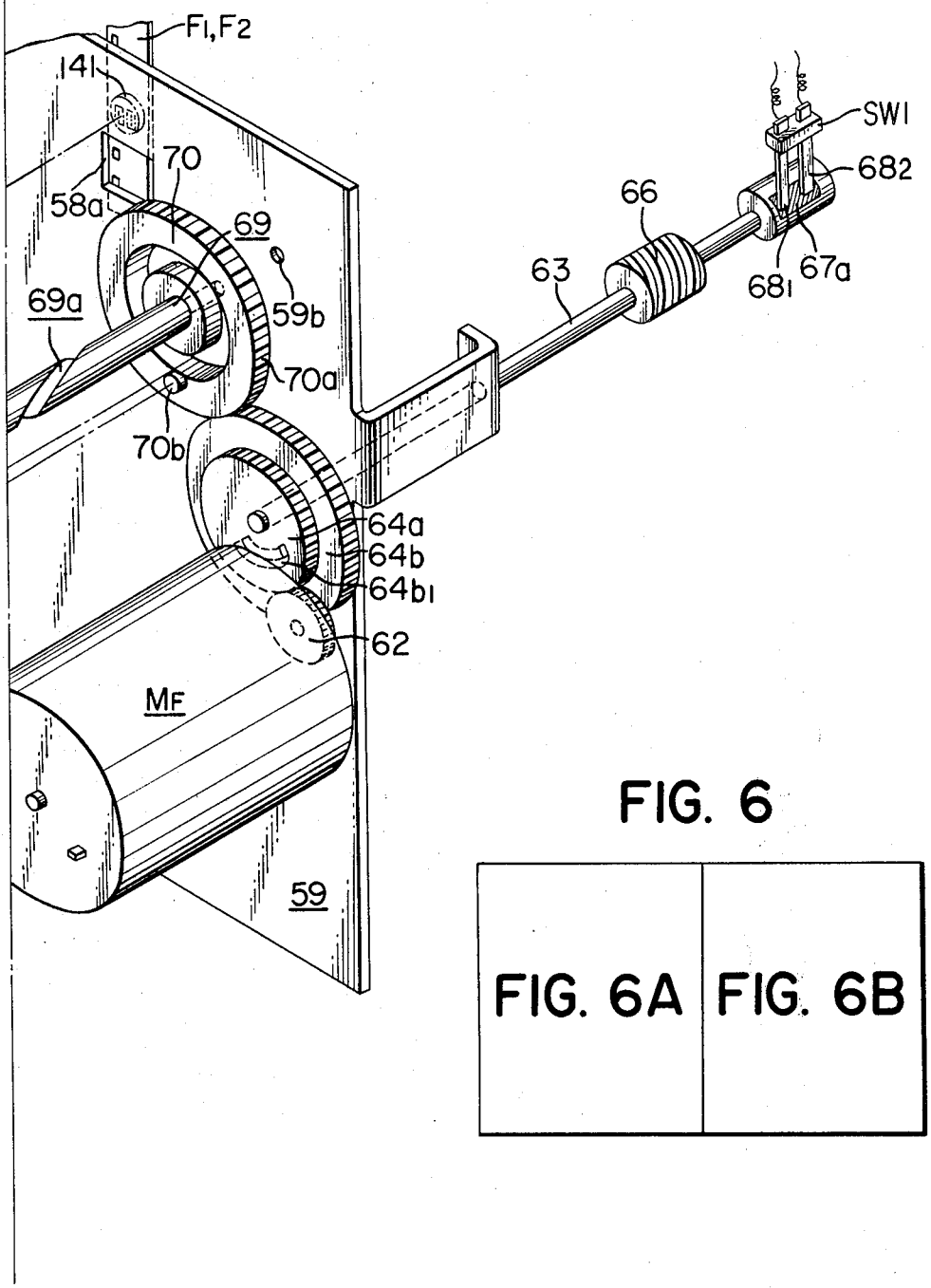

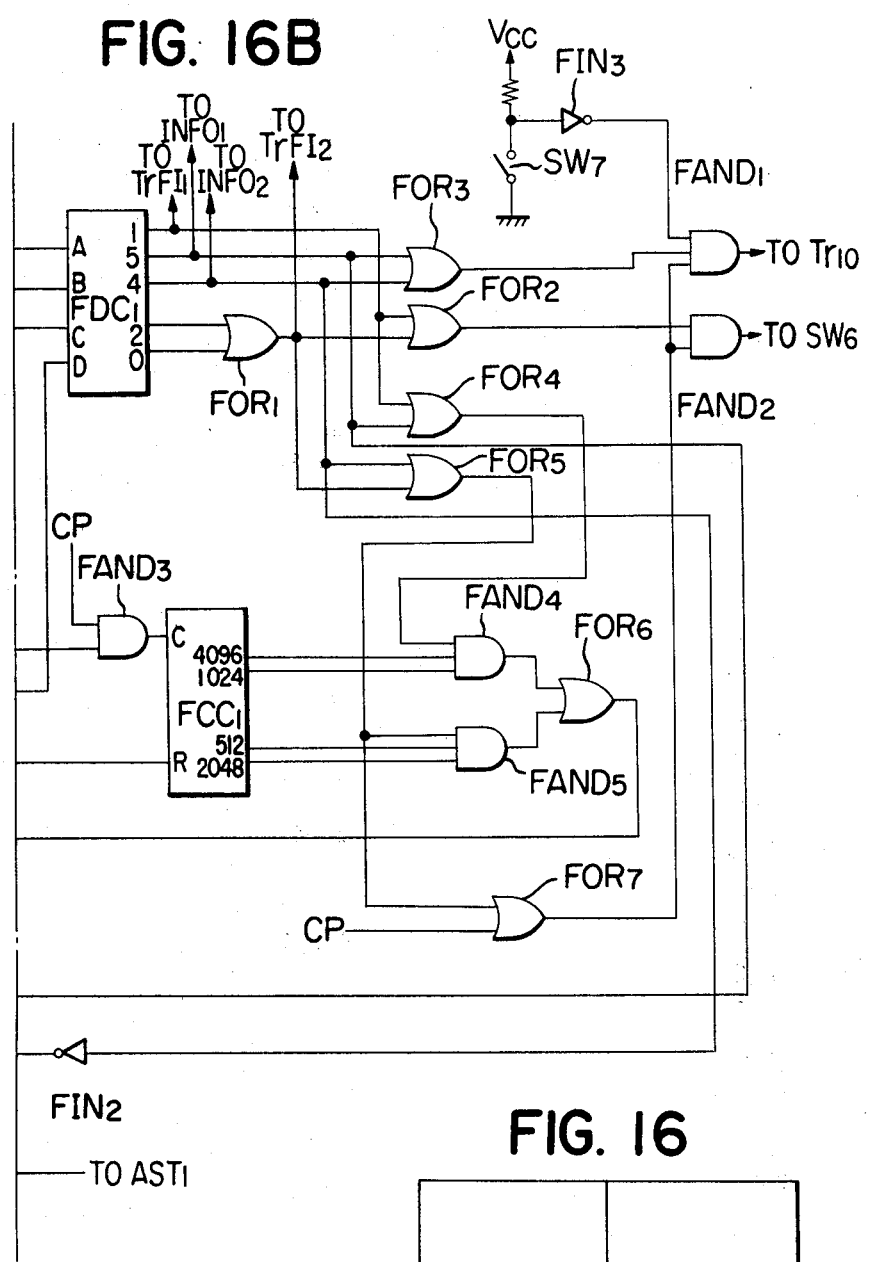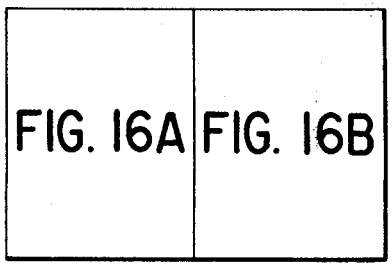

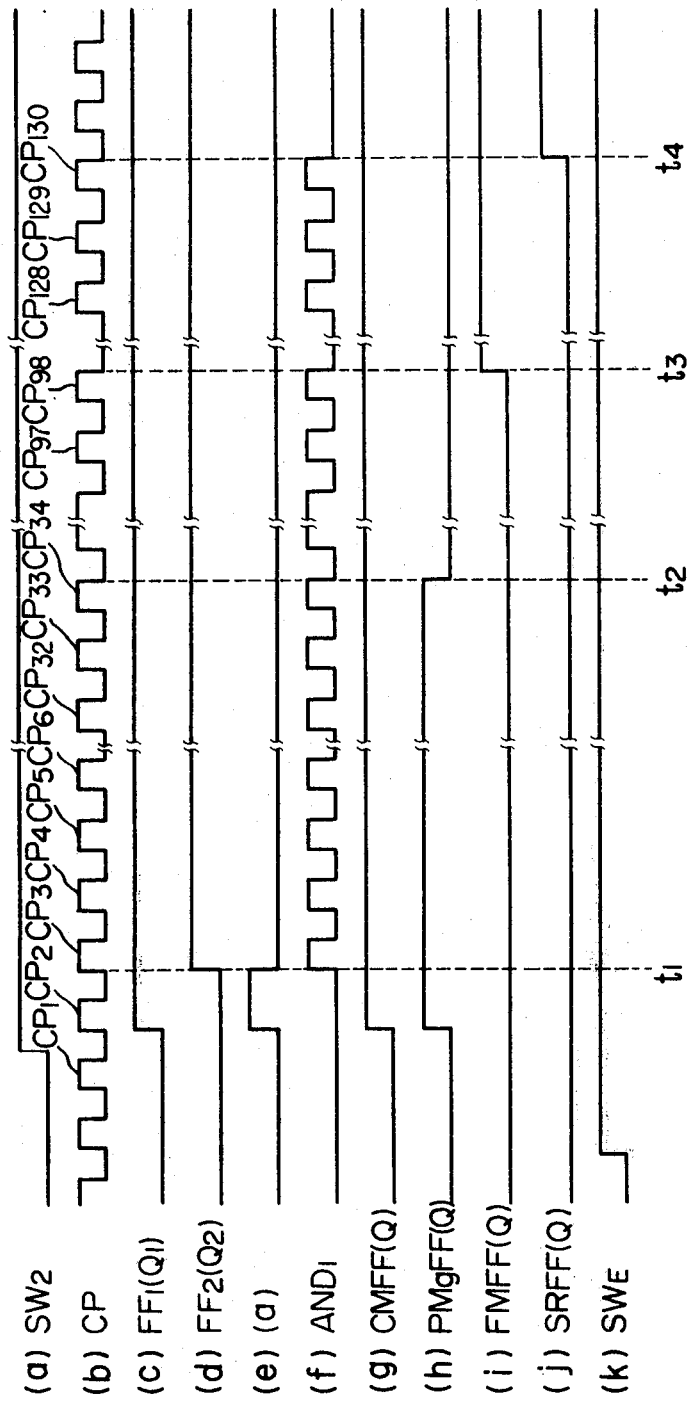

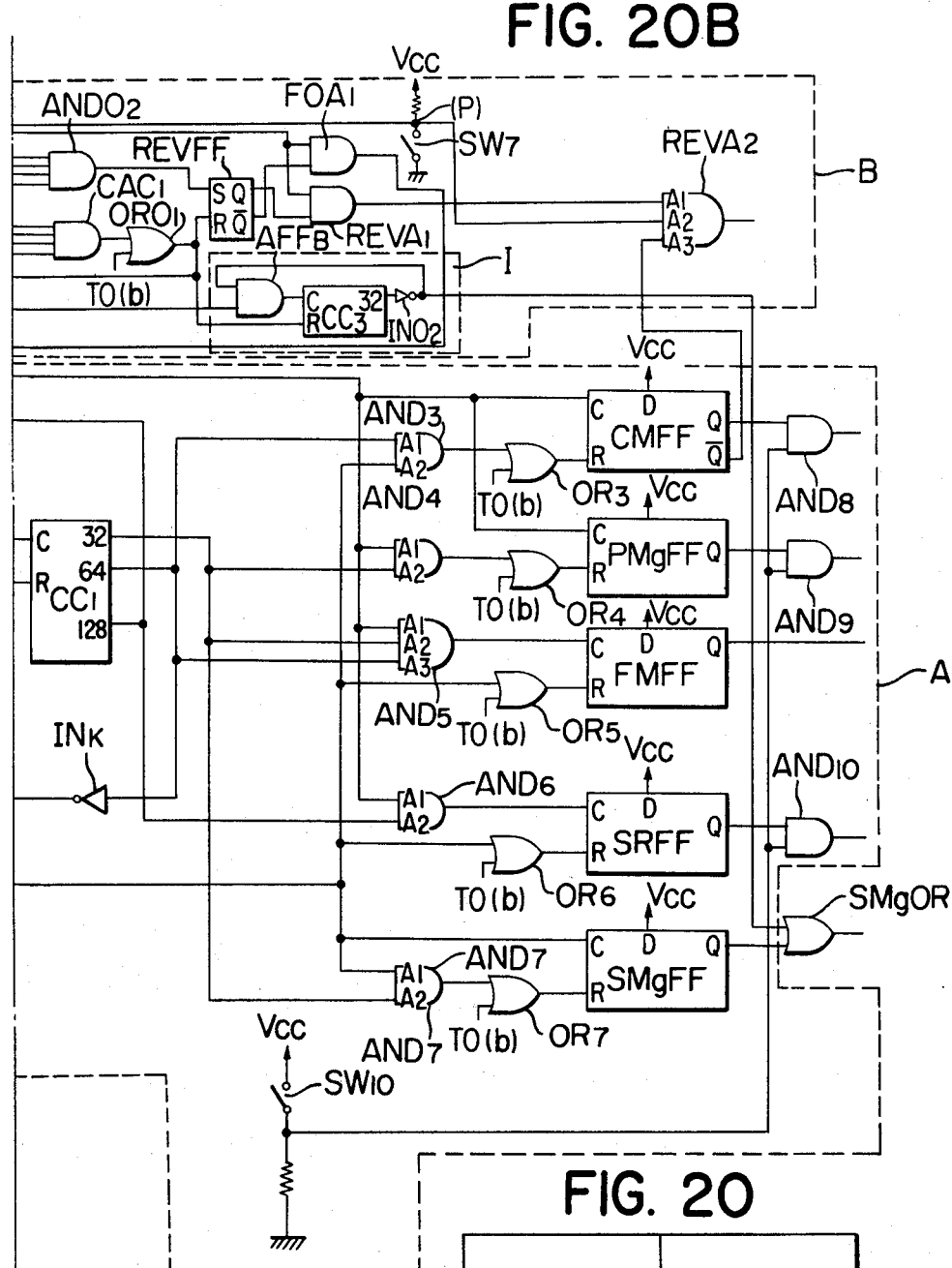

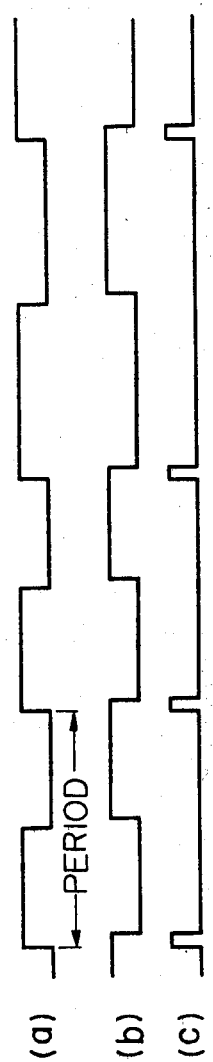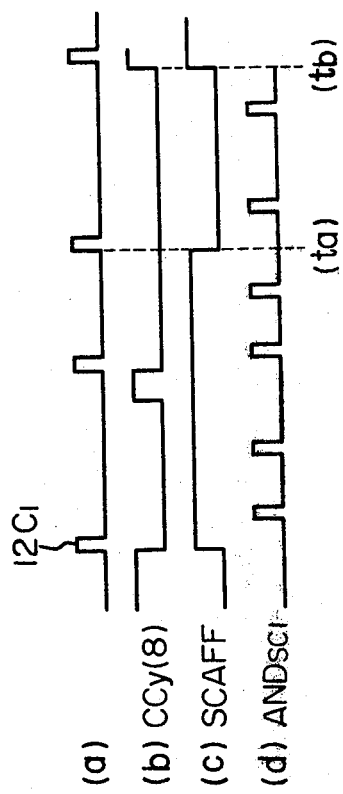

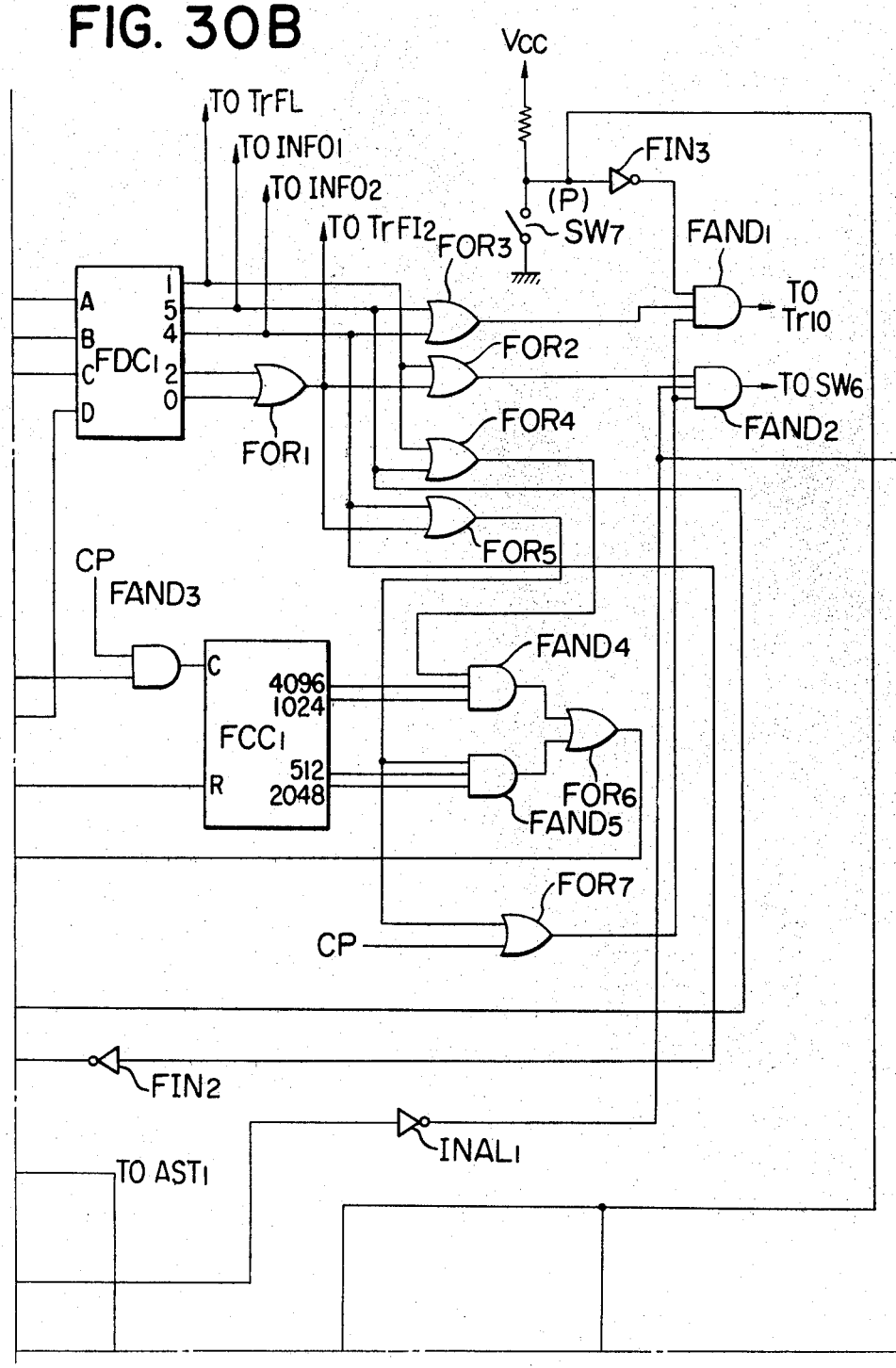

| FIG. 30A | FIG. 30B | FIG. 30E | FIG. 30F |
|---|---|---|---|
| FIG. 30C | FIG. 30D | | |

MOTION PICTURE CAMERA

BACKGROUND OF THE INVENTION

1. Field of the Invention

This invention relates to a motion picture camera.

2. Description of the Prior Art

There have heretofore been numerous motion picture cameras in which a plurality of concentrically disposed shutter blades forms a rotatable shutter and the angle of opening of said shutter is varied from 0° (fully closed) to a predetermined angle of opening (fully open) by varying the relative positions of the plurality of shutter blades to thereby enable fade-out, fade-in and overlap photography. In the conventional cameras of this type, however, it has been necessary to operate a separate photography operating member in effecting fade-out, fade-in and overlaps photography, and thus the operability has been very unfavorable. For example, where fade-out and fade-in photography are to be effected, a button for starting fade-out photography must first be operated prior to fade-out photography being effected and then, after the fade-out photography has been completed, a button for effecting fade-in photography must be operated. Also, where overlap photography is to be effected, a button for overlap photography must first be operated and when a predetermined amount of film for overlap photography has been photographed, that predetermined amount of film must be rewound and then, the film must be advanced again, and so the operation is complicated. In the conventional cameras, the varying mechanism for varying the relative positions of the plurality of shutter blades is operated by the drive from a motor for a film feeding mechanism for feeding the film and therefore, the variable velocity of the varying mechanism depends on the number of revolutions of the motor for the film feeding mechanism and the operating velocity independent for fade-out and fade-in cannot be accomplished and in addition, for example, where only fade-in photography is desired, the varying mechanism must be manually operated each time. Maintaining constant the control velocity of the varying mechanism for effecting fade-out and fade-in photography is very important to provide with a natural fading effect, whereas in conventional motion picture cameras of this type are operated by the drive from the motor for the film feeding mechanism and cannot therefore regulate the control velocity of the varying mechanism.

SUMMARY OF THE INVENTION

It is a first object of the present invention to provide a novel motion picture camera which overcomes the above-noted problems peculiar to the prior art.

It is a second object of the present invention to provide a motion picture camera in which the regulation of the angle of opening of the shutter can be effected always at the same speed.

It is a third object of the present invention to provide a motion picture camera which can effect fade-in and fade-out photography by a very simple operation.

It is a fourth object of the present invention to provide a motion picture camera which can effect overlap photography having the effect of fade-out and fade-in photography by a very simple operation.

It is a fifth object of the present invention to provide a motion picture camera which can selectively use a silent film cassette having silent film therein and a sound film cassette having sound film therein and which can automatically effect the fading photography of images and fading recording sound when said sound film cassette is loaded and which can automatically nullifying sound fading recording when the silent film cassette is loaded.

It is a sixth object of the present invention to provide a motion picture camera which can effect both image overlap photography and sound overlap recording when said sound film cassette is loaded.

It is a seventh object of the present invention to provide a motion picture camera which is provided with a control circuit for electrically controlling so as to enable the fading photography or/and overlap photography to be automatically effected for a predetermined amount of film when fading photography or/and overlap photography are to be effected.

Other object of the present invention will become apparent from the following detailed description taken in conjunction with the accompanying drawings.

BRIEF DESCRIPTION OF THE DRAWINGS

FIG. 1 shows an example of the commercially available film cassette preferred for use with the cine camera according to the present invention, FIG. 1(A) being a perspective view of a silent film cassette containing an optically recordable silent film as seen in the direction of loading, and FIG. 1(B) being a perspective view of a sound film cassette containing a sound film capable of optically recording images and magnetically recording sounds as seen in the direction of loading.

FIG. 2(A) is a pictorial plan view of the cine camera according to the present invention.

FIG. 2(B) is a pictorial plan view of the FIG. 2(A) camera as seen from the back thereof.

FIG. 2(C) is a pictorial plan view showing the interior of the film cassette chamber with the film cassette lid of FIG. 2(B) being opened, the position of FIG. 2(C) being the position in which the sound film cassette $C_2$ shown in FIG. 2(B) is loaded.

FIG. 5 is a perspective view for illustrating the pinch roller present mechanism shown in FIG. 3.

FIG. 18 illustrates the start sequence operation in the sequence control circuit shown in FIG. 15.

FIGS. 26 and 27 illustrate the speed control operation for the shutter opening angle control motor shown in FIG. 21L.

FIGS. 30A through 30F are circuit diagrams showing further embodiments of the present invention which enable image or/and sound fade photography and overlap photography to be effected.

FIG. 31 illustrates the connection between the circuits of FIGS. 30A through 30F.

DESCRIPTION OF THE PREFERRED EMBODIMENT

Figures 3, 3A:
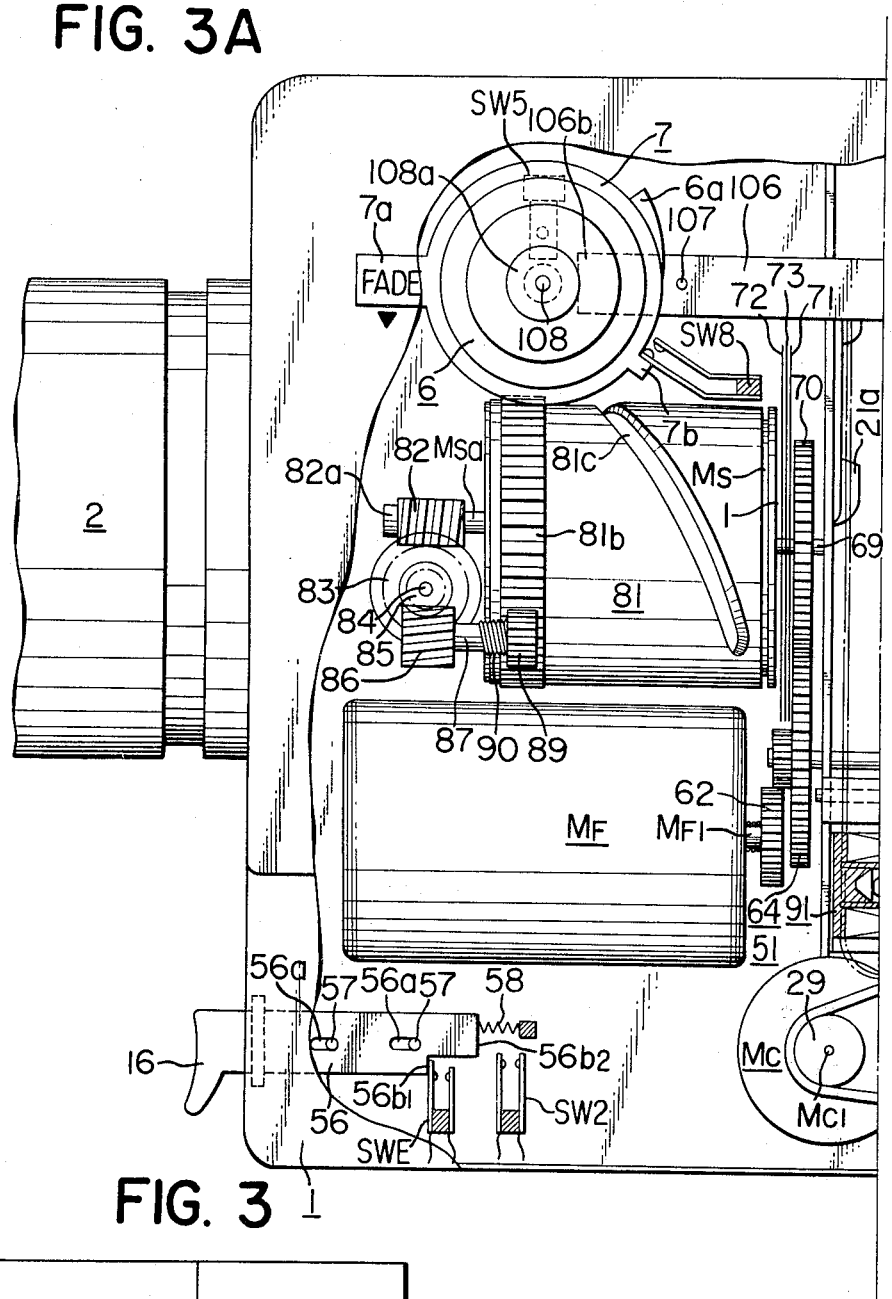
FIG. 3 is a plan view showing the construction of the mechanical components in the interior of the cine camera shown in FIG. 2.
Figure 3B:
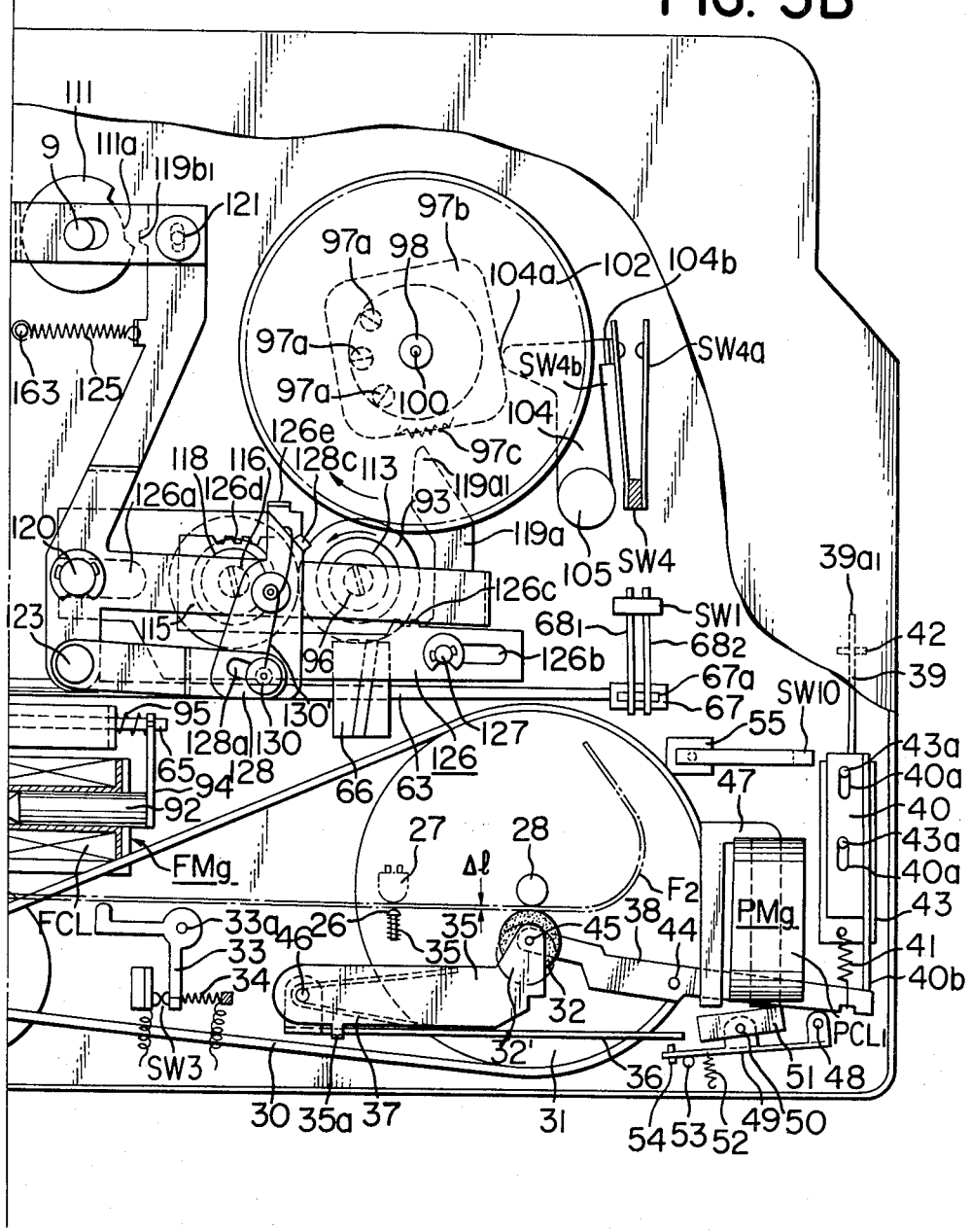

Several embodiments of the cine camera according to the present invention will hereinafter be described by reference to the drawings. FIGS. 2 to 14 show mechanically constructed main mechanisms of the cine camera of the present invention. Designated by 1 is a camera body, 1a a cassette-receiving chamber formed in the camera body 1, 2 a photographic lens structure secured to the front face of the camera body 1, and 3 an eye-cap secured to the viewfinder portion of the camera body 1. Designated by 7 is a ring-shaped fade photography operating member pivotally supported on the camera body 1. The member 7 has an operating knob 7a disposed outwardly of the camera body 1, and a projected portion 7b for closing a normally opened switch SW8 secured to the interior of the camera body 1, said projected portion 7b being disposed at a position within the body 1 and capable of controlling the switch SW8. Designated by 6 is a ring-shaped, overlap photography cancel knob held within the cylinder of the fade photography operating member 7. The knob 6 has a control cam 6a inwardly of the camera body 1 which, when the knob is turned to a position until a pointer 6a corresponds to the mark "CANCEL" formed on the outer surface of the camera body and on the outer periphery of the knob 6, depresses a pin 107 studded in a sliding lever 106 for overlap photography operation which will later be described, to thereby cause the sliding lever 106 to be sliding displaced toward the right in FIG. 3, and can cancell overlap photography while it is being carried out. Designated by 5 is an overlap photography starting button for starting overlap photography. This botton 5 is slidable in the cylinder of the knob 6. The botton 5 is secured the one end of a slidable shaft 108 slidably held by a portion 1A of the camera body. The other end of the slidable shaft 108 is slidably disposed within an opening 1A₁ in the portion 1A and normally biased outwardly of the camera body 1 by a compression spring 109 also disposed in said opening 1A₁. The slidable shaft 108 has secured thereto a disc-like flange 108a and has a stopped portion 108b for closing the normally open switch SW5 when the botton 5 is depressed to displace the slidable shaft 108 inwardly. Denoted by 8 is a mode changeover operating ring secured to one end of a shaft 9 studded on a pivotable member 110 pivotally supported on the button wall 23 of the film-receiving chamber 1a. The shaft 9 has secured thereto a disc-like flange 111 having a cut-away 111a. The ring 8 is provided with a rotary switch mechanism 112 changeable-over in response to the rotational movement of the ring 8, and one electrical contact means 112a of this switch mechanism is secured to the inner surface of the ring 8 while the other electrical contact means 112b is secured to the camera body 1, a pointer 8a is provided on the ring 8. Symbols "10⎾20", "10⎾10", "S", "P", "P.S", "⎡1⎤", "⎡3⎤", "1", "5", "20" and "60" are successively provided on the outer surface of the camera body 1 and on the outer periphery of the ring 8, as in shown in FIG. 2(A). The pointer 8a may be adjusted to the position of any of these symbols by the rotation of the ring 8. Although not shown, a lock mechanism is provided on the lower surface of the ring 8, the lock mechanism being adapted to lock the ring 8 against rotation so that the pointer 8a is not moved from that pointer only when the pointer 8a on the ring 8 is at a portion aligned with the symbol "P.S" and adapted not to lock the ring 8 to permit free rotation thereof when the pointer 8a is aligned with any other symbol. Designated by 10 is a lock mechanism release button for unlocking th lock mechanism to point the ring 8 to freely rotate. The lock mechanism may be released when the button 10 is slidden toward (downwardly) the mark provided on the button 10.

Reference number 11 denotes a display plate having a recording level display window 11a and a source voltage display window 11b, 12 a source voltage checker button, and 13 a recording level regulation operating dial. Designated by 14 is a footage counter display portion, and 15 an unshown eyepiece shutter operating member. Denoted by 16 is a trigger button, and 17 a cover for selectively covering the cassette inlet opening of the cassette-receiving chamber 1a. The cover 17 is secured to the camera body by means of a hinge 18. The cover 17 is provided with a display 17a for confirming from the outside of the camera whether a film cassette is loaded in the cassette receiving chamber or which type of film cassette C1 or C2 is loaded in the cassette-receiving chamber, and has a projection 17b formed in the inner surface thereof. Designated by 19 is a knob of lock operating means for locking the cover 17. The knob 19 is secured to a shaft 20 pivotally supported on the cover 17, and the inner side of the cover 17 is provided with a key portion 17c for engaging or disengaging a key 1b formed in a part of the camera body 1 and adapted to be rotated with the shaft 20 when the latter is rotated by operating the knob 19.

In the front wall 21 of the cassette receiving chamber 1a, there is a film gate plate 21a having an aperture $21a_1$ formed within the receiving chamber 1a. When the film cassette C1 or C2 shown in FIG. 1 is loaded into the cassette receiving chamber 1a, the film gate plate 21a (see FIG. 4) is covered by the exposure opening C1a of the cassette C1 or the exposure opening C2a of the cassette C2. Film F1 or F2 in the exposure opening C1a or C2a of the cassette C1 or C2 is disposed between the side walls $21a_2$ and $21a_3$ of the film gate plate 21a. Denoted by 22 is a film presence detecting piece extending through the bottom wall 23 of the cassette receiving chamber 1a and stretched within the receiving chamber 1a, one end 22a thereof is projectable from one side wall $21a_3$ of the gate plate 21a toward the other side wall $21a_2$, and the other end 22b being capable of bearing against a conductive piece 24 disposed on the back side of the bottom wall 23. The film presence detecting piece 22 is normally biased inwardly of the cassette receiving chamber 1a by unshown spring and at least that portion of said other end 22b which bears against the conductive piece 24 is formed with a conductive material, and this other end 22b and the conductive piece 24 together form a switch SW9. When the film cassette C1 or C2 is loaded into the cassette-receiving chamber 1a and the film F1 or F2 is urged against the surface 21a of the film gate plate, one end 22a of the detecting piece 22 is forced toward the bottom wall 23 by the force with which the film is inserted between the side walls $21a_2$ and $21a_3$ of the film gate plate and the detecting piece 22 is displaced to a position indicated by dot-and-dash line in FIG. 4, so that the other end 22b is brought out of engagement with the conductive piece 24 to open the switch SW9. Conversely, when the film cassette C1 or C2 is not present in the cassette receiving chamber 1a, or if present, when the film F1 or F2 is not loaded on the side walls $21a_2$ and $21a_3$ in a predetermined condition, or when the film F1 or F2 is damaged by some trouble and comes to be absent between the side walls $21a_2$ and $21a_3$, then the detecting piece 22 is disposed at a position shown by solid line in FIG. 4, so that the end 22b of the detecting piece 22 bears against the conductive piece 24 to close the switch SW9. Thus, the switch SW9 performs the formation of detecting whether film F1 or F2 is present on the film gate plate 21a or whether they are property set.

The film cassette C1 shown in FIG. 1A and the film cassette C2 shown in FIG. 1B may be alternatively loaded into the film-receiving chamber, and the position of FIG. 2C shows the film cassette C2 being loaded. When the film C1 is loaded, it is disposed at the position indicated by dot-and-dash line. Positioning of the film cassette C1 and the film cassette C2 in the film-receiving chamber 1a is accomplished by a position controlling member 24 projected from the bottom wall 23. In other words, when the film cassette C1 is loaded in the film-receiving chamber 1a, this cassette C1 is disposed above the position controlling member 24, and when the film cassette C2 is loaded, the ($H_2$-$H_1$) portion of the film cassette C2 escapes the position controlling member 24 with the film cassette C2 projected below the position controlling member 24.

The film cassette C1 has an exposure opening C1a adapted to be positioned at an image recording location (a second recording location) of the cassette-receiving chamber 1a corresponding to the gate plate 21 when the film cassette C1 is inserted in the cassette-receiving chamber 1a, and the silent film F1 contained in the film cassette C1 may be supplied from the supply reel of the film cassette C1 through the exposure opening C1a onto a take-up spool coaxial with the supply reel. Also, the film cassette C2 has an exposure opening C2a adapted to be positioned at the image recording location of the film-receiving chamber 1a corresponding to the gate plate 21a when the cassette C2 is loaded in the cassette-receiving chamber 1a, and a recording opening C2 be adapted to be positioned at the second recording location of the chamber 1a. The sound film F2 contained in the cassette C2 may be supplied from the supply spool in the cassette C2 through the exposure opening C2a and the recording opening C2b onto a take-up spool coaxial with the supply spool. The second film F2 has a strip of magnetic recording material along one side edge on one surface thereof. Designated by 25 is a pull-down claw adapted to intermittently engage in the perforation of the film F1 or F2 existing on the exposure opening C1a or C2b of the cassette C1 or C2 alternatively loaded in the cassette-receiving chamber 1a and to transport the film F1 or F2 to be downstream through the gate plate 21a formed at the second recording location of the chamber 1a. This claw member 25 is operated by a known means. Denoted by 26 is a pressure pad disposed in opposed relationship with a magnetic head 27 held by the position controlling member 24 with the film passage at the recording location of the chamber 1a being interposed therebetween. The pad 26 is for urging the film F2 against the magnetic head 27, the film F2 being at the recording opening C2b of the cassette C2 loaded in the chamber 1a, and the pad is normally biased toward the magnetic head 27 by a compression spring 35. Denoted by 28 is a capstan disposed at said recording location in said chamber 1a. The capstan 28 is supported on the camera body 1 for rotation and against axial sliding, and has a fly wheel 31 with a pulley 31a secured at the other end thereof. The capstan 28 is rotated at a substantially constant velocity by the drive of a constant speed motor Mc transmitted through an endless belt 30 stretched over and between a pulley Mc1 secured to the output shaft Mc1 or the motor Mc and the pulley 31a of the flywheel 31. Designated by 32 is a pinch roller forming film supply means for transporting the film F2 substantially at a constant velocity, the film F2 being at the recording opening C2b of the cassette C2 loaded in the chamber 1a. The pinch roller 32 is disposed in opposed relationship with the capstan with the film passageway at the recording location of the chamber 1a being interposed therebetween. Denoted by 33 is a loop detecting member for detecting the length of film between the film gate plate 21a and the magnetic head 27, the loop detecting member being adapted to contact the film F2 between the film gate plate 21a and the magnetic head 27. The loop detecting member 33 is pivotable about a shaft 33a supported on the camera body 1 and normally biased in a predetermined direction by a compression spring 34. SW3 is a normally closed switch whose opening and closing is controlled by the pivoting of the loop detecting member 33. The switch SW3 remains closed when the loop detecting member 33 is rotatively displaced clockwisely, and is forcibly opened by the loop detecting member 33 when this member 33 is rotatively displaced counterclockwisely.

In the cine camera of the present embodiment, when the cassette C2 is loaded into the cassette receiving chamber 1a, the amount of film F2 per unit time intermittently transported from the exposure opening C2a toward the recording opening C2b by the film pull-down claw approximately equals the amount of film F2 per unit time transported at a constant velocity at the recording opening C2b. However, the length of film between the film gate plate 21a and the magnetic head is always variable. In other words, the film feed means including the capstan 28 and the pinch roller 32 transports the film F2 at a constant velocity, whereas the film feed means including the pull-down claw 25 transports the film F2 intermittently. Therefore, at an initial stage wherein the pull-down claw 25 has pulled down the film by an amount corresponding to one frame, the length of film between the gate plate 21a and the magnetic head 27 is greater than a predetermined length of film. Accordingly, the loop detecting member 33 in contact with the underside of the film F2 at the recording opening C2b of the cassette C2 is rotated counterclockwise by the gravity of the film F2 and the reaction of the loop portion, thus opening the switch SW3. During the time from after the pull-down claw 25 has pulled down the film F2 by an amount corresponding to one frame until its starts the next pull-down, the film F2 between the film gate plate 21a and the magnetic head 27 is further transported to the downstream by the film feed means including the capstan 28 and the pinch roller 32. Thus, the amount of film between the gate plate 21a and the magnetic head 27 is gradually decreased and corresponding, the loop detecting member 33 is rotated clockwisely to close the switch SW3. Thus, the switch SW3 is repetitively opened and closed by the loop detecting member 33 each time the film F2 is pulled down by the pull-down claw 25.

The camera body 1 covered with the cover 17 which covers the opening of the film-receiving chamber 1a is provided with an opening 1c at a location which, when the cover 17 is closed, corresponds to a projection 17b provided on the cover 17, and a portion of a pinch roller moving device for effecting the resilient engagement and disengagement of the pinch roller 32 with the capstan 28 is projected through said opening 1c. The pinch roller moving device is formed by an electromagnet means PMg, displacement members 35, 36, spring 37, pivotable members 38, 39, sliding member 40, tension spring 41, etc. The pivotable member 39 is pivotable about a pin 42 secured to the camera body 1, as shown in FIG. 5. One arm 39a of the pivotable member 39 is provided with a projection $39a_1$ projectable through said opening 1c of the camera body 1, and the other arm 39b of the pivotable member 39 is provided with a cam $39b_1$ for controlling the sliding movement of the sliding member 40. The amount of displacement of the projection $39a_1$ in the direction in which it is projected through said opening 1c is controlled by the engagement between the portion $39a_2$ of the arm 39a and the edge portion of the opening 1c. The sliding member 40 is slidably mounted on a base plate 43 secured to the camera body 1 and the sliding movement thereof is controlled by a pin 43a studded on the base plate 43 and a slot 40a in the sliding member 40 engaged by the pin 43a. One end $40_1$ of the sliding member 40 is normally engaged with the cam 39b of the pivotable member 39, and an end $40b_1$ of a bent member 40b formed by bearing a portion of the sliding member 40 is engaged with said one arm 38a of the pivotable member 38 pivotable about a shaft 44 secured to the camera body 1. Said spring 41 extends between a pin 43b studded on said base plate 43 and the arm 38a of said pivotable member 38. The spring 41 normally biases the pivotable member 38 counter-clockwisely. Thus, when the cover 17 is opened, the spring 41 displaces the pivotable member 38 counter-clockwisely, the sliding member 40 upwardly, and the pivotable member 39 clockwisely, as shown in FIG. 5, and the projection 39a of the pivotable member 39 is greatly projected from said opening 1c. Rotately extending through the other arm 38b of the pivotable member 38 is a pinch roller holding shaft 45 rotatably supported on the displacement member 35, and the displacement member 35 and the pivotable member 38 are linkel together through the shaft 45. The pinch roller 32 is supported on said shaft 45. The displacement members 35 and 36, which contribute to displacement of the pinch roller 32, is rotatably supported on a shaft 46 secured to the camera body 1, and the spring 37 is disposed between the displacement members 35 and 36, the spring 37 normally biasing the displacement member 35 counter-clockwisely and the displacement 36 clockwisely. The displacements of the displacement members 35 and 36 in the opposite directions by the spring 37 is controlled by an engaging piece 35a of the displacement member 35 bending and engaging the underside of the displacement member 36. The electromagnet means PMg comprises an electromagnetic coil PCL1, a U-shaped core 47 partly extending through the magnetic coil PCL1, a pivotable member 49 pivotally supported on a shaft 48 secured to the camera body 1, and an iron piece 51 pivotably held by a shaft 50 supported on the pivotable member 49. The pivotable member 49 is normally biased counter-clockwisely by a tension spring 52, and the amount of counter-clockwise rotative displacement of the pivotable member 49 is controlled by the engagement thereof with a pin 53 studded in the camera body 1. Designated by 54 is an adjust screw dispersed at the free end of the pivotable member 49.

Operation of the pinch roller moving device so constructed will now be described. When the cover 17 is open, the tension of the spring 41 displaces the pivotable member 38 counter-clockwisely, the sliding member 40 upwardly and the pivotable member 39 clockwisely, as shown in FIG. 5, thus causing the projection 39a of the pivotable member 39 to be greatly projected through the opening 1c of the camera body 1, and the counter-clockwise rotation of the pivotable member 39 rotates both the displacement members 35 and 36 clockwisely so that, as indicated by dot-and-dash line 32, the pinch roller 32 is disposed at its rest position much spaced apart from the capstan 28. When the cover 17 is closed, the projection $39a_1$ of the pivotable member 39 projected through the opening 1c of the camera body 1 is pushed by the projection 17b of the cover 17 so that the pivotable member 39 is pivotally displaced counter-clockwisely. When this occurs, the sliding member 40 engaged with the cam $39b_1$ of the pivotable member 39 is slidingly displaced toward the pivotable member 38 side by the action of the cam $39b_1$. Also, by the sliding displacement of the sliding member 40, the pivotable member 38 engaged with the end $40b_1$ of the bend 40b of the sliding member 40 is pivoted clockwisely against the force of the spring 41 while, at the same time, the displacement members 35 and 36 linked together by the pivotable member 38 and the shaft 45 are pivotal counter-clockwisely to bring the pinch roller 32 to its preparatory position as shown by solid line in FIG. 3. In this state, however, the pinch roller 32 is not resiliently urged against the capstan 28. Therefore, the sound film F2 disposed between the pinch roller 32 and the capstan 28 is ready to be pulled out, if desired, from between the pinch roller 32 and the capstan 28. That is, when the front cover 17 is closed, the pinch roller 32 is brought to said preparatory position closely adjacent to the capstan 28 from said rest position much spaced apart with respect to the capstan 28. Displacement of the pinch roller from such preparatory position to the operative position in which the pinch roller is in resilient contact with the capstan is accomplished by the aforementioned electromagnet means PMg. More particularly, in the condition in which the pinch roller 32 is disposed at its preparatory position as shown in FIG. 3, when a current is supplied to the electromagnetic coil PCL1 by means to be described, the electromagnetic coil PCL1 is excited to magnetize the core 47. Upon magnetization of this core 47, the iron piece 51 is attracted by the core 47 and the pivotable member 49 with the core 47 is pivotally displaced counter-clockwisely against the bias of the spring 52. Where the pivotable member 49 is rotated clockwisely, the adjust screw 54 on the pivotable member 49 is engaged with the free end of the displacement member 36, to thereby rotate the displacement member 36 clockwisely. This clockwise rotation of the displacement member 36 is transmitted to the displacement member 37 through the spring 37 to rotate the displacement member 35 counter-clockwisely and rotate the pivotable member 38 clockwisely against the bias of the spring 41. Such rotative displacement of the displacement member 35 and the pivotable member 38 brings the pinch roller 32 to its operative position in which the pinch roller is in resilient engagement with the capstan 28. When the pinch roller 32 has been brought to the aforementioned operative position, the film F2 is firmly nipped between the pinch roller 32 and the capstan 28. The contact pressure with which the pinch roller 32 resiliently contacts the capstan 28 is provided by the charge of the spring 37, and the magnitude of this spring charge may be finely adjusted by turning the adjust screw 54 provided on the pivotable member 49 to adjust the amount of projection of the adjust screw 54 from the pivotable member 49 toward the displacement member 36 side. The return of the pinch roller 32 from its operative position to its preparatory position is accomplished by cutting off the current supply to the electromagnetic coil PCL1 of the electromagnetic means PMg. More particularly, when the current supply to the electromagnetic coil PCL1 is cut off, the electromagnetic coil PCL1 is deenergized to release the core 47 from the iron piece 51, so that the pivotable member 49 is rotatively displaced counter-clockwisely by the bias of the spring 52 until it bears against the pin 53. Along therewith, the pivotable member 38 is rotated counter-clockwisely by the bias of the spring 41 until it bears against the bend 40b of the sliding plate 40 and at the same time, the displacement members 35 and 36 are rotatively displaced clockwisely, thereby returning the pinch roller 32 from its operative position to its preparatory position. Further, return of the pinch roller 32 from its preparatory position to its rest position is accomplished by opening the cover 17. More particularly, when the cover 17 is opened, the pressure force with which the projection 17b of the cover 17 has pressed the projection $39a_1$ of the pivotable member 39 is released so that the pivotable member 39 is subjected to the bias of the spring 41 through the pivotable member 38 and the sliding member 40 and rotated until it is controlled by the $39a_2$ of the pivotable member 39 and the edge of the opening 1c of the camera body 1. By the clockwise rotation of the pivotable member 39, the sliding plate 40 is displaced toward the pivotable member 39 side by the bias of the spring 41 under the control of the cam 39b of the pivotable member 39, as shown in FIG. 5, and at the same time, the pivotable member 38 is further rotated counter-clockwisely with a result that the capstan 32 returns to its rest position as indicated by dot-and-dash line 32' in FIG. 3. Although not shown, the pinch roller moving device, the pad 26 and the loop detecting member 33 are mechanically associated with one another so that when the pinch roller 32 is at its rest position, the loop detecting member 33 is brought to a position in which it is out of engagement with the film F2 and the pad 26 is brought to a position spaced apart from the magnetic head 27. Conversely, in response to displacement of the pinch roller 32 from its rest position to its preparatory position, the loop detecting member 33 and the pad 26 are controlled so that the loop detecting member 33 is permitted to contact the film F2 and the pad 26 is urged against the magnetic head 27.

A cassette type detecting member 55 shown within the cassette-receiving chamber 1a is projected into the chamber 1a through the bottom wall 23 thereof. The bias force with which the detecting member 55 is projected into the chamber 1a is provided by the contact of a normally open switch SW10 bearing against the other end of the detecting member 55. The location whereat the detecting member 55 is projected into the chamber 1a is not covered by the cassette C1 when the silent film cassette C1 is loaded in the chamber 1a, but is covered by the cassette C2 when the sound film cassette C2 is loaded in the chamber 1a. The switch SW10 is closed by the force of the detecting member 55 when the cassette C2 is loaded into the chamber 1a to displace the detecting member 55 outwardly of the chamber 1a.

The aforementioned trigger button 16 is secured to a trigger plate 56 having a slot 56 engaged by a pin 57 secured to the camera body 1. By a compression spring 58, the trigger plate 56 is biased so that the trigger button 16 is always projected outwardly of the camera body, and when the trigger button 16 is depressed by the operator's finger against the bias of the spring 58, the trigger plate 56 is slidingly displaced by the guide of the slot 56a and the pin 57. When the trigger plate 56 is displaced rightwardly, the stepped portion 56b of the trigger plate 56 first bears against a normally open switch SWE to close this switch and then, while leaning the switch SWE closed, the end $56b_2$ bears against a normally open switch SW2 to close the same. When the trigger button 16 is released, the trigger button 16 and the trigger plate 56 are slidingly returned leftwardly, in FIG. 3, by the bias of the spring 58 and at this time, the switch SW2 is first opened, and then the switch SWE is opened. Thus, the trigger button 16, the trigger plate 56, the switches SWE and SW2, and the spring 58 together constitute a two-stage trigger device.

Figure 6A:
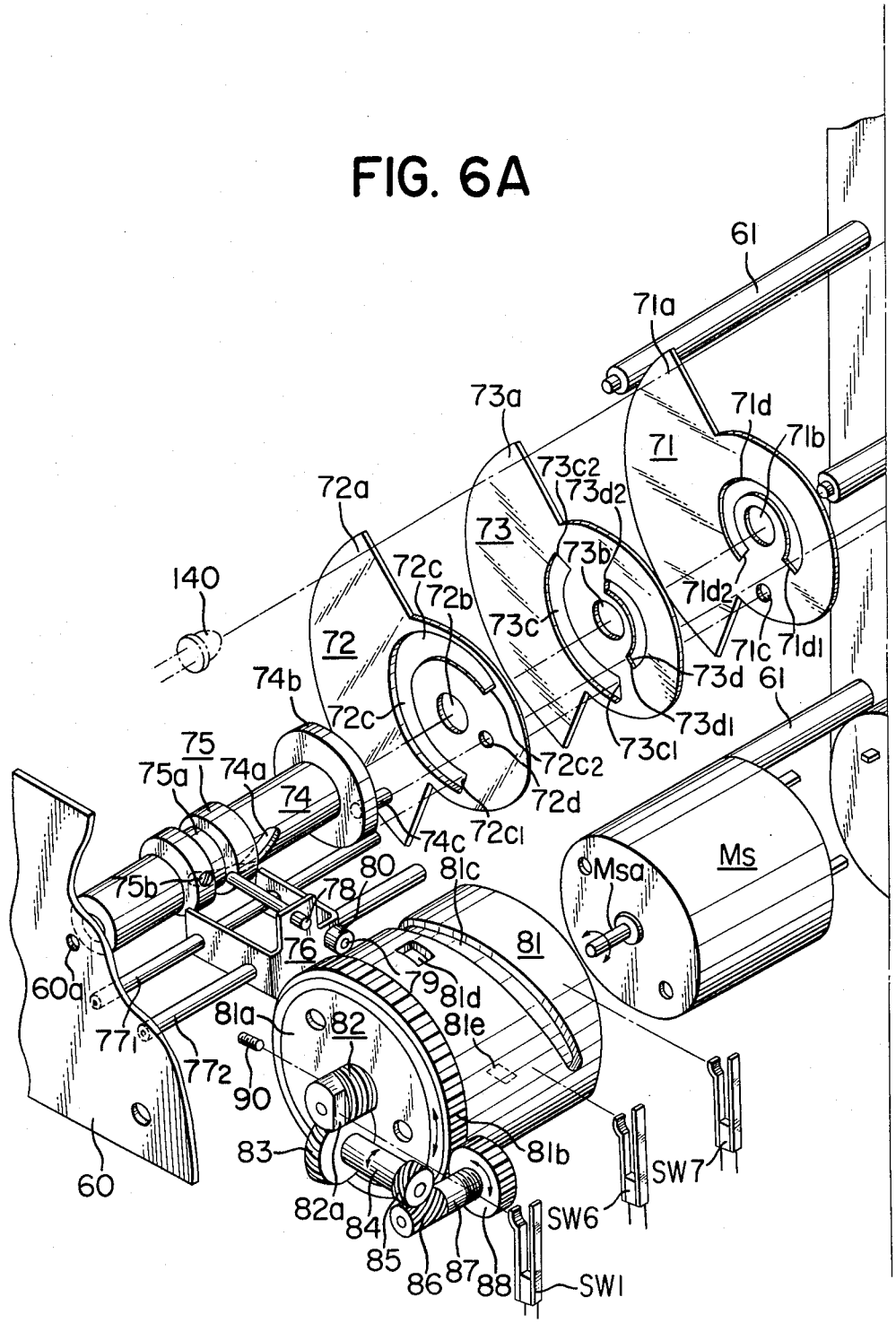
FIG. 6 is an exploded, perspective view for illustrating the shutter driving mechanism and the shutter opening angle varying mechanism shown in FIG. 3.
Figure 7:
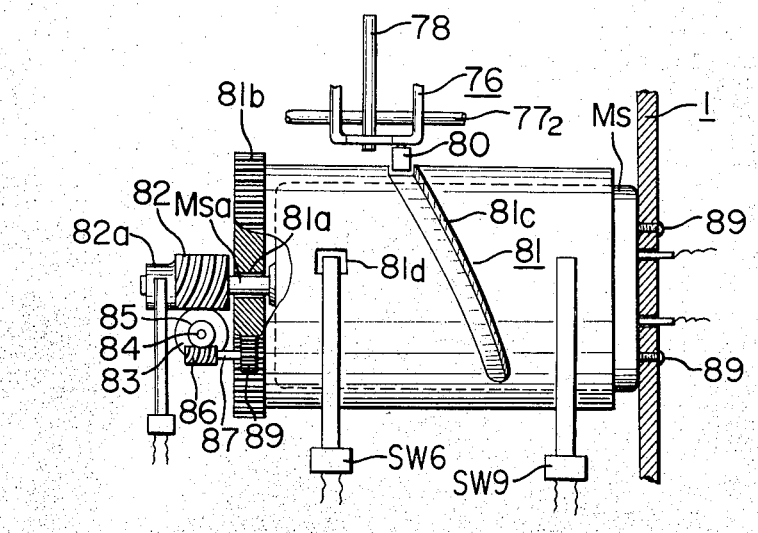
FIG. 7 is a pictorial plan view showing the driving portion of the shutter opening angle varying mechanism shown in FIGS. 3 and 6.
Figure 8:
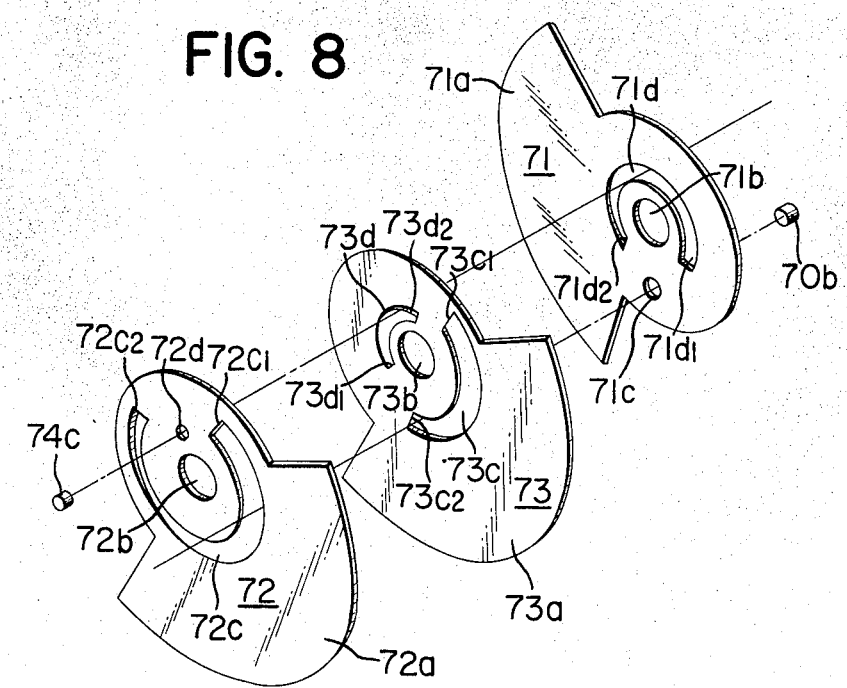
FIGS. 8 to 12 illustrate the condition in which the shutter blades are controlled by the shutter opening angle varying mechanism shown in FIGS. 3 and 6, FIG. 10 showing the condition in which the shutter opening is fully open, FIGS. 8 and 11 showing a condition in which the shutter opening is closed to its intermediate portion, and FIGS. 9 and 12 showing the condition in which the shutter opening is fully closed.
Figure 9:
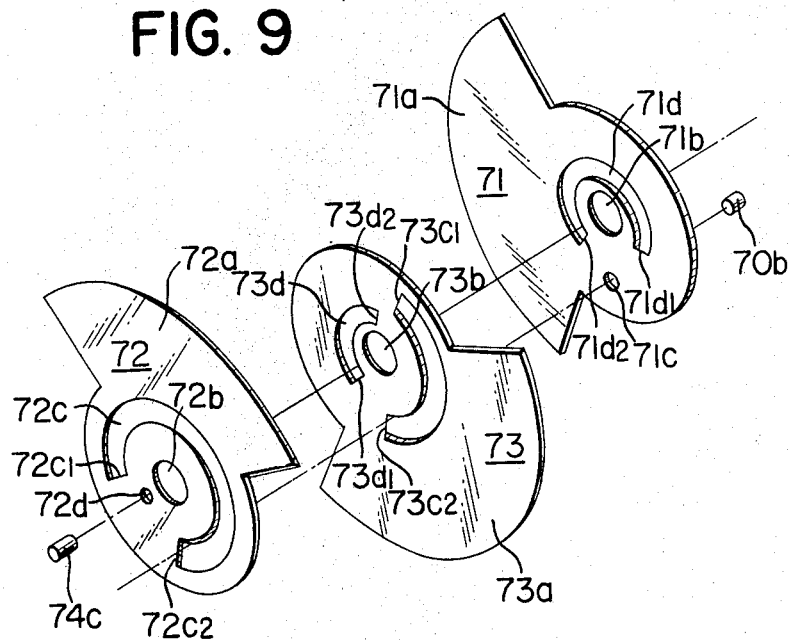
Figure 10:
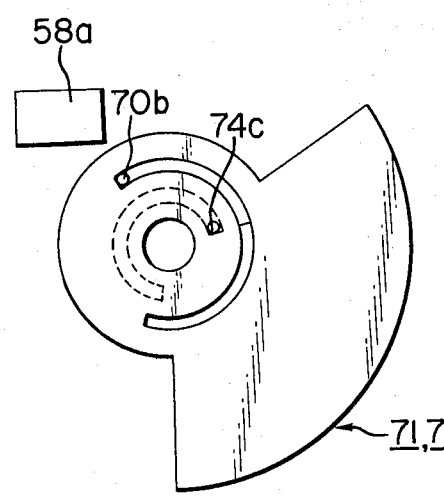
Figure 11:
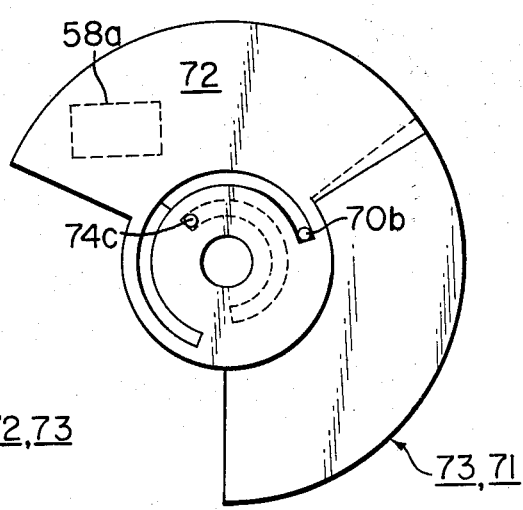
Figure 12:
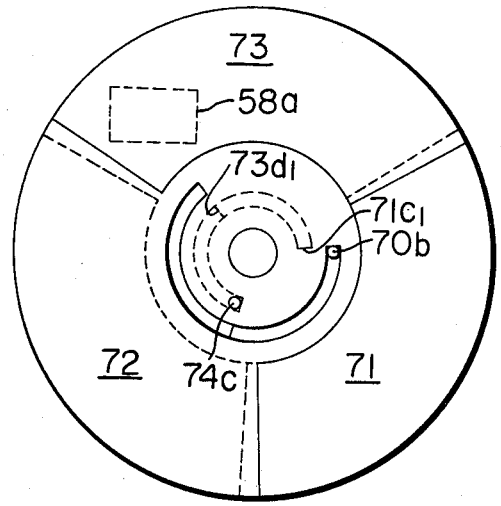

Designated by 58 is a first base plate having a portion thereof serving also as the front wall of the cassette-receiving chamber 1a. The base plate 58 is secured to the camera body and has an aperture 58a at a location corresponding to the aperture 21a of the film gate plate 21. Denoted by 59 is a second base plate disposed in opposed relationship with the first base plate 58. The first 58 and the second base plate 59 are secured to each other in a predetermined spaced apart relationship by a plurality of spacer bars 61 each having one end secured to the first base plate 58 and the other end secured to the second base plate 59. MF is a reversible motor secured to the camera body 62. The driver output of the motor MF is used to operate a rotatable shutter to be described, a film take-up driving mechanism, an overlap mechanism, and an intermittent film feeding mechanism for driving the aforementioned pull-down claw 25. Designated by 62 is a gear operatively secured to the output shaft MF1 of the motor MF through a known slip mechanism. Denoted by 63 is a rotary shaft extending through the first base plate 59 and rotatably journalled to the base plate 59. On one end of the rotary shaft 63 extending from the first base plate 59 toward the motor MF side, there is secured a gear 64 comprising a first gear portion 64a and a second gear portion 64b. The gear 64 is formed with a blocking recess 64b at a portion thereof opposed to the first base plate 59 and in which the end of a stop member 65, to be described, is received to restrain the gear. The first gear portion 64a of the gear 64 is always in mesh engagement with the gear 62. On the other end of the rotary shaft extending from the first base plate 59 in the direction opposite to the motor MF, there are secured a worm gear 66 and a cylindrical drum 67. A conductive piece 67a is provided on a portion of the peripheral surface of the cylindrical drum 67. Two conductive pieces $68_1$ and $68_2$ are urged against the peripheral surface of the cylindrical drum 67. These conductive pieces $68_1$ and $68_2$ are electrically connected through said conductive piece 67a when in conductive piece 67a on the cylindrical drum 67 rotating with the rotary shaft 63 comes to a location whereat it contacts both of the conductive pieces $68_1$ and $68_2$. The conductive pieces $68_1$, $68_2$ and the drum 67 together constitute a switch SW1. Denoted by 69 is a main shutter shaft having one end engaged in the aperture 59b of the first base plate 59 and the other end engaged in the aperture 60a of the second base plate 60, the main shutter shaft 69 being rotatably supported by the first 59 and the second base plate 60. The main shutter shaft 69 is formed with a spiral groove 69a. Denoted by 70 is a gear secured on the main shutter shaft 69. A ring-shaped groove 70a and a pin 70b projected toward the second base plate 60 are formed on the side of the gear 70 which is opposed to the second base plate 60. The gear 70 is always in mesh-engagement with the second gear portion 64b of the gear 64, and the gear 70 and the second gear portion 64b are of substantially the same diameter and have the same number of teeth. The rotary shaft 63 and the main shutter shaft 69 rotated by the drive of the motor MF are rotated substantially at a ratio of 1:1. Although not shown, the gear 70 is always in mesh-engagement with a gear for transmitting the driver of the motor MF to the known intermittent film feeding mechanism which causes the pull-down claw 25 to transport the film F1 or F2 intermittently one by one frame on the film gate plate 21. The intermittent film feeding mechanism is also associated so that the pull-down claw transports the film F1 or F2 by one frame while the gear 70 makes one full rotation. Designated by 71, 72 and 73 are shutter blades having sector shutter portions 71a, 72a and 73a, respectively. The shutter blade 71 is used as a main shutter blade, the shutter blade 72 is used as a first auxiliary shutter blade, and the shutter blade 73 is used as a second auxiliary shutter blade. The angles of the arcs of the shutter portions 71a, 72a and 73a of the shutter blades 71, 72 and 73, respectively, are slightly greater than 120°. The shutter blades 71, 72 and 73 are formed with center holes 71b, 72b and 73b, respectively. If an imaginary first circle having a radius "D" and an imaginary second circle having a radius "d" are described on the surface of each shutter blade 71, 72 and 73 with the center holes 71b, 72b and 73b as the center, an aperture 71c is formed on the circumference of the first circle on the main shutter blade 71, a slot 71d complementary with the circumference of the second circle is formed on the circumference of the second circle, a slot 72c complementary with the first circumference of the first auxiliary shutter blade 72 is formed on such circumference, an aperture 72d is formed on the circumference of the second circle, a slot 73c complementary with the first circumference of the second auxiliary shutter blade 73 is formed on such circumference, and a slot 73d complementary with the circumference of the second circle is formed on such circumference. The pin 70b on the gear 70 extends through the aperture 71c of the main shutter blade 71, the slot 73c of the second auxiliary shutter blade 73, and the slot 72c of the first auxiliary shutter blade 70. The main shutter blade 71 is in a fixed relationship with the gear 70 by the engagement between the aperture 71c and the pin 70b, while the other auxiliary shutter blades 72 and 73 are loosely fitted by the slots 72c and 73c. Designated by 74 is a cylindrical auxiliary shutter shaft disposed over the main shutter shaft 69. The auxiliary shutter shaft 74 is rotatable with respect to the main shutter shaft 69 but is not slidable axially. The auxiliary shutter shaft 74 is formed with a spiral groove 74a inclined in the opposite direction to the spiral groove 69a on the main shutter shaft 69, and also provided with a flanged portion 74b on that end thereof which is opposed to the first base plate 59. On the surface of the flanged portion 74b which is opposed to the second base plate 59, there is provided a pin 74c extending toward the second base plate 59. The pin 74c extends into the groove 70a of the gear 70 through the aperture 72d in the first auxiliary shutter blade 72 disposed between the flanged portion 74b of the auxiliary shutter shaft 74 and the gear 70, the slot 73d in the second auxiliary shutter blade 73, and the slot 71d in the main shutter blade 71. Designated by 75 is a shutter opening angle adjust cylinder slidable and rotatable with respect to the auxiliary shutter shaft 74 and disposed over the auxiliary shutter shaft 74. The peripheral surface of the adjusting cylinder 75 is formed with an endless groove 75a. Also, the adjusting cylinder 75 is provided with a pin 75b projectedly studded inwardly thereof. The pin 75b extends through the spiral groove 74a of the auxiliary shutter shaft 74 and is engaged with the spiral groove 69a of the main shutter shaft 69. By this pin 75b, the adjusting cylinder 75, the main shutter shaft 69 and the auxiliary shutter shaft 74 are operatively engaged for rotation together. This adjusting cylinder 75, when slidden on the auxiliary shutter shaft 74 by means to be described, rotates the main shutter shaft 69 and the auxiliary shutter shaft 74 in the opposite directions with the aid of the engagement between the pin 75b and the spiral grooves 74a, 69a. Designated by 76 is a sliding member slidably held by a pair of guide bars 77₁ and 77₂ secured between the first base plate 59 and the second base plate 60. The guide bars 77₁ and 77₂ extend substantially parallel to the main shutter shaft 69. Denoted by 78 is a pin secured on the sliding member 76. The free end of the pin 78 is loosely engaged in the endless groove 75a of the adjusting cylinder 75. Thus, when the sliding member 76 is slidden by being guided by the guide bars 77₁ and 77₂, the pin 78 causes the adjusting cylinder 75 to be slidden together on the auxiliary shutter shaft 74, but the pin affects in no way the rotation of the adjusting cylinder 75 when the latter is rotated with the main shutter shaft 69 and the auxiliary shutter shaft 74. Denoted by 79 is a shaft extending in the opposite direction to the adjusting cylinder and secured to the sliding member 76, and 80 a rotatable ring rotatably disposed on the shaft 79. Ms is a shutter opening angle regulating motor secured to the camera body 1 by means of screws 89. Denoted by 81 is a drug cup-shaped cam ring formed so as to fully cover the motor Ms leaving an end face thereof, as shown in FIG. 7. In the buttom wall of the cam ring 81, three is provided a through-hole 81a through which the output shaft of the motor Ms, and a gear portion 81b is provided on the end of the peripheral surface thereof adjacent to the buttom wall. In the peripheral surface of the cam ring 81, there are provided a cam groove 81c in which the rotatable ring 80 is loosely fitted, a switch control recess 81d for effecting the opening of a switch SW6, and a control recess 81c for effecting the opening of a switch SW9. The cam ring 81 itself is freely rotatable with respect to the motor Ms. Designated by 82 is a worn gear fitted on the output shaft Msa of the motor Ms extending through the hole 81a of the cam ring 81 and projected outwardly of the cam ring 81, the worm gear 82 being firmly secured to the output shaft by means of set screws 90. The worm gear 82 is provided with a switch control cam 82a for controlling ON-OFF of a switch SW11 for each full rotation of the output shaft MSa of the motor Ms. Denoted by 83 is a worm wheel secured to a shaft 84 rotatably journalled to the camera body 1, and 85 a helical gear secured to the shaft 84. The worm wheel 83 is always in mesh-engagement with the worm gear 82. Denoted by 86 is a helical gear secured to a shaft 87 rotatably journalled to the camera body 1, and 89 a gear operatively coupled to the shaft 87 through a friction mechanism 90. The gear 86 is always in mesh-engagement with the gear 84, and also the gear 89 is always in mesh-engagement with the gear portion 81b of the cam ring 81. The gears 82, 83, 84, 86, 89, 81b and the rotary shafts 84 and 87 together constitute a reduction mechanism. The drive output of the motor 81 may be transmitted through the reduction mechanism to the cam ring 81 to rotate this cam ring on the peripheral surface of the motor Ms. The mechanism so constructed to rotate the cam ring 81 by the drive of the motor Ms can very much shorten the axial length of the shutter opening angle varying mechanism. The rotative displacement of the cam ring 81 rotated by the drive of the motor Ms as described above controls the angle of opening of the shutter formed by the shutter blades 71, 72 and 73. More particularly, the main shutter blade 71 is secured to the gear 70 through the pin 70b and the first auxiliary shutter blade 72 is secured to the auxiliary shutter shaft 74 through the pin 74c, but the second auxiliary shutter blade 73 is not secured to the auxiliary shutter shaft 74 nor to the main shutter shaft 69. When one of switches SW6 comprising a pair of conductive pieces normally closed by bearing against the outer periphery of the cam ring 81 drops in the recess 81d on the cam ring 81, as shown in FIG. 7, to open the switch SW6, the sliding member 76 is displaced to its leftmost position. In this state, as shown in FIGS. 6 and 9, the pin 70b is engaged with the main shutter blade 71 and bears against one end 73c₁ of the slot 73c in the second auxiliary shutter blade 73 and one end 72c₁ of the slot 72c in the first auxiliary shutter blade 72, and the pin 74c is engaged with the aperture 72d in the first auxiliary shutter blade 72 and bears against one end 73d₁ of the slot 73d in the second auxiliary shutter blade 73 and one end 71d₁ of the slot 71d in the main shutter blade 71. That is, in this state, the three shutter blades 71, 72 and 73 are completely overlapped and the shutter opening angle thereof is about 240°, which is the fully open angle. As the motor Ms is rotated by a means to be described and the cam ring 81 is rotated counter-clockwisely in FIG. 6, said one conductive piece drops in the recess 81d on the cam ring 81 to open the switch SW1 and said one conductive piece now comes out of the recess 81d and is urged against the peripheral surface of the cam ring 81, thus closing the switch SW1. At the same time, the sliding member 76 is gradually displaced toward the first base plate 59 under the control of the cam groove 81c on the cam ring 81. Consequently, the adjusting cylinder 75 is also slidden on the auxiliary shutter shaft 74 toward the first base plate 59. When the adjusting cylinder 75 is displaced toward the first base plate 59, the auxiliary shutter shaft 74 starts moving counter-clockwisely in FIG. 6 with respect to the main shutter shaft 69 by the engagement between the pin 75b of the adjusting cylinder 75 and the spiral groove of the auxiliary shutter shaft 74 and the spiral groove 69a of the main shutter shaft 69. By this, the first auxiliary shutter blade 72 is individually rotated counter-clockwisely with respect to the second auxiliary shutter shaft 73 and the main shutter shaft 71, thus gradually narrowing the shutter opening angle. The auxiliary shutter shaft 74 is rotated through about 120° and the pin 74c of the auxiliary shutter shaft 74 comes to a position in which it bears against the other end of the slot 73d in the second auxiliary shutter blade 73 (see FIGS. 8 and 11), and when the auxiliary shutter shaft 74 is further rotated counter-clockwisely, the second auxiliary shutter blade 73 is pulled on by the pin 74c so that the first 72 and the second auxiliary shutter blade 73 are rotated with respect to the main shutter blade 71, thus further narrowing the shutter opening angle. The auxiliary shutter shaft 74 is rotated through about 240° and at least, when the other end 72c$_2$ of the slot 72c in the first auxiliary shutter blade 72 and the other end of the slot 73c of the second auxiliary shutter blade 73 come to bear against the pin 70b on the gear 70, the shutter becomes fully closed as shown in FIGS. 9 and 12. In this state, the adjusting cylinder 75 comes to assure a position nearest the first base plate 59. Accordingly, one of the contacts of the switch SW7 normally in contact with the cam ring 81 and being closed drops in the recess 81c of the cam ring 81 to close the switch SW7, which puts out a signal meaning that the shutter has become fully closed. This completes the fade-out operation. In order for fade-in operation to be performed, the motor Ms is caused to rotate reversely. More particularly, upon full closing of the shutter, the cam ring 81 is rotatively displaced to the extremity of counter-clockwise rotation and the adjusting cylinder 75 is slidingly displaced most toward the first base plate 59 and in this state, the cam ring 81 is rotated clockwisely by the reverse rotation of the motor Ms, whereupon the contact of the switch SW7 dropped in the recess 81c of the cam ring 81 comes out of such recess 81c, thus closing the switch SW7 again. When the cam ring 81 is rotated clockwisely, the sliding member 76 is gradually displaced toward the second base plate 60 under the control of the cam groove 81c on the cam ring 81. Consequently, the adjusting cylinder 75 also slides on the auxiliary shutter shaft 74 toward the second base plate 60 but, when the adjusting cylinder 75 slides toward the second base plate 60, the auxiliary shutter shaft 74 is rotatively displaced clockwisely with respect to the main shutter shaft 69. When the auxiliary shutter shaft 74 is rotated clockwisely, the first auxiliary shutter blade 72 is gradually rotated clockwisely with respect to the second auxiliary shutter blade 73 and the main shutter blade 71, thus widening the shutter opening angle. When the auxiliary shutter shaft 74 is returned through about 120°, the pin 74c of the shaft 74 comes to a position in which it bears against the other end 73d$_1$ of the slot 74d in the second auxiliary shutter blade 73. As the auxiliary shutter shaft 74 is further rotated clockwisely, the pin 74c pulls on the second auxiliary shutter blade 73 so that the first 72 and the second auxiliary shutter blade 73 are rotated with respect to the main shutter blade 71, thus further widening the opening angle of the shutter. When the auxiliary shutter shaft 74 returns to about 240°, as shown in FIGS. 6 and 10, the main shutter blade 71, the first auxiliary shutter blade 72 and the second auxiliary shutter blade 73 becomes fully opened. This completes the fade-in operation.

The electromagnetic device FMg, secured to the first base plate 59, is provided to stop the operation of the intermittent film feeding device, the shutter device, etc. and comprises an electromagnetic coil FCL. core 91, round iron bar 92, stop member 65, connector piece 94 and spring 95. The magnetic coil FCL is cylindrically turned, and held on the first base plate 59 with an insulator interposed therebetween. The iron bar 92 is slidably disposed within the cylindrically shaped electromagnetic coil FCL. The stop member 65 is held on the first base plate 59 at a location engageable with the blocking recess 64b of the gear 64 and in a condition in which it is slidable perpendicularly with respect to the side surface of the gear 64. One end of the iron bar 92 and the stop member 65 are coupled together by the connector piece 94 so as to slide together, and are biased away from the first base plate 59 by a spring 95, when they are displaced away from the first base plate 59, the stop member 65 is not engageable with the blocking recess of the gear 64: When a current is supplied to the electromagnetic coil FCL of the electromagnet device MFg to energize the coil FCL and magnetize the core 91, the iron bar 92 is attracted to the core 91, whereby the stop member 65 is urged against the side of the rotating gear 64 against the bias of the spring 95. In this state, when the blocking recess 64b of the gear 64 comes to a position corresponding to the stop member 65, this stop member 65 is restrained in the recess 64b of the gear 64, thus forcibly blocking in rotation of the gear 64. That is, by this stoppage of the rotation of the gear 64, the operation of the intermittent film feeding mechanism is stopped and the rotation of the shutter and rotary shaft 63 is also stopped. When the current supply to the electromagnetic coil FCL is cut off, the stop member 65 and the iron bar 92 are again biased away from the first base plate 59 by the force of the spring 95, thus permitting rotation of the gear 64.

Designated by 93 is a gear rotatably supported on a fixed shaft secured to the main body 1. The gear 93 is always in mesh-engagement with the worm gear 65. Denoted by 97 is a substantially annular take-up shaft having a plurality of pawls engaged by the take-up shaft of the cassette C1 or C2 when one of these cassettes is loaded into the film-receiving chamber 1a. The take-up shaft 97 has a portion thereof projected into the chamber 1a through the opening in the bottom wall 23 of the chamber 1a, and in the outer peripheral portion disposed at the back side of the bottom wall 23, a substantially rectangular cam portion 97b and a gear portion 97c are integrally formed as shown in FIG. 3. 98 denotes a cylindrical member securely held by a base plate 99 secured to the camera body 1. Disposed in the cylindrical member 98 are a slidable pin 100 and a compression spring 101 normally biasing the pin 100 inwardly of the chamber 1a. The function of the pin 100 and spring 101 is fully described in U.S. Pat. No. 3,860,195, which shows that when a known sound film cassette C2 having a releasable anti-reverse rotation mechanism is loaded, they release the anti-reverse rotation mechanism and that when a known silent film cassette C1 having an unreleasable anti-reverse rotation mechanism is loaded, the pin 100 escapes from the chamber 1a. Designated by 101 is a gear having a portion thereof disposed between the inner peripheral surface of the take-up shaft 97 and the outer peripheral surface of the cylindrical member 98, and rotatably supported by the cylindrical member 98. The take-up shaft 87 is rotatably mounted on the gear 102. The gear 102 is always in mesh-engagement with gear 93, and the drive of the gear 102 is transmitted to the take-up shaft 97 through a friction member 103 disposed between the gear 102 and the take-up shaft 97. Numeral 104 denotes a cam follower plate pivotally supported on a shaft 105 secured to the bottom wall 23. The cam follower 104 has a cam follower portion 104a normally bearing against the cam portion 97b on the take-up shaft 97 and an engaging portion 104b engaged with one contact of a normally open switch SW4 comprising electrical contacts SW4a and SW4b. The cam follower plate 104 is so biased by the electrical contact SW4b of the switch SW4 that the cam follower portion 104a bears against the cam portion 97b of the take-up shaft 97. When the take-up shaft 97 is rotated, the cam follower plate 104 is rotated clockwisely in FIG. 3 each time the top of the cam portion 92b comes to a position corresponding to the cam follower 104a of the cam follower plate 104, thus bringing the electrical contact SW4b into contact with the electrical contact SW4a. Accordingly, in the present embodiment, the switch SW4 repeats its opening-closing operation four times during one full rotation of the take-up shaft 97. The switch SW4 is used as a film feed signal. That is, when the exposure of the film F1 or F2 in the film cassette C1 or C2 loaded in the chamber 1a is all completed and the take-up shaft C1c or C2c of the film cassette becomes unrotatable, the take-up shaft 97 also becomes unrotatable and the rotation of the gear 102 is absorbed by the friction member 103. Thus, when the take-up shaft 97 is stopped, the switch SW4 does not repeat its opening-closing and this signal information is applied as input to means to be described.

Designated by 113 is a gear rotatably supported on the shaft 96 on which the gear 93 is also rotatably supported. The gears 113 and 93 are operatively coupled through a known one-way clutch mechanism 114. The one-way clutch mechanism 114 transmits the rotation of the gear 93 to the gear 113 when the gear 93 is rotated counter-clockwisely, and causes slipping between the gear 93 and the clutch mechanism 114 when the gear 93 is rotated clockwisely, so as not to transmit the rotation of the gear 93 to the gear 113. Denoted by 115 is a gear rotatably supported on a fixed shaft 116 secured to the bottom wall 23. The gear 115 is always the mesh-engagement with the gear 93. Numeral 117 designates a gear rotatably supported on said fixed shaft 116. The gears 115 and 117 are operatively coupled together through a known one-way clutch mechanism 118. The one-way clutch mechanism 118 transmits the rotation of the gear 115 to the gear 117 when the gear 115 is rotated counter-clockwisely, but causes slipping between the gear 115 and the clutch mechanism 118 when the gear 115 is rotated clockwisely, so as not to transmit the rotation of the gear 115 to the gear 117. 119 denotes a pivotable member pivotally supported on a shaft 120 secured to the camera body 1. The pivotable member 119 has a restraining arm portion 119a having a restraining pawl 119a₁ engageable with the gear portion 97c of the take-up shaft 97, when the pivotable member 119 is pivoted counter-clockwisely, to thereby temporally stop the rotation of the take-up shaft 97 and disengageable with the gear portion 97c when the pivotable member is pivotal clockwisely, a link arm portion 119b linked to one end of the sliding member 106 through a pin 121, and a holding arm portion 119c for securely holding a fixed member 122 through a pin 123. The pivotable member 119 is normally biased counter-clockwise by a tension spring 125 engaged with a pin 124 having one end studded in the link arm portion 119b and the other end studded in the camera body 1. The linking of the link arm portion 119b of the pivotable member 119 to the sliding lever 106 is accomplished by the engagement of a pin 121 extending through the slot 106d of the sliding lever 106 and studded in the link arm portion 119b of the pivotable member 119. The link arm portion 119b is provided with an engaging portion 119b₁ engaged by a cut-away 111a provided in the flange 111. The engaging portion 119b₁ and the cut-away 111a of the flange 111 are disposed at locations corresponding to "P" or "P.S" when the pointer 8a on the mode change-over operating ring 8 is disposed at "P" or "P.S". When the overlap photography starting button 5 is not depressed, the sliding lever 106 has one end 106b displaced rightwardly in FIG. 3 on the flange 108a. In this state, the pivotable member 119 is placed in a condition wherein the restraining pawl 119a₁ of the pivotable member 119 is displaced clockwisely so as not to be engaged by the gear portion 97c. Also, in this state, the engaging portion 119b is placed at a position in which it is not engaged with the cut-away 111a of the flange 111. When the starting button 5 is depressed with the engaging portion 119b₁ of the pivotable member 119 corresponding to the cut-away 111a of the flange 111 and the sliding shaft 108 is sliding displaced inwardly of the camera against the free of the spring 109, the flange 108a is disengaged from said one end 106b of the sliding lever 106. The sliding lever 106 is subjected to the bias of the spring 125 through the pivotable member 119 and is slidden leftwardly in response to the counter-clockwise rotation of the pivotable member 119 under the guidance of the slot 106c formed in the sliding member 106 engaged by the shaft 9, whereby the engaging portion 119b₁ of the pivotable member 119 is engaged with the cut-away 111a of the flange 111 and the end 106b of the sliding lever 106 bears against the peripheral surface of the sliding shaft 108 (see FIG. 12). The displaced position of the sliding shaft 108 inwardly of the camera is maintained with the upper surface of the flange 108a urged against the end 106b of the sliding lever 106 even if the starting button 5 is released. The release continues until the sliding lever 106 is again displaced rightwardly in FIG. 13, namely, until the end 106b of the sliding lever 106 is disposed outwardly of the flange 108. The return of the sliding lever and the pivotable member 119 to the position of FIG. 3, namely, the displacement of the sliding lever 106 and the pivotable member 119 so as to cause the end 106b of the sliding lever 106 to be located outwardly of the flange 108a, is usually effected in the overlap photography step to be described. If it is desired to return them prior to the overlap photography step being completed, the cancel knob 6 may be rotated until the pointer 6a on the knob 6 comes to a position corresponding to the mark "CANCEL". Thus, when the knob 6 is rotated until the pointer 6 comes to the position corresponding to the mark "CANCEL", the control cam pointer 6 rotating with the knob 6 bears against the pin 107 on the sliding lever 106 to enable the sliding lever 106 to be displaced rightwardly against the bias of the spring 125 until the end 106b of the slidable lever 106 becomes positioned outwardly of the flange 108. When the sliding lever 106 is displaced until the end 106a of the lever 106 comes to be positioned outwardly of the flange 108, the sliding shaft 108 is returned toward the outside of the camera by the force of the spring 109 and the peripheral surface of the flange 108a comes to bear against the end 106a of the sliding lever 106. In this manner, the knob 6 is turned until the pointer 6a on the knob 6 corresponds to the mark "CANCEL", whereafter the knob 6 is returned to its initial position, thereby restoring the position of FIG. 3.

Figure 13:
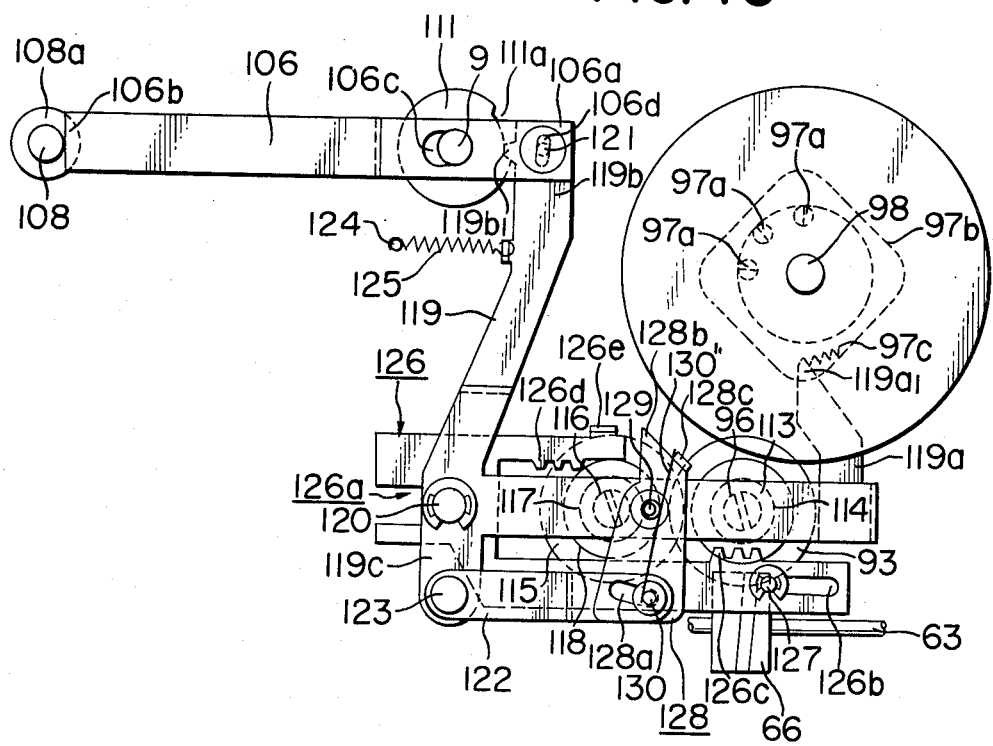
FIGS. 13 and 14 are plan views for illustrating the operation of the overlap operating mechanism shown in FIG. 3, FIG. 13 showing a condition in which the overlap photography actuating button is depressed to start fade-out photography, and FIG. 14 showing the condition in which the overlap photography actuating button is depressed to start fade-out photography.
Figure 14:
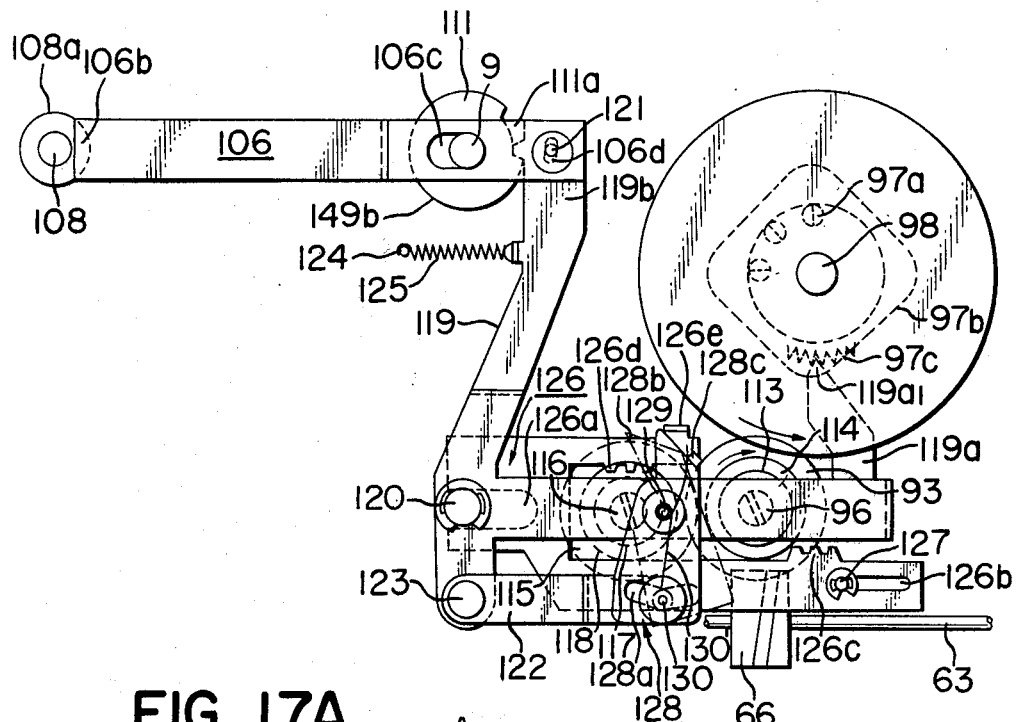

Designated by 126 is a moving member having a U-shaped portion 126c slidably engaged with the fixed shaft 120, a slot 126b engaged by a fixed shaft 127 secured to the bottom wall 23, a rack portion 126c engageable with the gear 113, a rack portion 126d engageable with the gear 117, and a bent portion 126e bent toward the pivotable member 119. In the condition wherein the moving member 126 is displaced leftwardly so that the gear 113 and the rack portion 126c are engaged with each other as shown in FIG. 13, the gear 93 is rotated counter-clockwisely to rotate the gear 113 counter-clockwisely by the operation of the clutch mechanism 114, whereupon the moving member 126 is moved until the gear 117 and the rack 126d are engaged with each other by the engagement of the gear 113 with the rack portion 126c, as shown in FIG. 3, and until the gear 113 is disengaged from the rack portion 126c. In that case, the rotation of the gear 115 is not transmitted to the gear 117 due to the above-noted operation of the clutch mechanism 115 even if the gear 117 comes into mesh-engagement with the rack 126d, and thus the moving member 126 is affected in no way. Thus, in the condition wherein the moving member 126 has been displaced rightwardly so as to bring the gear 117 and the rack portion 126d into mesh-engagement, when the gear 93 is rotated clockwisely, the gear 115 is rotated counter-clockwisely. This counter-clockwise rotation of the gear 115 also causes counter-clockwise rotation of the gear 117 by the operation of the clutch mechanism 114, and the rotation of the gear 117 leftwardly displaces the moving member 126 by the engagement of the gear 117 with the rack portion 126d. Such displacement of the moving member 126 continues until the gear 113 meshes with the rack portion 126c and the gear 117 is disengaged from the rack portion 126d. Again in this case, the engagement between the gear 113 and the rack portion 126c affects the moving member 126 in no way because the rotation of the gear 93 is not transmitted to the gear 113 due to the operation of the clutch mechanism 114.

Designated by 128 is a pivotable member pivotally supported on a pin 129 studded in the restraining arm portion 119a of the pivotable member 119. The amount of rotation of the pivotable member 128 is limited by the engagement between a slot 128a formed in the member 128 and a pin 130 studded in the fixed member 122. The pivotable member 128 has an engaging portion 128b engaged by the bent portion 126e of the moving member 126, and a spring engaging portion 128c. The pivotable member 128 is also provided with a spring 130 held by the pin 129 with one end of the spring 130 being engaged with the said engaging portion 128c and the other end being engaged with the pin 130. The spring 130 normally biases the pivotable member 128 for counter-clockwise rotation about the pin 129. The relation between the pivotable member 128 and the moving member 126 is such that when the moving member 126 is displaced rightwardly, the bent portion 126e of the moving member 126 is positioned to the right of the engaging portion 128b of the pivotable member 128 and that when the moving member 126 is displaced leftwardly, the bent portion 126e of the moving member 126 is positioned to the left of the engaging portion 128b of the pivotable member 128. When the moving member 126 is displaced leftwardly, the bent portion 126c strikes against the engaging portion 128b, but the pivotable member 128 is permitted to rotate against the force of the spring 130 for counter-clockwise rotation, thus facilitating the leftward displacement of the moving member 126 by the push of the bent portion 126c. The bent portion 126c also strikes against the engaging portion 128b when the moving member displaced to the left is displaced back to the right. In this case, however, the clockwise displacement of the pivotable member 128 is limited by the slot 126b and the pin 130 and therefore, the pivotable member 128 is not rotated clockwisely so that the rightward movement of the moving member 126 does not easily take place. Accordingly, when the moving member 126 is displaced rightwardly by the above-described operation, the bent portion 126e urges the engaging portion into clockwise rotation so that the pivotable member 119 is pivoted clockwisely about the pin 120. Thus, when the pivotable member 119 is rotated clockwisely, the engaging portion 119b₁ of the pivotable member 119 retracts out of the cut-away 111a of the flange 111 and in response to the rotation of the pivotable member 119, the sliding lever 106 is also slidden rightwardly to release the engagement between the flange 108a and the end 106b of the sliding lever 106 to thereby permit the sliding shaft 108 to return to its initial position. When the moving member 126 is completely displaced rightwardly to release the engagement between the bent portion 126c and the engaging portion 128c, the pivotable member 119 is again rotatively returned counter-clockwisely by the spring 125, but in this case, the end 106b of the sliding lever 106 bears against the peripheral surface of the flange 108a, so that the pivotable member 119 is rotated and held just before the engaging portion 119b of the pivotable member 119 enters the cut-away 111a of the flange 111.

The mechanical construction of the cine camera according to the present invention has so far been described. In FIG. 6, the lamp 140 and the light-receiving element 141 indicated by dot-and-dash line are disposed on the opposite sides of the shutter comprising the shutter blades 71, 72 and 73. In the shown embodiment, instead of the mechanically constructed switch SW1, an electrical switch SW1' is employed. Such arrangement of the lamp 140 and the light-receiving element 114 provides a pulse-like signal from the light-receiving element 114 each time the shutter passes between the lamp 140 and the element 114, and such signal replaces the signal of the switch SW1.

Figure 15A:
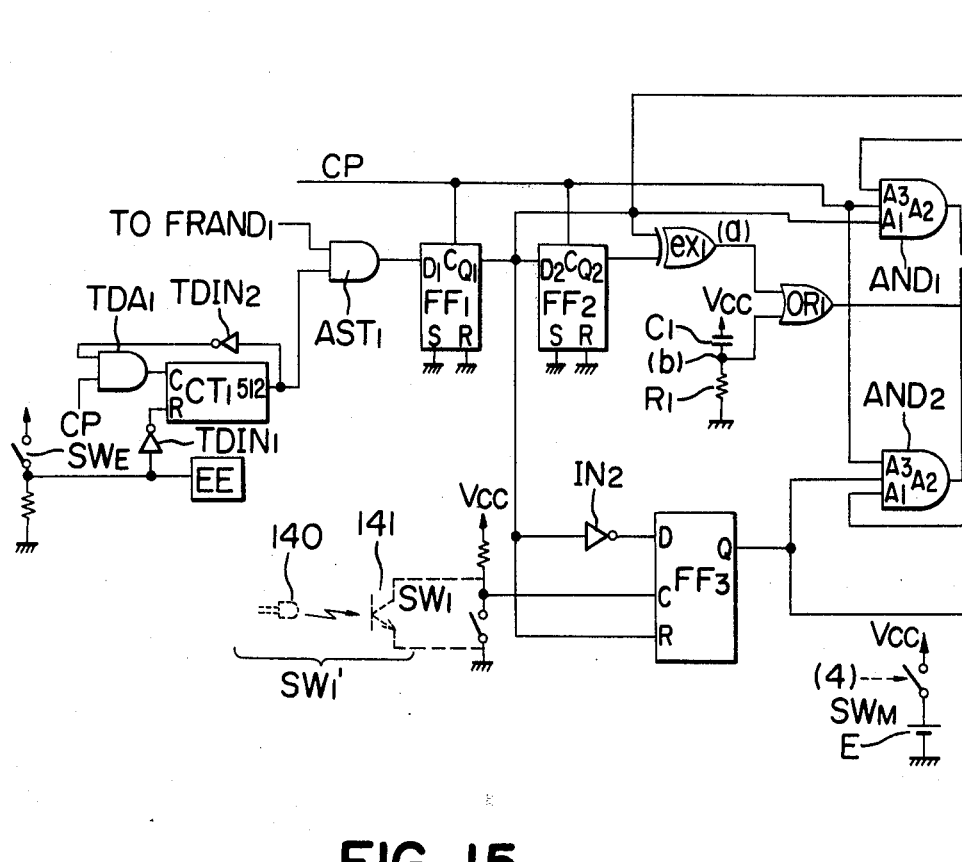
FIG. 15 shows an embodiment of the sequence control circuit in the cine camera of the present invention shown in FIGS. 2 to 14.
Figure 15:
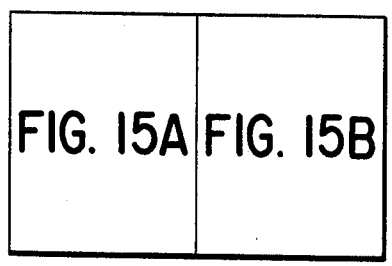
Figure 15B:
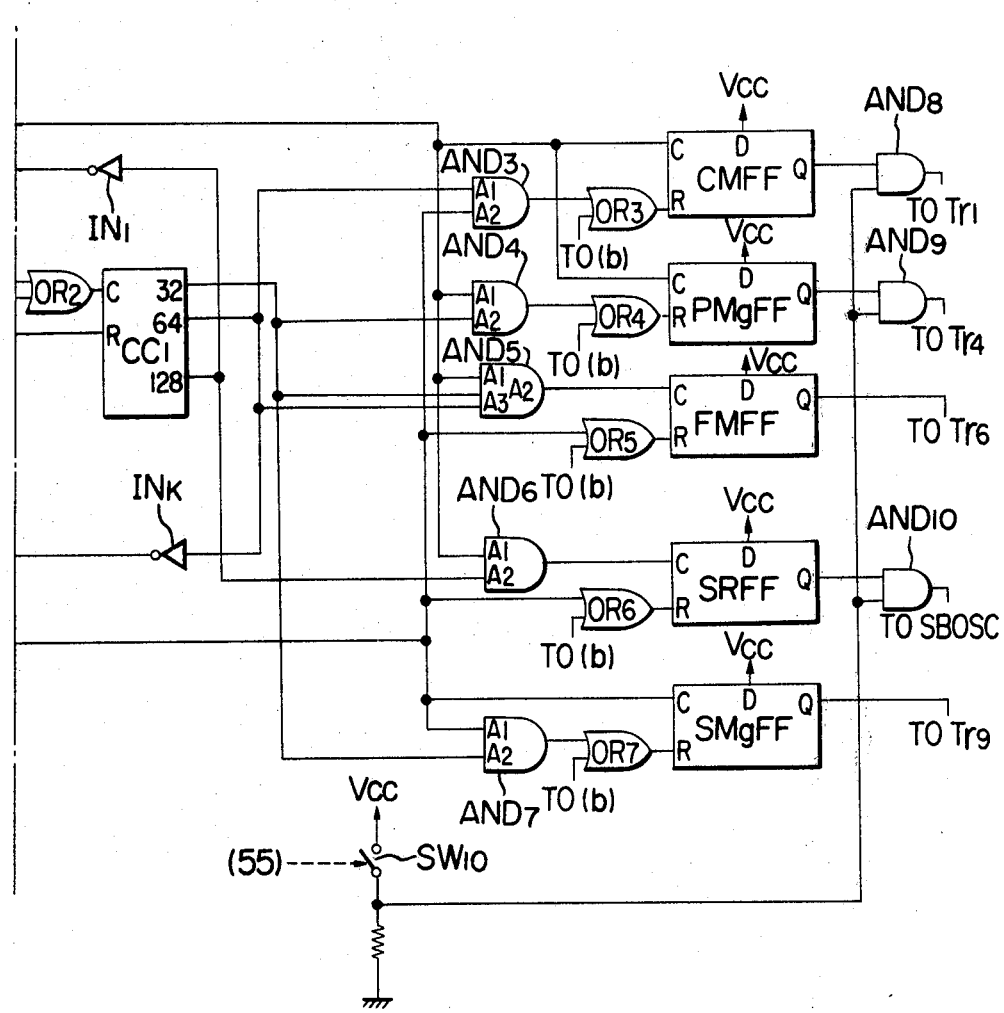

FIG. 15 is a circuit diagram showing an embodiment of the sequence control circuit in the camera according to the present invention shown in FIGS. 2 to 14. Designated by AST₁ is an AND gate having two input terminals, one of which is connected to the output terminal of an AND gate FRAND₁ shown in FIG. 16. FF1 and FF2 are D-type flip-flops. The D1 input terminal of the flip-flop FF1 is connected to the output terminal of the AND gate AST1, and the Q1 output terminal of FF1 is connected to the D2 input terminal of the flip-flop FF2.

The Q2 output terminal of the flip-flop FF2 is connected to one input terminal of an exclusive or gate $ex_1$. The other input terminal of the gate $ex_1$ is connected to the Q1 output terminal of the flip-flop FF1. By so connecting the D-type flip-flops FF1 and FF2 and the exclusive or gate $ex_1$, a single pulse for resetting a binary counter CC1 is put out from the output terminal of the exclusive or gate $ex_1$ after triggering. OR1 is an OR gate having two input terminals, one of which is connected to the output terminal of the exclusive or gate $ex_1$, and the output terminal of the OR gate OR1 is connected to the reset terminal R of the counter CC1. AND1 is an AND gate for transmitting clock pulse of 1 millisecond period to the counter CC1 for executing the start sequence to be described. The input terminal A1 of the AND gate AND1 is connected to the Q1 output terminal of the flip-flop FF1 and the input terminal A3 of the AND gate AND1 is connected to the output terminal 128 of the counter CC1 through an inverter IN1. The clock pulse CP is applied to the A2 input terminal of the AND gate AND1. The output terminal of the gate AND1 is connected to the clock input terminal C of the counter CC1 through an OR gate OR2. FF3 is a D-type flip-flop for producing a stop sequence control signal for controlling the stop sequence to be described. The D input terminal of the flip-flop FF3 is connected to the Q1 output terminal of the flip-flop FF1 through an inverter IN2, and the clock input terminal of the flip-flop FF3 to the switch SW1 described with respect to FIGS. 3 and 6 which is opened and closed each time the intermittent film feed claw feeds the film F1 or F2 by on frame on the film gate plate 21. The reset input terminal R of the flip-flop FF3 is connected to the Q1 output terminal of the flip-flop FF1. AND2 is an AND gate constituting a gate circuit for transmitting the clock pulse CP for executing the stop sequence in response to the aforementioned stop sequence control signal. The A1 input terminal of the AND gate AND2 is connected to the output terminal 64 of the counter CC1 through an inverter INk, and the A2 input terminal thereof is connected to the Q output terminal of the flip-flop FF3. The clock pulse CP is applied to the A2 input terminal of the gate AND2 and the output terminal of the AND gate AND2 is connected to the input terminal of the OR gate OR2. CMFF is a D-type flip-flop for driving the capstan motor. A voltage Vcc is applied to the input terminal of the flip-flop CMFF. The clock input terminal C of the flip-flop CMFF is connected to the Q1 output terminal of the flip-flop FF1, and the flip-flop CMFF is set by the Q1 output of the flip-flop FF1. The reset input terminal R of the flip-flop CMFF is connected to the output terminal of the AND gate AND3 through an OR gate OR3. The input terminal A1 of the AND gate AND3 is connected to the output terminal "64" of the counter CC1 and the input terminal A2 thereof is connected to the Q output terminal of the flip-flop FF3. The flip-flop CMFF is reset when the counter CC1 has counted 64 clock pulses CP during the stop sequence, to thereby stop the capstan motor Mc. PMgFF is a D-type flip-flop for driving the pinch roller magnet and a voltage Vcc is applied to the D input of the flip-flop PMgFF. The clock input terminal C of the PMgFF is connected to the Q1 output terminal of the flip-flop FF1, and the flip-flop PMgFF is set by the Q1 output during the start sequence to energize the coil PCL1 of the electromagnet means PMg shown in FIG. 3. The reset input terminal of the flip-flop PMgFF is connected to the output terminal of an AND gate AND4 through an OR gate OR4. The AND gate AND4 has two input terminals, one of which is connected to the output terminal "32" of the counter CC1 and the other input terminal is connected to the Q1 output terminal of the flip-flop FF1. The output terminal of the AND gate AND4 is connected to one input terminal of the OR gate OR4 having two input terminals. The output terminal of the OR gate OR4 is connected to the reset terminal R of the flip-flop PMgFF. The flip-flop PMgFF is designed so as to be reset when the counter CC1 has counted 32 pulses. FMFF is a flip-flop for driving the film motor, and a voltage Vcc is applied to the D input terminal of the flip-flop FMFF. The clock input terminal C of the flip-flop FMFF is connected to the input terminal of an AND gate AND5, and the reset terminal R thereof is connected to the output terminal of an OR gate OR5. The A1 input terminal of the AND gate AND5 is connected to the A1 input terminal of the AND gate AND4, the A2 input terminal thereof is connected to the output terminal "32" of the counter CC1, and the A3 input terminal thereof is connected to the output terminal "128" of the counter CC1. One input terminal of an OR gate OR6 having two input terminals is connected to the Q output terminal of the flip-flop FF3. The flip-flop FMFF may be set when the counter CC1 has counted 96 clock pulses during the start sequence, to thereby drive the film drive motor MF, and may be reset in response to the stop sequence control signal. SRFF is a D-type flip-flop for putting out a recording signal for effecting the recording by the above-described recording circuit. A voltage Vcc is applied to the D input terminal of the flip-flop SRFF, and the clock input terminal C of the flip-flop SRFF is connected to the output terminal of an AND gate AND6 while the reset terminal R thereof is connected to the output terminal of an OR gate OR6. One input terminal A1 of the AND gate AND6 is connected to the Q1 output terminal of the flip-flop FF1 and the other input terminal A2 thereof is connected to the output "128" of the counter CC1. One input terminal of the OR gate OR6 having two input terminals is connected to the Q output terminal of the flip-flop FF3. The flip-flop SRFF may be set when the counter CC1 has counted 128 clock pulses during the start sequence, and may be reset in response to the stop sequence control signal.

SMgFF is a D-type flip-flop for driving the stop magnet. A voltage Vcc is applied to the D input terminal of the flip-flop SMgFF, and the clock input terminal C of the SMgFF is connected to the Q output terminal of the flip-flop FF3 while the reset terminal R thereof is connected to the output terminal of an AND gate AND7 through an OR gate OR7. One input terminal A1 of the AND gate AND7 is connected to the Q output of the flip-flop FF3 while the other output terminal A2 is connected to the output terminal "32" of the counter CC1. The flip-flop SMgFF may be set in response to the sequence control signal and may be reset when the counter CC1 has counted 32 clock pulses CP during the stop sequence.

AND8, AND9 and AND10 are AND gates each having two input terminals. One input terminal of the AND gate AND8 is connected to the Q output terminal of the flip-flop CMFF, one input terminal AND9 is connected to the Q output of the flip-flop PMgFF, and one input terminal of the AND gate AND10 is connected to the Q output terminal of the flip-flop SRFF. The other input terminals of the AND gate AND8, AND9 and AND10 are commonly connected to the switch SW10 which is closed by displacement of the cassette type detecting member 55 when the sound film cassette C2 is loaded in the cassette-receiving chamber 1a and when the cassette type detecting member is pushed by a portion of the cassette C2 and retracted from within the chamber 1a. When the switch SW10 is closed, a high-level signal is applied to each of the input terminals connected to the switch SW10. Accordingly, the Q outputs of the flip-flops CMFF, PMgFF and SRFF are applied as input to circuits to be described only when the switch SW10 is closed, namely, when the sound film cassette C2 is loaded in the chamber 1a. C1 is a capacitor, and R1 a resistor. These capacitor and resistor C1 and R1 together constitute a time constant circuit. The output terminal b of the time constant circuit is connected to the other input terminals of the OR gates OR1, OR3, OR4, OR5, OR6 and OR7.

The time constant circuit is designed to put out a power up clear signal PUC from its output terminal b momentarily when the main switch $SW_M$ operatively associated with the operation of the operating knob 4 shown in FIG. 2A is closed. EE is a known automation aperture control circuit having a metering circuit. The control circuit EE is connected to an EE switch $SW_E$ which may be closed by a first stroke of the trigger means comprising the trigger button 10 and the trigger plate 56. CT1 is a binary counter. The reset input terminal of the counter CT1 is connected to the switch $SW_E$ through an inverter TDIN1, the clock input terminal C thereof is connected to the output terminal of an AND gate TDA1, and the output terminal "512" is connected to the other input terminal of the AND gate TDA1. The AND gate TDA1 has two input terminals, to one of which is applied the clock pulse CP and the other input terminal is connected to the output terminal "512" of the counter CT1 through an inverter TDIN2. The AND gate TDA1, the inverters TDIN1 and TDIN2 and the counter CT1 together constitute a timer circuit for putting out a trigger signal to other circuits after the aperture control circuit EE has become stable in operation after the triggering operation of the trigger means was started. The flip-flops FF1, FF2, FF3, CMFF, PMgFF, FMFF, SRFF and SMgFF are set in synchronism with the rising of the pulse and the counter CC1 effects counting operation in synchronism with the falling of the pulse. In the drawing, the light receiving element 141 comprising a phototransistor and the lamp 140 indicated by dotted line show an electrical switch shown in FIG. 6, and these show a modification for detecting the shutter rotation, instead of the switch SW1.

Figure 16A:
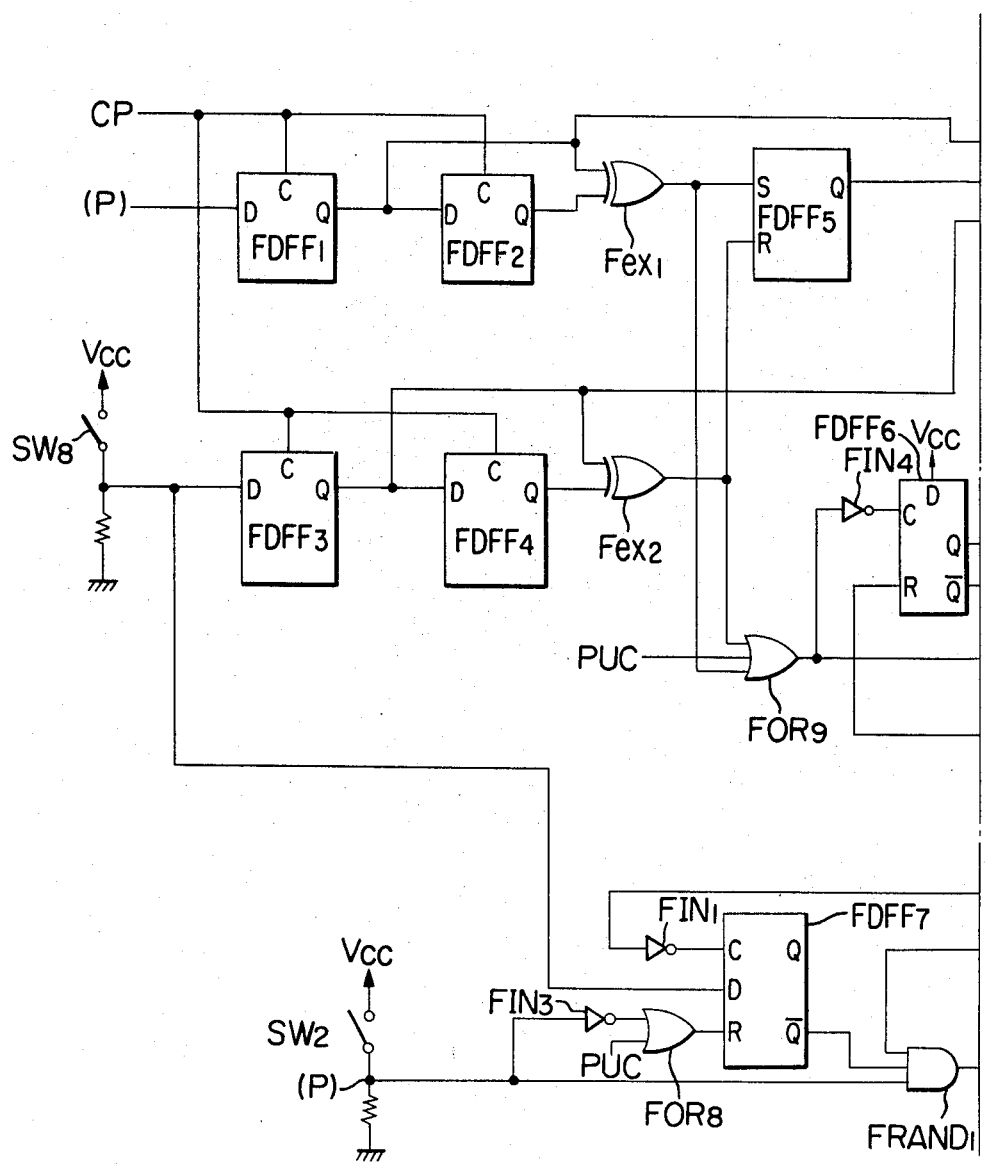
FIG. 16 is a circuit diagram showing an embodiment of the control circuit used with the sequence control circuit of FIG. 15 and suitable to effect fading of images and sounds in the cine camera of the present invention shown in FIGS. 2 to 14.

FIG. 16 shows an embodiment of the control circuit switched to effect fading of images and sounds in the cine camera according to the present invention shown in FIGS. 2 to 14, the control circuits being used with the sequence control circuit shown in FIG. 15. In FIG. 16, FDFF1 is a D-type flip-flop. The D input terminal of the flip-flop FDFF1 is connected to the switch SW2 which is closed by a second stroke of the trigger means comprising the trigger button 16 and the trigger plate 56, the Q output terminal thereof is connected to the D input terminal of a D-type flip-flop FDFF2, and the C input terminal thereof is connected to the unshown clock pulse oscillator for generating clock pulse of 1 millisecond period. Fex1 is an exclusive or gate having two input terminals. One input terminal of the gate Fex1 is connected to the Q output terminal of the flip-flop FDFF1 and the other input terminal is connected to the Q output terminal of the flip-flop FDFF2. The gate Fex1 and the flip-flops FDFF1 and FDFF2 together constitute a pulse generating circuit for generating a single pulse when the switch SW2 shifts from ON to OFF position or vice versa. FDFF3 and FDFF4 are also D-type flip-flops. The D input terminal of the flip-flop FDFF3 is connected to the switch SW8 controlled by the rotation of the fade photography operating member 7 and the Q output thereof is connected to the D-input terminal of the flip-flop FDFF4. The clock pulse CP is applied as input to the C input terminal of the FDFF3. Fex2 is an exclusive or gate having two input terminals, one of which is connected to the Q output terminal of the flip-flop FDFF3 and the other input terminal is connected to the Q output terminal of the flip-flop FDFF4. The clock pulse CP is also applied as input to the C input terminal of the flip-flop FDFF4. These flip-flops FDFF3 and FDFF4 and the gate Fex2 together constitute a pulse generating circuit identical to the above-described pulse generating circuit. This pulse generating circuit generates a single pulse when the fade photography operating member 7 is rotated counter-clockwisely and the switch SW8 is shifted from OFF to ON position by the projection 7b of the member 7 and when the member 7 is returned clockwisely to shift the switch SW8 from ON to OFF position. FDFF5 is an RS flip-flop. The set input terminal S of this flip-flop FDFF5 is connected to the output terminal of the exclusive or gate $Fex_1$, and the reset input terminal R thereof is connected to the output terminal of the exclusive or gate $Fex_2$ having two input terminals. One input terminal of the exclusive or gate $Fex_2$ is connected to the output terminal of the flip-flop circuit FDFF and the other input terminal thereof is connected to the Q output of the flip-flop FDFF4. FDC1 is a decoder. The A input terminal of the decoder FDC1 is connected to the Q output terminal of the flip-flop FDFF1, the B input terminal thereof is connected to the Q output terminal of the flip-flop FDFF5, the C input terminal thereof is connected to the Q output terminal of the flip-flop FDFF1, and the D input terminal thereof is connected to the Q output terminal of the flip-flop FDFF6. The decoder FDC1 discriminates the condition of the switches SW2 and SW8, discriminates whether the operation to be executed is fade-in or fade-out and puts out a fade-in or fade-out signal from its predetermined output terminal. Of the plurality of output terminals of the decoder FDC1, the output "1" is a signal output terminal for effecting five-second fade-in operation, the output terminal "5" is a signal output terminal for effecting five-second fade-out operation, the output terminal "4" is a signal output terminal for effecting 2.5-second fade-out operation, and the output terminals "0" and "2" are signal output terminals for effecting 2.5-second fade-in operation. FOR1 is an OR gate having two input terminals, one of which is connected to the output terminal "2" of the decoder FDC1 and the other is connected to the output terminal "0" of the decoder FDC1. The output terminal of the OR gate FOR1 is connected to one input terminal of an OR gate FOR2 having two input terminals. The other input terminal of the OR gate FOR2 is connected to the output terminal "1" of the decoder FDC1. The output signal of the OR gate FOR2 acts as the fade-in operation signal. FOR3 is an OR gate having two input terminals, one of which is connected to the output terminal "5" of the decoder FDC1 and the other is connected to the output terminal "4" of the decoder FDC1. The output signal of the gate FOR3 acts as the fade-out operation signal. FOR4 is an OR gate having two input terminals, one of which is connected to the output terminal "1" of the decoder FDC1 and the other is connected to the output terminal "5" of the decoder FDC1. The output signal of the gate FOR4 acts as the 5-second operation signal. FOR5 is an OR gate having two input terminals, one of which is connected to the output terminal "4" of the decoder FDC1 and the other is connected to the output terminal of the OR gate FOR1. The output signal of the gate FOR5 acts as the 2.5-second operation signal. FAND1 is an AND gate having three input terminals, one of which is connected to the output terminal of the OR gate FOR1. The AND gate FAND1 is for transmitting the fade-out operation signal to the motor drive circuit for controlling the shutter opening angle to be described. FAND2 is an AND gate having two input terminals, one of which is connected to the output terminal of the OR gate FOR2. This AND gate FAND2 is for transmitting the fade-in operation signal to the motor drive circuit for controlling the shutter opening angle. FAND3 is an AND gate having two input terminals, to one of which is applied the clock pulse CP and the others is connected to the Q output of the flip-flop FDFF6. FCC1 is a binary counter. FAND2 is an AND gate having three input terminals, one of which is connected to the output terminal of an OR gate FOR4 and the other two are connected to the output terminals "4096" and "1024" of the counter FCC1, respectively. FAND5 is an AND gate having three input terminals, one of which is connected to the OR gate FOR5 and the other two are connected to the output terminals "512" and "2048" of the counter FCC1, respectively. The output terminals of the AND gates FAND4 and FAND5 are connected to different input terminals of the OR gate FOR1 having two input terminals, and the output terminal of the OR gate FOR6 is connected to the reset input terminal of the flip-flop FDFF6. The circuits FDFF6, FCC1, FAND3, FAND4, FAND5 and FOR6 together constitute a timer circuit for controlling the fade time. FOR7 is an OR gate having two input terminals, to one of which is applied to clock pulse CP and the other input terminal is connected to the output terminal of the OR gate FOR5. The output terminal of the gate FOR7 is connected to the other input terminals of the AND gates FAND1 and FAND2. The output terminal of the gate FOR7 puts out a signal for controlling the execution speed of the fade operation. FDFF7 is a D-type flip-flop for controlling the release stop operation during fading. The C input terminal of the flip-flop FDFF7 is connected to the output terminal "5" of the decoder FDC1 through an inverter FIN1, the D input terminal thereof is connected to the switch SW8, the reset input terminal R thereof is connected to the switch SW2 through the OR gate FOR8 and an inverter FIN3, the $\bar{Q}$ output terminal thereof is connected to one input terminal of the AND gate FAND1 having three input terminals. Of the other two input terminals of the AND gate TRAND1, one is connected to the switch SW2 and the other is connected to the output terminal "4" of the decoder FDC1 through an inverter FIN2. SW7 is a normally closed switch shown in FIGS. 6 and 7 which is adapted to be opened only when the angle of opening formed by the shutter blades 71, 72 and 73 is O, namely, when the shutter is fully closed. The switch SW7 is connected to the input terminal of the AND gate FAND1 through an inverter FIN3. FOR9 is an OR gate and FIN4 is an inverter. Each of the flip-flops constituting the circuit of FIG. 16 is designed to be set in synchronism with the rising pulse and the counters FDC1 and FCC1 are designed to count the falling pulse.

FIG. 17 shows in detail the control circuit controlled by the control circuit of FIGS. 15 and 16 and for individually controlling each mechanism of the cine camera shown in FIGS. 2 to 14. FIG. 17A is a circuit diagram of an embodiment of the driving circuit for controlling the drive of the motor Mc and the driving circuit for driving the electromagnet means PMg.

The portion encircled by dotted line A is a capstan motor driving circuit, and the portion encircled by dotted line B is a pinch roller magnet driving circuit. Tr1, Tr2 and Tr3 are switching transistors. The base of the transistor Tr1 is connected to the output terminal of the AND gate AND8 shown in FIG. 15, through a resistor r1, and the collector thereof is connected to the base of the transistor Tr2. A voltage Vcc is applied to the emitter of the transistor Tr2, and the input terminal of a speed control circuit SCIC is connected to the collector of the transistor Tr2. The transistor Tr3 has the base thereof connected to the output terminal of the speed control circuit SCIC1 through a resistor r2, and the collector connected to the motor Mc. The transistors Tr1, Tr2, Tr3, resistors r1, r2, motor Mc, and speed control circuit SCIC together constitute a capstan motor driving circuit. The speed control circuit SCIC may be IC No. TCA955 commercially available from Siemens, Germany. Tr4 and Tr5 are power supply switching transistors. The base of the transistor Tr4 is connected to the output terminal of the AND gate AND9, shown in FIG. 15, through a resistor r3, and the collector thereof is connected to the base of the transistor Tr5 through a resistor r4. A voltage Vcc is applied to the emitter of the transistor Tr5 and the collector of this transistor is connected to the collector of a transistor Tr2 through a resistor r5 and to the electromagnetic coil PLC of the electromagnet means PMg shown in FIG. 3.

Figure 17A:
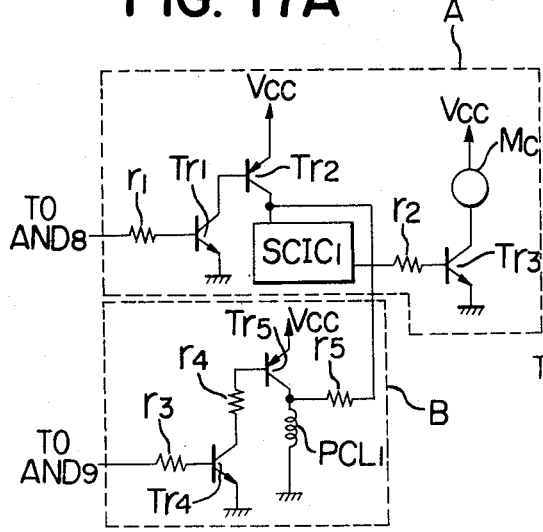
FIG. 17 shows a control circuit controlled by the control circuit of FIG. 16 and for individually controlling the various mechanism shown in FIGS. 2 and 14, FIG. 17(A) showing an embodiment of the driving circuit for driving the drive circuit for controllling the drive of the capstan drive motor Mc and for driving the electromagnet device PMg, FIG. 17(B) diagrammatically showing an embodiment of the film motor driving circuit for controlling the drive of the motor MF for operating the film feeding mechanism and the shutter rotating driving mechanism, FIG. 17(C) diagramatically showing an embodiment of the recording circuit, FIG. 17(D) being a detailed view of the sound fade control circuit, FIG. 17(E) being a circuit diagram showing an embodiment of the driving circuit for driving the electromagnet device FMg shown in FIG. 3, FIG. 17(F) showing an embodiment of the driving circuit for effecting the drive control of a motor Ms for varying and regulating the angle of opening of the shutter formed by the shutter blades 71, 72 and 73 shown in FIG. 6, FIG. 17G being a circuit diagram showing in detail the amplifier SAmP1 shown in FIG. 17C, FIG. 17H being a circuit diagram showing in detail the AGC variable impedance element AGCI1, shown in FIG. 17C, FIG. 17I being a circuit diagram showing in detail the rectifier circuit SRC shown in FIG. 17C, FIG. 17J being a circuit diagram shown in detail the monitor circuit SMN1 shown in FIG. 17C, FIG. 17K being a circuit diagram showing in detail the bias signal oscillator SBDSC shown in FIG. 17C, and FIG. 17L being a circuit diagram shown in detail the superposing circuit SSI1 shown in FIG. 17C.
Figure 17B:
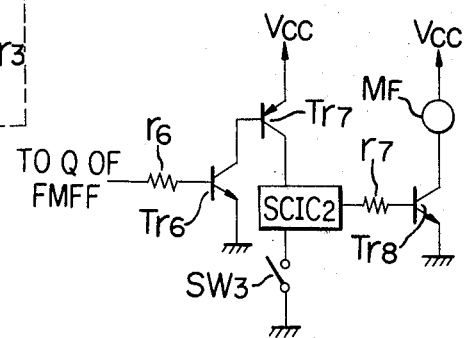

FIG. 17B is a circuit diagram showing an embodiment of the film motor driving circuit for controlling the drive of the motor MF. Tr6, Tr7 and Tr8 are switching transistors. The base of the transistor Tr6 is connected to the Q output of the flip-flop FMFF$_1$ shown in FIG. 15, through a resistor r6, and the collector thereof is connected to the base of the transistor Tr7. A voltage Vcc is applied to the emitter of the transistor Tr7 and the collector of this transistor is connected to the input terminal of a speed control circuit SCIC2, which may be IC No. TCA955 commercially available from Siemens, Germany. The base of the transistor Tr8 is connected to the output terminal of the speed control circuit SCIC2 through a resistor r7, and the collector thereof is connected to the motor MF1. The switch SW3, which is controlled by the loop detecting member 33, is connected to the speed control circuit SCIC2, which controls the motor MF to a rotational speed sintered for the intermittent film feeding mechanism including the pull-down claw to transport the film F2 at a rate of about 20 frames per second when the switch SW3 is closed, and to a rotational speed sintered for the intermittent film feeding mechanism to transport the film F2 at a rate of about 16 frames per second when the switch SW3 is open.

Figure 17C:
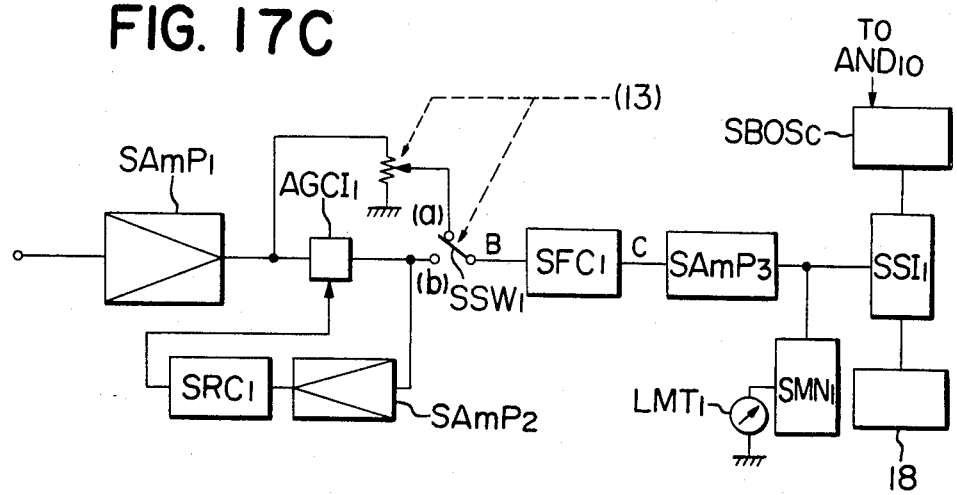

FIG. 17C is a circuit diagram showing an embodiment of the recording circuit. SAmP1 is an amplifier to which is applied audio signal from a microphone. This amplifier is constructed as shown in FIG. 17G. AGCI1 is an automatic gain control variable impedance element constructed as shown in FIG. 17H. The output terminal of this AGCI1 is connected to the input terminal of an amplifier SAmP2 which is identical in construction to the SAmP1. The output terminal of the amplifier SAmP2 is connected to the control terminal of the impedance element AGCI1 through a rectifier circuit SRC1 shown in FIG. 17I. The AGCI1, SAmP2 and SRC1 together constitute a known AGC circuit which regulates the sound level of input audio signal. SFC1 is a sound fade control circuit which is more fully shown in FIG. 17D. The input terminal B of the sound fade control circuit SFC1 is connected to a switch SSW1 associated with the dial 13, shown in FIG. 2A, and to the input terminal of the amplifier SAmP3. The sound fade control circuit SFC is for increasing or decreasing the output level of the AGC circuit as a function of time during the sound fade operation and transmitting the same to the amplifier SAmP3. SMN1 is a monitor circuit connected to the output terminal of the amplifier SAmP3 and is constructed as shown in FIG. 17J. LMT1 is a bell meter, and SBOSC is a bias signal oscillator for putting out a bias constructed as shown in FIG. 7K. The oscillator SBOSC is designed to operate in response to the high-level output of the AND gate AND10 of FIG. 15. SSI1 is a superimposing circuit for superimposing the bias and the audio signal which is the output of the amplifier SAmP3 and transmitting the same to head 18, and is constructed as shown in FIG. 17L.

Figure 17D:
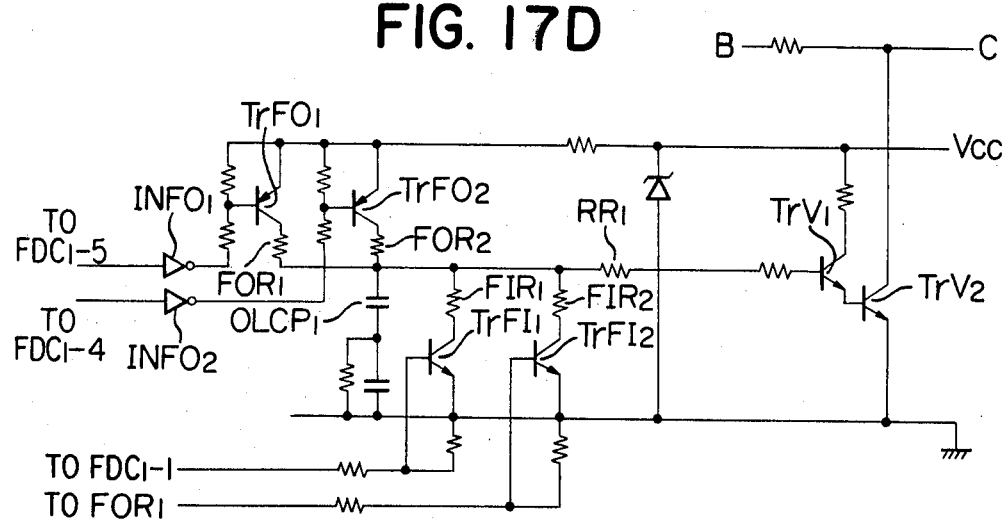

In FIG. 17D which shows in detail the construction of the sound fade control circuit, INFO1 is an inverter whose input terminal is connected to the output terminal "5" of the decoder FDC1 of FIG. 16 and whose output terminal is connected to a transistor TrFO1 through a resistor. The transistor TrFO1 is designed to conduct in response to the D-level signal from the inverter INFO1. FOR1 is a resistor connected to the collector of the transistor TrFO1, and OLCP1 is a capacitor. By the time constant (about 5 sec.) of the resistor FOR and the capacitor OLCP1, the fade-out time of sound is determined. TrFI1 is a transistor whose base is connected to the output terminal "1" of the decoder FDC1 shown in FIG. 16. FIR1 is a resistor for determining the fade-in time (about 5 seconds) of sound. INFO2 is an inverter connected to the output terminal "4" of the decoder FDC1, FrFO2 is a transistor adapted to conduct in response to the D-level signal from the inverter INFO2, and FOR2 is a resistor. The resistor FOR2 and the capacitor OLCP1 together constitutes a time constant circuit. The resistance values of the resistors FOR1 and FOR2 are determined so that the time constant of the time constant circuit constituted by the resistor FOR2 and the capacitor OLCP1 is one-half of the time constant of the time constant circuit constituted by the resistor FOR1 and the capacitor OLCP1. TrFI2 is a transistor whose base is connected to the output terminal of the OR gate FOR1 shown in FIG. 16. FIR2 is a resistor for determining the fade-in time of sound. The resistance value of the resistor FIR2 is determined so as to be about one-half of the fade-in time of sound determined by the resistor FIR1. PR1 is a resistor having a great resistance value. TrV1 and TrV2 are transistors forming variable impedance elements and are designed to exhibit impedance values corresponding to the output of the capacitor OLCP1.

Figure 17E:
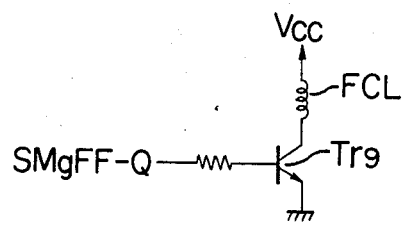

FIG. 17E is a circuit diagram showing an embodiment of the drive circuit for driving the electromagnet means shown in FIG. 3. Tr9 is a transistor whose base is connected to the Q output terminal of the flip-flop SMgFF shown in FIG. 15 and whose collector is connected to the exciting coil FCL of the electromagnet means FMg.

Figure 17F:
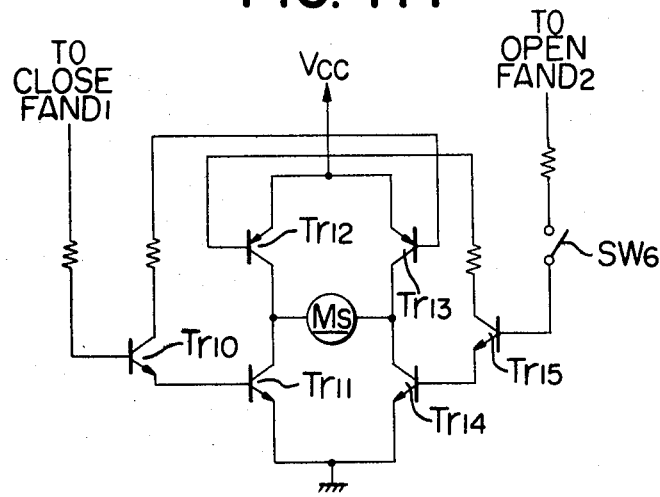
Figure 17G:
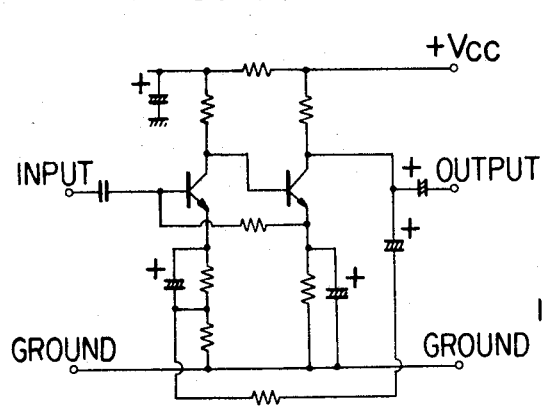
Figure 17H:
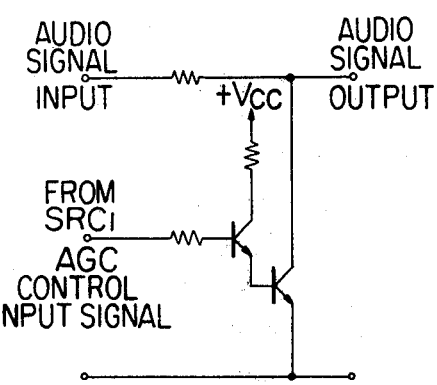
Figure 17I:
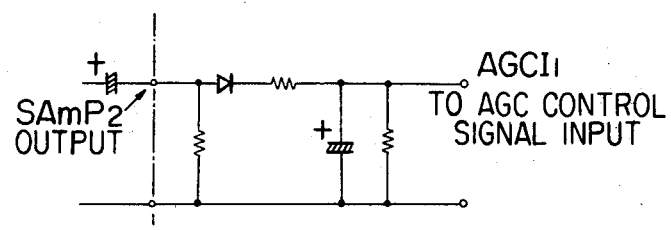
Figure 17J:
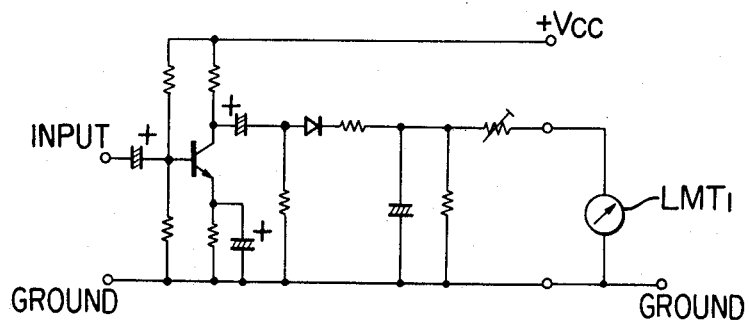
Figure 17K:
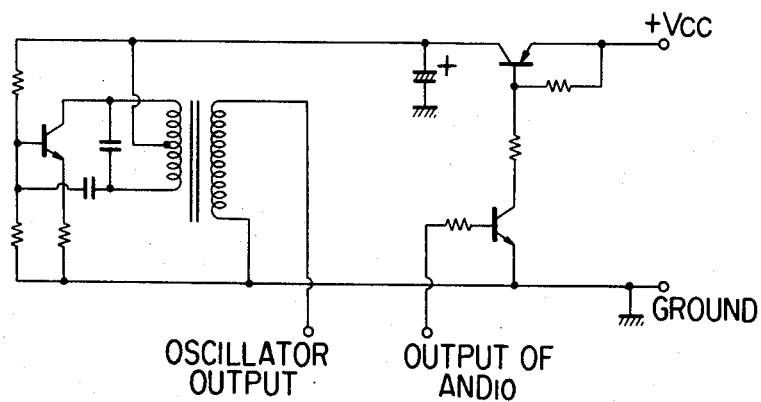
Figure 17L:
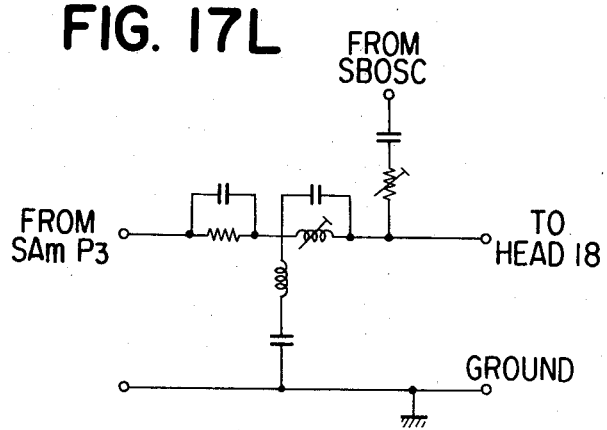

FIG. 17F shows an embodiment of the driving circuit for motor MS for adjusting the opening angle of the shutter formed by the shutter blades 71, 72 and 73 shown in FIG. 6. Transistors Tr10 to Tr15 constitute a switching circuit for selectively effecting normal direction rotation and reverse direction rotation of the motor Ms. The transistors Tr10, Tr11 and Tr13 are switching transistors which are concerned with the normal direction rotation of the motor Ms and which constitute a power supply circuit for causing the fade mechanism shown in FIGS. 3 and 6 to effect fade-out operation. The base of the transistor Tr10 is connected to the output terminal of the AND gate FAND1. The transistors Tr12, Tr14 and Tr15 are switching transistors which are concerned with the reverse direction rotation of the motor Ms and which causes the fade mechanism to effect fade-in operation. The base of the transistor Tr15 is connected to the output terminal of the AND gate FAND2, shown in FIG. 15, through the switch SW6 shown in FIG. 6 which is opened when the shutter is fully open, namely, when the shutter opening angle is about 220°.

Operation of the control circuits shown in FIGS. 15 to 17 will now be described in conjunction with the construction of the cine camera according to the present invention shown in FIGS. 2 to 14.

Description will first be made of the normal photography in which images and sounds are recorded simultaneously by the use of the film cassette C2 shown in FIG. 1B.

Figure 4:
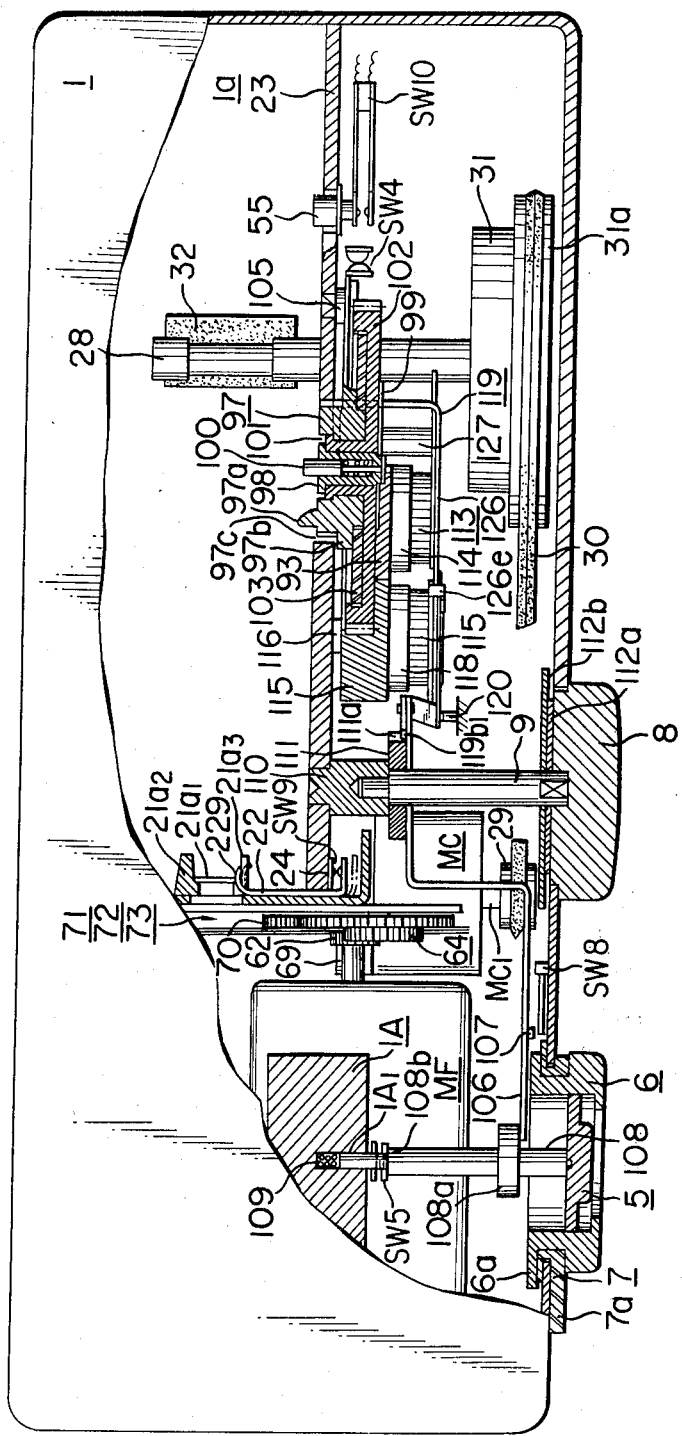
FIG. 4 is a cross-sectional view taken along line IV-IV of FIG. 2(A) but with the photographic lens structure and eye cap being omitted.

When the cover 17 is opened to load the film cassette C2 in the cassette-receiving chamber 1a and the film cassette C2 is loaded therein, the detecting member 55 so far projected into the chamber 1a is displaced outwardly of the chamber 1a so that the switch SW10 is closed and the film F2 existing in the exposure opening C2a of the film cassette C2 is disposed on the film gate plate 21a, whereby the detecting piece 22 is displaced downwardly in FIG. 4, thus closing the switch SW9. In this state, the cover 17 is open and the magnetic head 27, and the pad 26, the capstan 28 and the pinch roller 32 are greatly spaced apart from each other so that the film F2 existing in the recording opening C2b of the cassette C2 can be readily charged into between the magnetic head 27 and the pad 26 and into between the capstan 28 and the pinch roller 32.

After the cassette C2 has been so loaded into the predetermined location in the chamber 1a and when the cover 17 is closed, the projection 39a of the pivotable member 39 projected from the aperture 1c of the camera body 1 is pushed in by the projection 17b of the cover 17 to rotate the pivotable member 39, so that the pinch roller 32 is brought from its rest position indicated by dot-and-dash line to its preparatory position indicated by solid line.

Thereafter, when the main switch SW$_M$ is closed, a voltage Vcc is applied to one input terminal of each of the AND gates AND8-AND10 shown in FIG. 15. At the same time, the voltage Vcc is applied to the time constant circuit comprising the capacitor C1 and the resistor R1. At the output terminal (b) of the time constant circuit, a high-level signal is generated for a momentary time determined by the time constant of the time constant circuit and the high-level signal is applied to the reset input terminal R of the counter CC1 through the OR gate OR1, thereby resetting the counter CC1. The high-level signal from the output terminal (b) of the time constant circuit is transmitted through the OR gates OR2-OR7 to the reset input terminals R of the flip-flops CMFF, PMgFF, FMFF, SRFF and SMgFF to reset all these flip-flops. At the same time, the signal from the output terminal (b) of the time constant circuit is transmitted to the OR gates FOR2 and FOR3 to thereby reset the flip-flop FDFF7 and the counter FCC1. Therefore, the signals from the output terminal of the counter FCC1, all become low-level signals, so that low level signals are transmitted to the reset input terminal R of the flip-flop FDFF6, which is thus released from its reset condition. At this time, the signal from the output terminal (b) of the time constant circuit is applied to the clock input terminal C of the flip-flop FDFF6 through the OR gate FOR9 and through the inverter FIN4, so that this flip-flop is released from its reset condition, and then this flip-flop is set to put out a high-level signal from the Q output terminal and put out a low-level signal from the $\bar{Q}$ output terminal. Thus, the AND gate FAND3 is opened and transmits the clock pulse of 1 m/s period to the counter FCC1, which thus starts counting. On the other hand, low level signal is being imparted to the input terminal D of the decoder FDC1 from the $\bar{Q}$ output of the flip-flop FDFF6 as already noted. However, in the condition wherein the cassette C2 is loaded in the camera and the main switch is closed, the switch SW2 and switch SW8 are open, so that both the flip-flops FDFF1 and FDFF3 are putting out low-level signals from their Q output terminals and thus, low-level signals are also being applied to the input terminals A and C of the decoder FDC1. Thus, the decoder FDC1 puts out high-level signal only from its output terminal 0 or 2, irrespective of the signal condition of the input terminal B, and the output of the OR gate FOR1 is high-level signal. Therefore, the signal is transmitted through the OR gate FOR2 to one input terminal of the AND gate FAND2. The high-level signal from FOR1 is applied to one input terminal of the AND gate FAND5 through the OR gate FOR5 and also to the other input terminal of the AND gate FAND2 through the OR gate FOR7. Therefore, the AND gate FAND2 puts out high-level signal, which is transmitted to the base of the transistor Tr15 through the switch SW6 of FIG. 17F when the shutter formed by the shutter blades 71, 72 and 73 is fully open and controlled to ON position by the cam ring 81, thereby turning on the transistors Tr15, Tr14 and Tr12 and rotate the opening angle control motor Ms in normal direction. At this time, the cam ring 81 rotated by the rotation of the motor Ms displaces the sliding member 76 leftwardly in FIG. 6 to control the shutter so as to be fully open. The shutter is being thus driven toward the fully open position while, on the other hand, the counter FCC1 is counting the pulse CP of 1 mm/s period as already noted, and when the counter counts 2560 pulses, it puts out high-level signal from the output terminals 2048 and 512. That is, about 2.5 seconds after the control of the opening angle of the shutter is started, the high level signal is put out from the output terminals 2048 and 512 of the counter FCC1.

Therefore, the AND gate FAND3 puts out high-level signal which is transmitted through the OR gate FOR6 to the reset input terminal R of the flip-flop FDFF6, thus resetting the flip-flop FDFF6. Therefore, the flip-flop FDFF6 puts out low-level signal from its output terminal Q and high-level signal from its output terminal $\bar{Q}$ to close the AND gate FAND3 and stop the counting operation of the counter FCC1 while transmitting the high-level signal to the input terminal D of the decoder FDC1. Thus, the high-level signal which has so far been put out from the output terminal 0 or 2 of the decoder FDC1 disappears and the high-level signal from the AND gate FAND2 is changed to low level signal. Accordingly, if the shutter opening angle is 0, namely, the shutter is fully closed where the main switch SW$_M$ is closed, the motor Ms is continuously driven for the time during which the high-level signal of the AND gate FAND2 is changed to low-level signal, namely, for 2.5 seconds, whereafter the transistors Tr15, Tr14 and Tr12 are turned off to stop the motor and open the switch SW6. In this condition, the shutter has changed from its fully closed position to its fully open position having the shutter opening angle of 220°. Therefore, even if the shutter opening angle is in the midway of 0° to 220° when the main switch SW$_M$ is closed, the motor Ms is rotated in normal direction and continues its rotation until the switch SW6 is opened with the shutter being fully open. Also, if the shutter opening angle is 220° or the shutter is fully open when the main switch SW$_M$ is closed, the switch SW6 is open so that no current flows to the motor 121, thus saving the electric power. In this manner, control is effected so that the shutter opening angle is 220°, i.e. the shutter is fully open, before photographing, and the high-level signal put out from the OR gate FOR1 for 2.5 seconds as described is transmitted to the base of the transistor TrF12 of FIG. 17D, thus turning on the transistor TrF12. Therefore, where the capacitor OLCP1, is already charged, the charge therein is discharged through the resistor FIR2 to turn off the transistors Tr1 and Tr2. Accordingly, the sound fade control circuit C of FIG. 17C becomes inoperative to directly transmit the signal level at the input terminal B to the output terminal C. In this manner, the shutter opening angle and the recording level are controlled for normal photography before the photographing is started. In this condition, when the trigger button 16 is depressed to displace the trigger plate 56 rightwardly in FIG. 3, the EE switch SW$_E$ is pushed by the step 56$b_1$ of the trigger plate 56 in the first stroke of the trigger plate 56, so that this switch SW$_E$ is closed to operate the known automatic aperture control circuit EE comprising a metering circuit or the like, thus controlling the aperture in accordance with the brightness.

The counter CT1 is released from its reset condition by the closing of the switch SW$_E$ and counts the clock pulse applied through the AND gate TDA1. Therefore, when 512 pulses CP are counted after the closing of the switch SW$_E$, namely, after 512 m/s, high-level signal is put out from the output terminal 512 of the counter CT1 and is transmitted to one input terminal of the AND gate AST1. Therefore, after the closing of the switch SW$_E$ and when the trigger button 16 is depressed to displace the trigger plate 56 rightwardly in FIG. 3, the switch SW1 is pushed by the end 56$b_2$ of the trigger plate 56 in the second stroke thereof to thereby close the switch SW2, and thus, even if high-level signal is put out from the AND gate FRAND1 of FIG. 16 and applied to the other input terminal of the AND gate AST1, the high-level signal which is a trigger signal is not put out from the AND gate AST1 unless 12 mm/s has passed after the closing of the switch SW$_E$. Thus, in the cine camera according to the present invention, trigger signal is not transmitted to the D1 input terminal of the D-type flip-flop FF1 until the operative condition of the aperture control circuit has become stable after the closing of the switch SW$_E$.

After the switch SW$_E$ is so closed in the first stroke of trigger, and when the switch SW2 is closed in the second stroke of trigger, the output of the AND gate FRAND1 becomes high level so that high-level signal is transmitted to one input terminal of the AND gate AST1 of FIG. 15 and, as already described, high-level signal is put out from the AND gate AST1 after the aperture control operation has become stable. Thus, high-level signal is applied to the D input terminal of the flip-flop FF1 and in synchronism with the rising of the clock pulse CP2 of FIG. 18H, the Q1 output terminal of the flip-flop FF1 puts out high-level signal as shown in FIG. 18C. The high-level signal from the Q1 output terminal of the flip-flop FF1 is applied to the clock input terminals C of the flip-flops CMFF and MgFF, so that these flip-flops are set and put out high level signal from their Q output terminal, and such signal is transmitted to one input terminal of each of the AND gate AND8 and AND9. Since, at this time, high-level signal is applied to the other input terminals of the AND gates AND8 and AND9, as already described, the outputs of the flip-flops CMFF and PMgFF are transmitted to the bases of the transistors Tr1 and Tr4 of FIG. 17A. Therefore, the transistors Tr1 and Tr2 are turned on to permit power supply to the capstan motor control circuit SCIC1, by the output of which the transistor Tr3 is controlled to rotate the capstan driving motor Mc. At the same time, the transistors Tr4 and Tr5 are turned on by the output of the flip-flop PMgFF to energize the magnet coil PCL1 in the electromagnet means PMg. When the magnet coil PCL1 is energized, the iron piece 51 of the electromagnet means PMg is attracted to the core 47 and the iron piece 51 and the pivotable member 49 are rotated clockwisely about the pin 48, so that the displacement member 35 is displaced to its operative position by means of the displacement member 36 to bring the capstan 28 into resilient engagement with the pinch roller 32 with the film F2 nipped therebetween. By this, the constant speed feeding of the film F2 is started.

After the capstan driving motor Mc and the electromagnet means PMg are controlled in synchronism with the clock pulse CP2 and when the clock pulse CP2 is applied to the clock input terminal C of the flip-flop FF2, this flip-flop is set in synchronism with the rising of CP3 and the output thereof puts out high-level signal as shown in FIG. 18D. Therefore, the output terminals Q1 and Q2 of the flip-flops FF1 and FF2 and the exclusive or gate ex$_1$ to which the input terminals of these flip-flops are connected come to put out single pulse as shown in FIG. 18B, and the single pulse is transmitted to the reset input terminal R of the counter CC1 through the OR gate OR1, so that the counter CC1 is again reset. Thus, the output terminal 128 of the counter CC1 becomes low level, and high-level signal is transmitted to the A3 input terminal of the AND gate AND1 through the inverter IN1. The Q1 output of the flip-flop FF1 is applied to the A1 input terminal of the AND gate AND1 and this output is high level as shown in FIG. 18C, so that the AND gate AND1 is opened after time t1 as shown in FIG. 18F and the pulse after the clock pulse CP3 is transmitted to the clock input terminal C of the counter CC1 through the AND gate AND1 and the OR gate OR2, and thus the counter CC1 starts binary count operation. When the counter CC1 has counted 32 pulses after having started counting, namely, at the point of time t2 whereat the clock pulse CP34 is put out, the output at the output terminal of the counter CC1 is high-level signal, which is transmitted to the A2 input terminal of the AND gate AND7. On the other hand, since the A1 input terminal of the AND gate is connected to the Q1 output terminal of the flip-flop FF1, high-level signal is being applied thereto and at the point of time t2, the AND gate AND4 puts out high-level signal which is transmitted through the OR gate OR4 to the reset input terminal R of the flip-flop PMgFF, which is thus reset at the point of time t2 as shown in FIG. 18B. Therefore, the transistors Tr4 and Tr5 of FIG. 17A are turned off to cut off the power supply to the magnet coil PCL1, but the transistor Tr2 remains conductive so that a holding small current continues to flow to the magnet coil PCL1 of the electromagnet means PMg. Thus, the displacement member 35 continues to be held at an operative position by the coil PCL1 in which the pinch roller 32 and the capstan 28 are in resilient engagement. As already noted, the period of the clock pulse is 1 mm/s and the flip-flop PMgFF continues to be set while 32 clock pulses are counted and so, a heavy current flows to the magnet coil PCL1 for about 32 mm/s, whereafter a small current flows. Why a heavy current is initially supplied to the magnet coil PCL1 and then a small current is supplied is that the magnet coil PCL2 requires a strong attraction at the initial stage of driving and thereafter need not so strong an attraction. Thus, wasteful consumption of power can be prevented.

Figure 19:
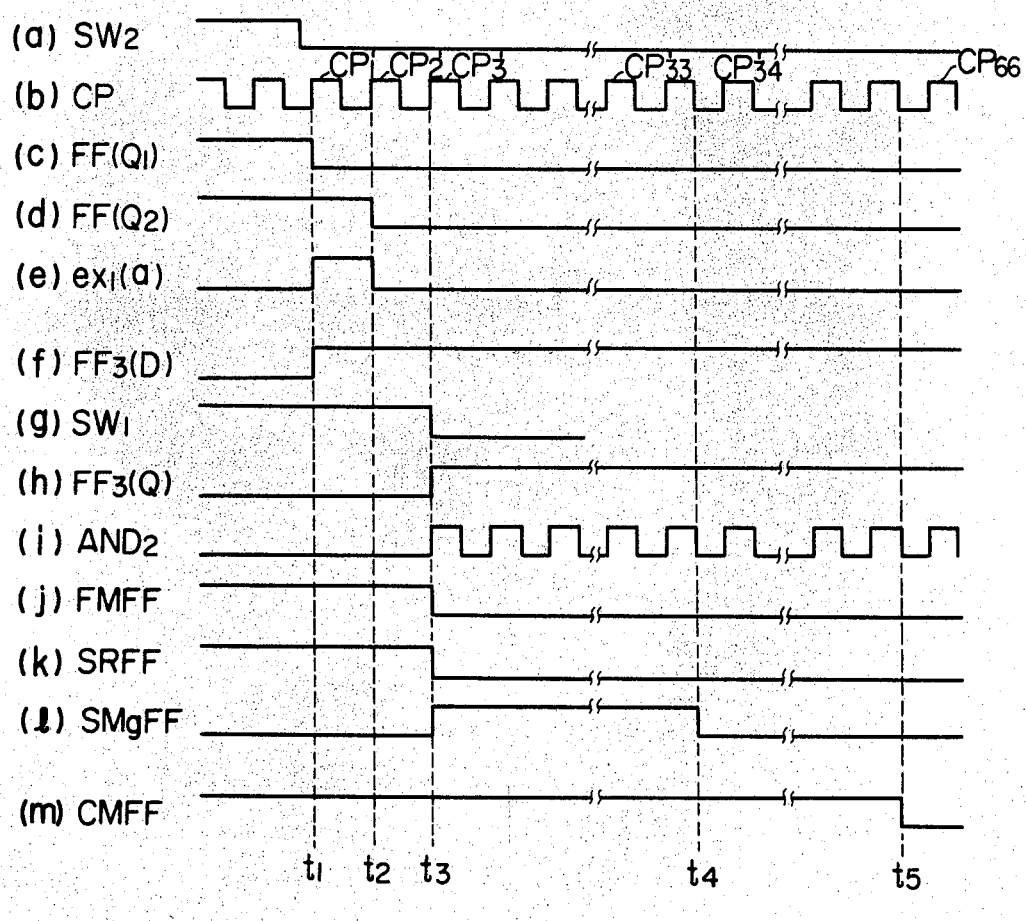
FIG. 19 illustrates the stop sequence operation in the sequence control circuit shown in FIG. 15.

After the flip-flop PMgFF has been so reset by the clock pulse CP34 and at the time point whereat 96 clock pulses have been counted by the counter CC1, namely, at the point of time t3 whereat the clock pulse CP96 has been put out, the output terminals 32 and 64 of the counter CC1 put out high-level signals which are transmitted to the A2 and A3 input terminals of the AND gate AND5 and in addition, high-level signal from the flip-flop FF1 is transmitted to the A1 input terminal of the AND gate AND3, so that at the point of time t3, the flip-flop FMFF is set and puts out high-level signal from its Q output terminal. By this, the transistors Tr6 and Tr7 of FIG. 17B are turned on to start power supply to the speed control circuit SCIC2 and the transistor Tr8 is turned on under the control of the speed control circuit SCIC2, and thus, the film driving motor M$_F$ starts to rotate in normal direction to thereby start film feeding operation. In this manner, the film driving motor M$_F$ becomes operative in about 96 mm/s only after the counter has counted 96 pulses and then the capstan driving motor Mc has started rotating. Therefore, even if the film F2 in the cassette C2 inserted in the chamber 1$a$ has a slack portion corresponding to several frames of film, the film feeding is always started with such slack removed because only the capstan driving motor Mc rotates for the time of about 96 mm/s, thus preventing the jamming of the film which would otherwise occur when the film feeding is effected with several frames being slackened during the photography. After the film feeding operation has been so started and when the counter CC1 has counted 128 clock pulses, namely, at the point of time t4 whereat the clock pulse CP130 has been generated, the output terminal 128 of the counter CC1 puts out high-level signal which is transmitted to the A2 input terminal of the AND gate AND6. At this time, the high-level signal from the flip-flop FF1 is being applied to the other input terminal A1 of the AND6 so that, at this point of time t4, the flip-flop SRFF is set to put out high-level signal from the Q output terminal, thus generating the above-described recording signal. The Q output terminal of the flip-flop SRFF is connected to one input terminal of the AND gate AND10, to the other input terminal of which is applied high-level signal as already noted, so that the recording signal is transmitted through the AND gate AND10 to the recording circuit of FIG. 17C to permit current supply to the magnetic head 27, thus starting the recording. In this manner, by starting the recording operation in 32 mm/s after 128 pulses have been counted by the counter CC1 since the counting operation thereof was started, namely, after the film driving motor has been started, sound can be recorded on the magnetic recording zone on the film F2 after the film feeding operation has become stable. Thus, as soon as the recording is started upon the pulse CP130, the high-level signal from the output terminal 128 of the counter CC1 is transmitted as low-level signal to the A3 input terminal of AND1 through the inverter IN1, thus stopping the counting operation of the counter CC1. In this manner, the start sequence operation at the start of photography is terminated and the simultaneous recording and photographing of sounds and images is endlessly effected as long as the trigger button 16 is depressed. Photographing is thus started, but since at this time the switch SW2 is closed, the Q output of the flip-flop FDFF1 of FIG. 16 is at high level in the same manner as the operation of the flip-flops FF1 and FF2 of FIG. 15 and the exclusive or gate $ex_1$, and single pulse is put out from the exclusive or gate $Fex_1$ during the triggering, so that the flip-flop FDFF5 is set and its Q output terminal puts out high-level signal which is applied to the input terminals A and B of the decoder FDC1, but the output terminal 3 of the decoder FDC1 affects the other circuits in no way and therefore, the above-described normal photography is executed. During the process of the photography taking place by the above-described operation, when the trigger button 16 is released, the trigger plate 56 is displaced leftwardly in FIG. 3 by the force of the spring 58 to open the switch SW2 as shown in FIG. 19A, so that low-level signals are put out from the AND gates FRAND1 and AST1 and thus, low-level signal is applied to the D1 input terminal of the flip-flop FF1. Therefore, in synchronism with the pulse CP'1 of FIG. 19B, the signal at the output terminal Q1 of the flip-flop FF1 becomes low-level signal at the point of time t1 as shown in FIG. 19C, and such low-level signal is transmitted to the D1 input terminal of the flip-flop FF2, and in synchronism with the pulse CP'2, the flip-flop FF2 puts out low-level signal from its output terminal Q2 at the point of time t2, as shown in FIG. 19D. Also, at the point of time t1, the output of the flip-flop FF1 becomes low level, whereby high-level signal is applied to the D input terminal of the flip-flop FF3 through the inverter IN2 at the point of time t1. Therefore, when the switch SW1 which is ON-OFF controlled by the rotation of the shutter has shifted from its ON position to its OFF position, a rising pulse is transmitted to the clock terminal of FF2 and at this point of time t3, the flip-flop FF3 puts out high-level signal as shown in FIG. 19H, thus putting out the previously described stop sequence signal. Thus, such signal is transmitted to the reset input terminals R of the flip-flops FMFF and SRFF through the OR gates OR5 and OR6 and at the point of time t3, these flip-flops are reset as indicated in FIGS. 19J and 19K. At this point of time t3, the transistor Tr6 of FIG. 17B is turned off, so that the power supply to the speed control circuit SCIC2 is stopped to turn off the transistor Tr3 and the aforementioned power supply path is cut off, thus stopping the power supply to the film driving motor $M_F$ and also stopping the film feed effected by the motor $M_F$. At the same time, the flip-flop SRFF is reset, whereby the recording signal so far applied to the recording circuit of FIG. 17C disappears, thus rendering the pulse oscillator SBOSC inoperative, and the recording operation is terminated at the point of time t3. Also, the stop sequence control signal is applied to the clock input terminal C of the flip-flop SMgFF and therefore, at the point of time t3, the flip-flop SMgFF is set as shown in FIG. 19I to turn on the transistor Tr9 and energize the stop magnet coil FCL of the electromagnet means FMg. When this stop magnet coil FCL is energized, the iron bar 92 is attracted toward the gear 64 and by such displacement of the iron bar 92, the stop member 65 is slidingly displaced toward the blocking recess 64b1 of the gear 64 against the force of the spring 95 and brought into engagement with the recess 64b1, thus stopping the gear 64 at a predetermined position. Why the stop sequence control signal is put out when the switch SW1 has shifted from it ON position to its OFF position is that the shift from ON position to OFF position may take place when the shutter comprising three shutter blades 71, 72 and 73 shifts from a phase in which the aperture is opened to a phase in which the aperture is closed. By energizing the magnet coil FCL in such condition, the shutter may be stopped at a position in which the aperture is closed, by the stop member 65. Also, the aforementioned stop sequence control signal is being transmitted to the A2 input terminal of the AND gate AND2, the A1 input terminal of which is connected to the output terminal "64" of the counter CC1 through the inverter INK, and the counter CC1 is reset by the single pulse generated at the point of time t1 as shown in FIG. 19E, so that low-level signal is put out from the output terminal "64" of the counter CC1 at the point of time t3. Therefore, at the point of time t3, high-level signal is applied to the A1 input terminal of the AND gate AND3 and after the point of time t3, the AND gate AND2 is open as shown in FIG. 19I and thus, the counter CC1 starts counting operation from the point of time t3. In this manner, at the point of time t3, the power supply to the film driving motor $M_F$ is stopped and the stop magnet coil FCL is energized, whereafter the binary count by the counter CC1 is started, and at the point of time t4 whereat 32 clock pulses have been counted, namely, 32 mm/s after the count has been started, the output terminal "32" of the counter CC1 puts out high-level signal. Thus, this signal is transmitted to the A2 input terminal of the AND gate AND7. Also, at this time, the stop sequence control signal from the flip-flop FF3 is applied to the other input terminal A1 of the AND gate AND7, so that the signal from the output terminal "32" of the counter CC1 is transmitted to the reset input terminal R of the flip-flop SMgFF through the AND gate AND7 and OR gate OR7, and the flip-flop SMgFF is reset at the point of time t4. Accordingly, at the point of time t4, the transistor Tr9 of FIG. 19E is turned off to deenergize the stop magnet coil FCL. Thus, the stop magnet coil FCL which has so far attracted the iron bar 92 toward the gear 64 loses its attraction and the stop member 65 comes out of the recess 64b1 of the gear 64. Thereafter, at the point of time t5 whereat 32 clock pulses have been further counted, high-level signal is put out from the output terminal "64" of the counter CC1 and transmitted to the A1 input terminal of the AND gate AND3. Since the stop sequence control signal from the flip-flop FF3 is applied to the other input terminal A2 of the AND gate AND3, the high-level signal from the output terminal "64" of the counter CC1 is transmitted to the reset input terminal of the flip-flop CMFF through the AND gate AND3 and the OR gate OR3, thus resetting the flip-flop CMFF at the point of time t5 as shown in FIG. 19M. Accordingly, the transistors Tr1 and Tr2 are turned off to stop the power supply to the speed control circuit SCIC1, and the transistor Tr3 is turned off to stop the capstan driving motor Mc. The transistor Tr2 is also turned off to cut off all the power supply path to the pinch roller magnet coil PCL1 to deenergize the pinch roller magnet coil PCL1, so that the displacement member 35 is returned to its preparatory position and the pinch roller 32 is returned to the position indicated by solid line in FIG. 3. The high-level signal from the output terminal "64" of the counter CC1 is transmitted as low-level signal to the A1 input terminal of the AND gate AND2 through the inverter IN2, so that at the point of time t5 the AND gate AND2 is closed, thus completing the stop sequence operation which stops the counting operation of the counter CC1, to thereby complete the photographing.

In the above-described stop sequence operation process, the film driving motor $M_F$ is stopped at the point of time t3 and after the counter counts 64 clock pulses, namely, in 64 mm/s after the film driving motor $M_F$ has been stopped, the capstan driving motor Mc is stopped, and such design is useful in that when the film driving motor $M_F$ is stopped, even if the film F2 disposed between the film gate 21 and the magnetic head 27 is slackened by an amount corresponding to several frames (usually about two frames), the slackened film can be fed by the rotation of the capstan driving motor and the film F2 in the cassette C2 can be brought into normal condition without slack at the end of the photographing. In the manner described above, the sequence control can be achieved in which images and sounds are recorded and photographed at the same time by the use of a cassette C2. In the present invention, the shutter opening angle is always set to 220° at the end of photography. More particularly, when the photography is stopped, the switch SW2 changes from its ON position to its OFF position as already noted, so that the flip-flops FDFF1, FDFF2 and the exclusive or gate Fex1 of FIG. 16 function just in the same way as the flip-flops FF1, FF2 and the exclusive or gate ex1 of FIG. 15 and the Q output of the flip-flop FDFF1 becomes low level, so that the exclusive or gate Fex1 puts out single pulse. Therefore, the single pulse from Fex1 is transmitted to the reset input terminal of the counter FCC1 through the OR gate FOR9, thus resetting the counter. Accordingly, the flip-flop FDFF6 is released from its reset condition and the single pulse is applied to the clock input terminal of the flip-flop FDFF6 through the inverter FIN4, so that the flip-flop FDFF6 puts out high-level signal from its output terminal Q and low-level signal from its $\overline{Q}$ output terminal. Therefore, the counter FCC1 counts the pulse of 1 mm/s period from the AND gate FAND3 and low-level signal is applied to the D input terminal of the decoder FDC1. At this time, as described, the Q output of the flip-flop FDFF1 is at low level and the flip-flop FDFF5 is set by the single pulse from the exclusive or gate Fex1 and is putting out high-level signal from its Q output terminal, so that low-level signal is applied to the input terminal A of the decoder FDC1 and high-level signal is applied to the B input terminal of the decoder FDC1. The C input terminal of the decoder FDC1 is connected to the Q output terminal of the flip-flop FDFF3 and this Q output is at low-level, so that the decoder FDC1 puts out high-level signal from its output terminal "2". Thus, by the same operation as the described shutter opening angle control, high-level signal is continuously put out for 2.5 seconds from the AND gate FAND2 and at the end of photography, the shutter opening angle is controlled so as to be always 220°, or fully open.

Next, description will be made of the case where the fade-out operation is effected in the course of photography and fade-out photography is effected.

Assume that the photography is being effected in the manner as described above. Therefore, as already described, the Q outputs of the flip-flops FDFF1 and FDFF5 are putting out high-level signals. In this state, when the fade button 7a is rotated counter-clockwisely in FIG. 3 to photograph an object to be photographed by fade-out, the projection 7b of the fade photography operating member 7 closes the switch SW8. Therefore, high-level signal is transmitted to the D input terminal of the flip-flop FDFF3 and by the same operation as that of the above-described flip-flops FDFF1, FDFF2 and the exclusive or gate Fex1, high-level signal is put out from the Q output terminal of the flip-flop FDFF3 and single pulse is put out from the exclusive or gate Fex2. Accordingly, the single pulse from the Fex2 is transmitted to the counter FCC1 through the OR gate FOR9 to reset the counter CC1. Therefore, low-level signal is transmitted to the reset terminal R of the flip-flop FDFF6. At this time, the single pulse from the gate Fex2 is applied to the clock input terminal of the flip-flop FDFF6 through the OR gate FOR9 and inverter FIN4, so that the flip-flop FDFF6 is set to put out high-level signal from its output terminal Q and put out low-level signal from its output terminal $\overline{Q}$. Thus AND gate FAND3 is opened, clock pulse CP enters into counter FCC1 to start counting operation. At this time, flip-flop FDFF5 is reset by a single pulse from exclusive or Fex2 low level signal is output from Q output terminal. Consequently, at A input terminal of recorder FDC1, high level signal is transmitted, at D input terminal low level signal is applied, and high level signal is output from the output terminal 5. High level signal from the output terminal 5 is transmitted to one of input terminals of AND gate FAND1 OR gate FOR3 and also is transmitted to one of input terminals of AND gate FAND4 through OR gate FOR4. The high-level signal from the output terminal 5 is applied as low-level signal to the clock input terminal C of the flip-flop FDFF7 through the inverter FIN1. Pulse CP of 1 mm/s period is applied through the OR gate FOR7 to the other input terminal of the AND gate FAND1 to one input terminal of which is applied high-level signal through the OR gate FOR3, and the other input terminal of the gate FAND1 is connected to the switch SW7 through the inverter FIN3. The switch SW7 is then closed because the switch SW7 is designed to be opened only when the shutter opening angle is 0° or fully closed. The AND gate FAND1 is opened at the point of time whereat high-level signal is put out from the output terminal "5" of the decoder FDC1, and puts out clock pulse CP. The transistor Tr10 of FIG. 17F repeats ON and OFF in synchronism with the clock pulse CP and thus, the transistors Tr11 and Tr13 also repeat ON and OFF in synchronism with the clock pulse CP. Therefore, a power supply path of transistor Tr13—motor Ms—transistor Tr11 is formed for the motor Ms, which is thus rotated in the direction opposite to the direction for widening the shutter opening angle and displaces the sliding member 76 rightwardly in FIG. 6. Therefore, the shutter opening angle is gradually narrowed from the fully open condition (220°) to the fully closed condition (0°) to thereby effect fade-out photography. At this time, the high-level signal from the output terminal "5" of the decoder FDC1 is transmitted to the inverter INFO1 of FIG. 17D, so that low-level signal is transmitted to the base of the transistor TrFO1 to turn on the same transistor. Thus, the capacitor OLCP1 is charged through the resistor FOR1 so that the transistors TrV1 and TrV2 reduces their impedances as a function of time. Therefore, the input signal level transmitted to the input terminal B of the amplifier AmP3 shown in FIG. 17C is put out from the output terminal C as an output level signal gradually reduced as the function of time, so that the recording level is gradually reduced to effect fade-out recording. In the process wherein the fade-out photography and recording is executed in this manner, the counting operation of the counter FCC1 advances to count 5120 clock pulses of 1 mm/s period, namely, about 5 seconds passes after the execution of the fade-out photography and recording, whereupon high-level signal is put out from the outputs "4096" and "1024" of the counter FCC1 and transmitted to the input terminal of the AND gate FAND4. At this point of time, therefore, this AND gate puts out high-level signal and transmits it to the reset input terminal of the flip-flop FDFF6 through the OR gate FOR6. Accordingly, the flip-flop FDFF6 is reset and puts out high-level signal from its output terminal $\overline{Q}$ and low-level signal from its output terminal Q. The low-level signal from the Q output terminal is transmitted to the AND gate FAND3 to close this gate and stop the counting operation of the counter FCC1, while the high-level signal from the $\overline{Q}$ output terminal is transmitted to the D input terminal of the decoder FDC1, so that the high-level signal from the output terminal "5" of FDC1 changes to low-level signal. Thus, the clock pulse CP so far put out through the AND gate FAND1 is no longer transmitted to the transistor Tr10 of FIG. 17F and the transistors Tr10, Tr11 and Tr13 are turned off to stop the control of the shutter opening angle, thus completing the fade-out photography. Thus, the control time of the shutter opening angle is controlled such that the shutter opening angle shifts from the fully open condition to the fully closed condition in five minutes and the fade-out photography is completed in five minutes. Why the current is intermittently supplied to the motor in synchronism with the motor clock pulse in the fade-out photography is that because the motor is controlled during energization so that the shutter opening angle shifts from the fully closed (or fully open) condition to the fully open (or fully closed) condition in 2.5 seconds, the shutter can be controlled from its fully open (or fully closed) condition to its fully closed (or fully open) condition only by supplying 50% clock pulse as duty for 5 seconds. Also, in this manner, the high-level signal from the output terminal "5" of the decoder FDC1 is held for 5 seconds and it becomes low level signal after the lapse of 5 seconds, so that the transistor TrFO1 of FIG. 17D remains turned on only for 5 seconds, and thus the charging of the capacitor OLCP1 is stopped after the lapse of 5 seconds. The resistance value of the resistor FOR1 is adjusted so that the capacitor OLCP1 is fully charged in 5 seconds, and therefore the fade-out recording of sounds is completed in 5 seconds and the fade-out recording effected corresponds to the fade-out photography. The charge stored in the capacitor OLCP1 is not discharged because the resistor RR1 is of high resistance value.

Fade-out recording and photography is executed in the manner described above. When the fade-out photography is completed, the output of the inverter FIN1 is changed to high level and therefore, the flip-flop FDFF7 is set and the signal at the output terminal $\overline{Q}$ thereof becomes low-level signal and the output of the AND gate FRAND1 becomes low level, so that the output of the AND gate AST1 of FIG. 15 also becomes low level, thus executing the already described stop sequence and automatically terminating the photography. By this, wasteful photography in the fully closed condition of the shutter after the fade-out photography can be precluded.

Description will now be made of the fade-in photography taking place after the completion of the fade-out photography. In this case, the trigger button 16 is first released. Thereupon, the trigger plate 56 is displaced leftwardly in FIG. 3 by the force of the spring 58, thereby opening the switches SW2 and SW$_E$. Upon opening of the switch SW2, high-level signal is applied as input to the reset input terminal of the flip-flop FDFF7 through the inverter FIN3 to reset this flip-flop FDFF7, and the output of the output terminal $\overline{Q}$ thereof becomes high-level signal. Thereafter, the trigger button 16 is again depressed to displace the trigger plate 56 rightwardly in FIG. 3 to thereby close the switch SW2. By this, the output of the AND gate FRAND1 becomes high-level signal which is transmitted to the input terminal of the AND gate AST1 of FIG. 15, and if 512 mm/s has already passed after the depression of the trigger button 16, the above-described start sequence is executed to start film feed and start the photography and recording operation. Also, upon closing of the switch SW2, the flip-flops FDFF1 and FDFF2 and the exclusive or gate operate in the manner already noted and the Q output of the flip-flop FDFF1 becomes high-level signal and the exclusive or gate Fex$_1$ puts out single pulse to set the flip-flop FDFF5. Thus, high-level signal is applied to the input terminals A and B of the decoder FDC1, but since only the output terminals "0", "1", "2", "4" and "5" of the decoder FDC1 are connected to respective circuits, the camera's operation is affected in no way by the output of the decoder FDC1. Thereafter, the camera is caused to face a scene to be fade-in-photographed and the fade button 7 is released from its rotated condition, the fade button having so far been held in the counter-clockwisely displaced position in FIG. 3. Thus, the switch SW8 which has so far been closed by the projection 7b of the fade photography operating member 7 is opened to transmit low level signal to the D input terminal of the flip-flop FDFF3, and as already noted, the flip-flops FDFF3 and FDFF4 and the exclusive or gate Fex$_2$ are operated to put out low level signal from the Q output terminal of the flip-flop FDFF3 and put out single pulse from the exclusive or gate Fex$_2$, and the flip-flop FDFF5 is reset. There upon, the flip-flop FDFF5 puts out low-level signal from its output terminal Q. Also, the single pulse from the gate Fex$_2$ is transmitted to the reset terminal R of the counter FCC1 through the OR gate FOR9, thereby resetting the counter FCC1. Thus, as already noted, the flip-flop FDFF6 is released from its reset condition and single pulse is transmitted to the clock input terminal thereof through the inverter FIN4 to set this flip-flop FDFF6, which thus puts out high-level signal from the Q output terminal thereof and low-level signal from the $\overline{Q}$ output terminal thereof. Accordingly, the AND gate FAND3 is opened to transmit the clock pulse CP to the counter FCC1, which thus starts counting. At this time, on the other hand, high-level signal is transmitted to the A input terminal of the decoder FDC1, and low-level signal which is the Q output of the flip-flop FDFF5 is transmitted to the B input terminal of FDC1, while low-level signal is being applied to the C and D input terminal thereof, so that high-level signal is put out from the output terminal "1" of the decoder FDC1. Therefore, high-level signal is transmitted to the AND gate FAND2 through the OR gate FOR2, so that the clock pulse CP of 1 mm/s period transmitted to the other input terminal of the gate FAND2 is put out from the gate FAND2. Thus, clock pulse of 1 mm/s period is transmitted through the switch SW6 to the base of the transistor Tr15 in the shutter opening angle control motor driving circuit of FIG. 17F, so that the motor Mc rotation is reversed to displace the sliding member 76 leftwardly in FIG. 6 by means of the cam ring 81, to thereby control the shutter opening angle so as to shift from its fully closed condition to its fully open condition. By this, the fade-in photography is executed. Since the high-level signal from the output terminal "1" of the decoder FDC1 is applied to the base of the transistor TrFI1 of FIG. 17D, this transistor is turned on to permit the capacitor OLCP1 to discharge through the resistor FIR1 and the impedances of the transistors TrV1 and TrV2 are gradually increased as a function of time. Thus, the level of the audio signal transmitted to the input terminal B of the sound fade control circuit SFC1 of FIG. 17C is put out from the output terminal C as a signal at a level gradually increased as a function of time, whereby the sound fade-in recording corresponding to the fade-in photography is executed. The resistance value of the resistor FIR1 is determined so that the discharging of the capacitor OLCP1 is completed in about 5 seconds and so, or fade-in recording is effected for 5 seconds, whereafter the normal level recording is effected. In the process wherein the fade-in photography and recording is executed in this manner, the counter FCC1 is performing its counting operation and when its count reaches 5120, namely, in about 5 seconds after the fade-in operation has been started, the counter puts out high-level signal from its output terminals "4096" and "1024" and this high-level signal is transmitted to the input terminal of the AND gate FAND4. Also, the high-level signal from the output terminal "1" of the decoder FDC1 is being applied to the other input terminal of the AND gate FAND4 through the OR gate FOR4, so that the gate FAND4 puts out high-level signal at this time to reset the flip-flop FDFF6 through the OR gate FOR6. Therefore, low-level signal is put out from the Q output terminal of the flip-flop FDFF6 and high-level signal is put out from the $\overline{Q}$ output terminal thereof, and the AND gate FAND3 is closed to stop the counting operation of the counter FCC1. On the other hand, the high-level signal from the $\overline{Q}$ output terminal of the flip-flop FDFF6 is transmitted to the D input terminal of the decoder FDC1, so that the high-level signal put out from the output terminal "1" of the decoder FDC1 disappears. Accordingly, the AND gate FAND2 is closed to turn off the transistor Tr15 of FIG. 17F and stop the motor Mc and the shutter opening angle control. The motor Mc, as already noted, is designed to change the shutter opening angle from the fully closed (or fully open) to the fully open (or fully closed) condition by being electrically energized for 5 seconds intermittently in synchronism with the clock pulse CP of 1 mm/s period, and so the fade-in photography is terminated. Also, at this time, the high-level signal from the output terminal "1" of the decoder FDC1 disappears as already noted, so that the transistor TrFI1 of FIG. 17D is turned off to stop the fade-in photography. As already noted, the resistance value of the resistor FIR1 is determined so that the capacitor OLCP1 discharges in 5 seconds, and therefore the fade-in recording corresponding to the fade-in photography is executed.

Fade-in and fade-out photography is executed in the manner as described above. Since the output terminal of the AND gate FAND$_1$ continues to put out high-level signal until the trigger button 16 is released from its depressed condition, normal photography and recording is executed after the fade-in photography and fade-in recording has been effected.

Description will now be made of a case where normal photography is effected immediately after fade-out photography.

In this case, the trigger button 16 is first released from its depressed condition to open the switch SW2. By the opening of this switch SW2, the $\overline{Q}$ output terminal of the flip-flop FDFF7 puts out high-level signal, but the switch SW2 being open, the AND gate FAND1 is held at low level signal so that the start sequence is not executed and photography is not effected. Also, by the opening of the switch SW2, the Q output of the flip-flop FDFF1 becomes low level and the flip-flop FDFF5 is set by the single pulse from the gate Fex1. Therefore, low-level signal is applied to the A input terminal of the decoder FDC1 and high-level signal is applied to the B input terminal, but since the switch SW2 is in ON position, the flip-flop FDFF3 puts out high-level signal and transmits the high-level signal to the C input terminal of the decoder FDC1, so that the output terminals "0", "1", "2", "4" and "5" of the decoder FDC1 is held as they put out low-level signal and the photography operation is affected in no way, and thus the condition in which the fade-out has been completed is maintained. Thereafter, by releasing the fade button from its counter-clockwisely urged condition, the switch SW8 is opened. Therefore, by the described operation, low-level signal is put out from the Q output terminal of the flip-flop FDFF3 and the low-level signal is applied to the C input terminal of the decoder FCD1 while, at the same time, the flip-flop FDFF5 is reset by the single pulse from the exclusive or gate Fex2 and low-level signal is applied to the B input terminal of the decoder FDC1. Also, the counter FCC1 is reset by the single pulse from the gate Fex2 as mentioned already, and the flip-flop FDFF6 is set, and high-level signal and low-level signal are put out from the Q output terminal and $\overline{Q}$ output terminal, respectively, of the flip-flop FDff6, so that the counter starts counting operation while low-level signal is transmitted to the D input terminal of the decoder FDC1. Thus, low-level signal is transmitted to the input terminals A-D of the decoder FDC1, the output terminal "0" of which puts out high-level signal. Accordingly, high-level signal is transmitted to one input terminal of the AND gate FAND2 through the OR gates FOR1 and FOR2, and high-level signal is also transmitted to the other input terminal of the gate FAND2 through the OR gates FOR1, FOR5 and FOR7, so that high-level signal is transmitted to the gate FAND2. Therefore, high-level signal is transmitted to the transistor T15 of FIG. 17F through the switch SW6, thus turning on the transistors TR14 and TR12, so that the motor Mc starts running and the shutter opening angle is controlled so as to change from the fully closed condition to the fully open condition. Also, the output of the OR gate FOR1 is transmitted to the transistor TrFI2 of FIG. 17D to turn on this transistor, so that the capacitor OLCP1 discharges through the resistor FIR2. The resistance value of the resistor FIR2 is determined so that the capacitor OLCP1 discharges in about 2.5 seconds and so, the transistors TrV1 and TrV2 are turned off in 2.5 seconds. Thus, the sound level signal applied to the input terminal B of the sound fade control circuit of FIG. 17C is controlled so as to be directly transmitted to the output terminal C and returned to in normal recording level in 2.5 seconds. While the shutter opening angle and recording level is so controlled, the counter FCC1 is performing its counting operation and when it counts 2560 pulses CP of 1 mm/s period, namely, when about 2.5 seconds has passed after in shutter opening angle and recording level control was started, high-level signal is put out from the output terminal "2048⇌ and "512". Therefore, the AND gate FAND5 to which is being applied the high-level signal from the output terminal "0" of the decoder FDC1 through the gates FOR1 and FOR5 is opened to put out high-level signal, which is transmitted to the flip-flop FDFF6 through the OR gate OR6. Thus, the flip-flop FDFF6 is reset and puts out low-level signal from its output terminal Q and high-level signal from its output terminal $\overline{Q}$. Therefore, the AND gate FAND3 is closed to stop the counting operation of the counter FCC1 and high-level signal is applied to the D input terminal of the decoder FDC1, so that the high-level signal from the output terminal "0" of the decoder FDC1, disappears and the high-level signal put out from the AND gate FAND2 also disappears, and thus, by the already described operation, the motor Mc of FIG. 17F is stopped from running and the control of the shutter opening angle is terminated. Also, at this time, the high-level signal applied to the base of the transistor TrFI2 of FIG. 17D dissappears to turn off this transistor. In this manner, the shutter opening angle control motor Mc is electrically energized continuously for 2.5 seconds, thus controlling the shutter opening angle from the fully closed condition to the fully open condition. Since the transistor TrFI2 is also turned on for 2.5 seconds, the sound level also restores its normal level as already mentioned. After the shutter opening angle and the sound level have restored normal photography condition in this manner, the trigger button 16 is depressed to close the switch SW2 and high-level signal is put out from the AND gate FAND1 to execute the aforementioned start sequence and start photography, whereafter the normal made of photography is executed. In the present invention, as described previously, the return to the normal conditions of the shutter opening angle and the sound level takes place in 2.5 seconds after completion of the fade-out photography and therefore, only one half of the control time of the fade-in photography is required and the return to the normal photography condition from the completion of the fade-out photography can be accomplished in a very short time. Accordingly, wasteful waiting time is reduced and this prevents missing of shutter chances.

Next, description will be made of the case where fade-in photography in the course of normal photography without following the step of fade-out photography. In this case, after the normal photography has been effected, the trigger button 16 is once released to open the switch SW2. Then, the aforementioned stop sequence is executed and the photographying operation is terminated, whereafter the fade button 7a is urged counter-clockwisely to rotate the fade photography operating member counter-clockwisely. By so urging the fade button 7a counter-clockwisely, the switch SW3 is closed and by the above-described operation, the Q output terminal of the flip-flop FDFF2 puts out high-level signal while the gate Fex2 puts out single pulse. Therefore, by the single pulse from the gate Fex2, as already described, the counter FCC1 starts counting and the flip-flop FDFF1 is set and its Q output terminal puts out low-level signal, and in addition, the flip-flops FDFF5 is reset to put out low-level signal from its Q output terminal. Therefore, low-level signal is applied to the input terminals A, B and D of the decoder FDC1 and high-level signal is applied only to the input terminal C of the decoder, so that this decoder FDC1 puts out high-level signal from its output terminal "4". Thus, the high-level signal from the output terminal "4" is applied to one input terminal of the AND gate FAND1 through the OR gate FOR3. The switch SW7 is designed to be opened when the shutter opening angle is 0°, namely, when the shutter is fully closed, so that high-level signal is transmitted to the other input terminal of the AND gate FAND1 through the inverter FIN3. Further, the high-level signal from the output terminal "4" of the decoder FDC1 is applied to the other input terminal of the fate FAND1 through the OR gates FOR5 and FOR7, so that the fate FAND1 puts out high-level signal. Therefore, the transistor Tr10 of FIG. 17F is turned on and the motor Mc is electrically energized through the transistors Tr13 and Tr11 and the shutter opening angle is controlled so as to fully opened. At this time, the high level signal from the output terminal "4" of the decoder FDC1 is transmitted to the inverter INFO2 of FIG. 17D and low-level signal is applied to the base of the transistor TrFO2 to turn on this transistor. Thus, the capacitor OLCP1 is charged through the resistor FOR2 so that the impedances of the transistors TrV1 and TrV2 are reduced. Therefore, the audio signal level applied to the input terminal B of the sound fade control circuit SFC1 of FIG. 17C is reduced and transmitted to the output terminal C. Since the resistance value of the resistor FOR2 is determined so as to fully charge the capacitor OLCP1 in about 2.5 seconds, the output signal level from the output terminal C of the sound fade control SFC1 of FIG. 17C becomes zero after about 2.5 seconds. While the shutter opening angle control and the recording level control is being effected, the counter FCC1 executes counting operation and when it counts 2560 pulses of 1 mm/s period, namely, when about 2.5 seconds has passed since the shutter opening angle control and the recording level control was started, the counter FCC1 puts out high level signal from its output terminals "2048" and "512". Therefore, the high-level signal from the outputs "2048" and "512" of the counter FCC1 is transmitted to the other input terminal of the AND gate FAND5 to one input terminal of which is applied the high-level signal from the output terminal "4" of the decoder FDC1 through the OR gate FOR5, and the gate FAND5 puts out high-level signal. Accordingly, this high-level signal is transmitted to the reset input terminal R of the flip-flop FDFF6 to reset this flip-flop, which puts out low level signal from its output terminal Q and high-level signal from its output terminal $\overline{Q}$. Therefore, the counter FCC1 stops counting and high-level signal is transmitted to the D input terminal of the decoder FDC1, so that the high-level signal so far put out from the output terminal "4" of the decoder FDC1 disappears. Thus, the high-level signal so far put out from the AND gate FAND1 also disappears to turn off the transistor Tr10 of FIG. 17F and stop the motor Mc, thereby terminating the shutter opening angle control operation. In this manner, by continuously supplying power to the motor Mc for 2.5 seconds, the shutter opening angle changes from the fully open condition to the fully closed condition as already noted, and thus the shutter becomes fully closed. The output terminal "4" of the decoder FDC1 is connected to the inverter INFO2 of FIG. 17M and so, the transistor TrFO2 remains turned on for 2.5 seconds, and then is turned off to stop charging of the capacitor OLCP1. As already described, the resistance value of the transistor FOR2 is so determined as to fully charge the capacitor in 2.5 seconds and therefore, when the transistor TrFO2 is turned off, the signal level from the output terminal C of the sound fade control circuit SFC1 of FIG. 17C becomes zero. In this manner, prior to fade-in photography, the shutter opening angle and the recording level is pre-controlled from the normal photography condition to the condition before the fade-in photography, namely, the condition at the end of the fade-out photography. After the shutter is fully closed and the recording level is pre-controlled to zero, the trigger member 16 is depressed to close the switch SW2 in the same manner as in the above-described fade-in photography, and the fade button 7a is released from its depressed condition to open the switch SW6, thereby effecting the above-described fade-in operation, and immediately after the normal photography is effected, fade-in photography and recording can be effected. While the shutter opening angle and the recording level is being controlled from the normal photography condition to the condition for effecting fade-in operation, high-level signal is put out from the output terminal "4" of the decoder FDC1, as already noted, so that low-level signal is applied to the AND gate FRAND1 through the inverter FIN2 and thus, even if the trigger button 16 is depressed in this condition, the output of the AND gate FRAND1 does not become a high-level signal and photography is not started, and therefore no problem will occur even if the trigger operation is effected by mistake. Also, in this operation, while the photography is not taking place, the time during which the fade operation control is effected is 2.5 seconds, and the control of the shutter opening angle and the recording level can be completed in half the time required for the fade photography and this leads to a very short time required for the fade control operation which is not directly related to the photography operation and also leads to the capability of immediately starting the photography, thus eliminating the disadvantage of missed shutter chances or the like.

Figure 20A:
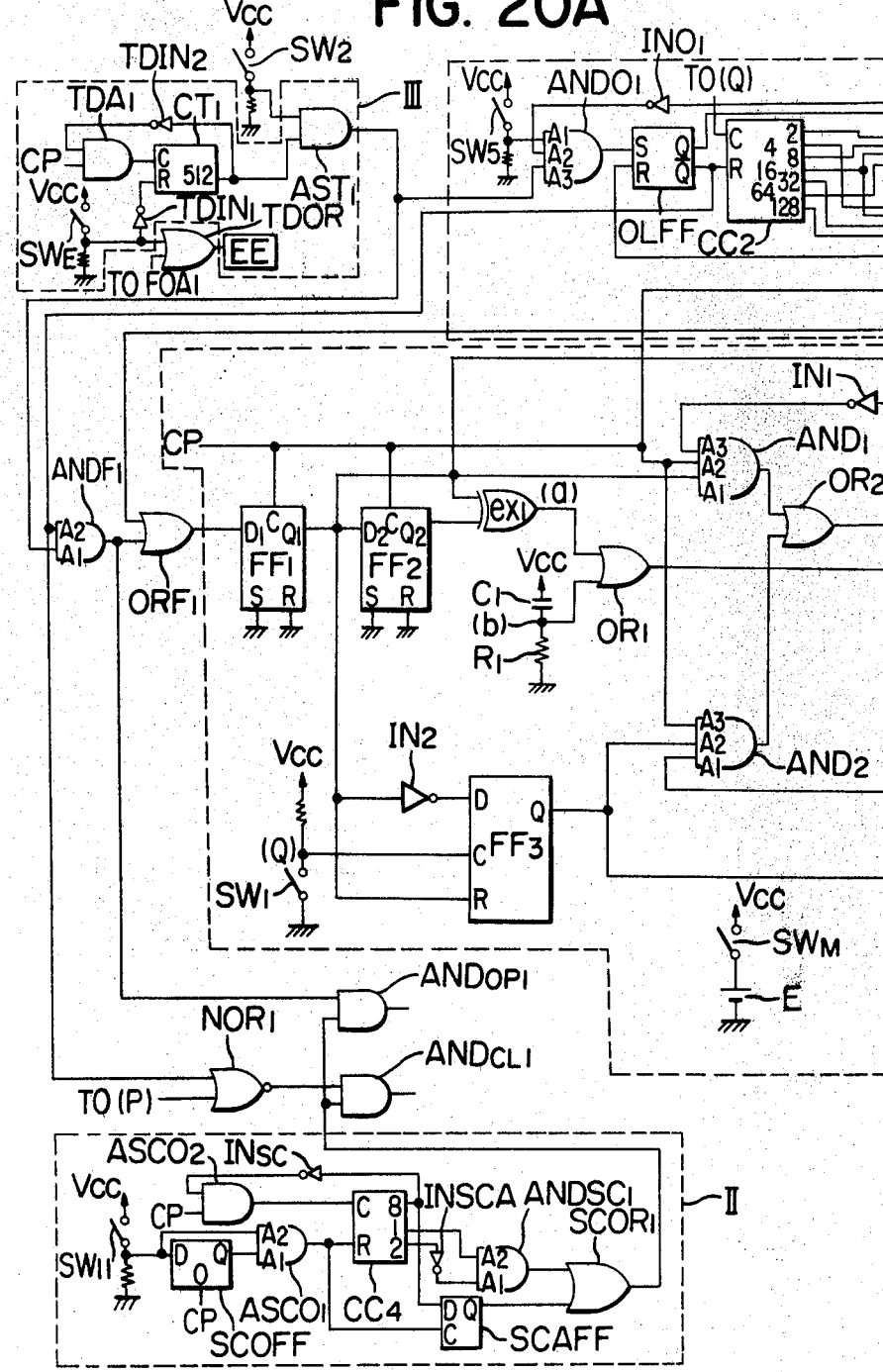
FIG. 20 is a circuit diagram of a modification of the sequence control circuit shown in FIG. 15, this circuit enabling image overlap photography to be automatically effected in the cine camera shown in FIGS. 2 to 14.

FIG. 20 is a circuit diagram showing a modification of the sequence control circuit shown in FIG. 15, and this embodiment of the circuit enables overlap photography of images in the cine camera shown in FIGS. 2 to 14. The portion A of FIG. 20 encircled by dotted line is a control circuit for controlling the start and stop sequence of photography and this portion A is identical in construction to the control circuit shown in FIG. 15 and need not be described. In FIG. 20, the portion III encircled by a dotted line corresponds to the trigger signal generating circuit shown in FIG. 15 and the construction of this circuit portion III is substantially identical to that of FIG. 15 with the exception that the switch SW2 controlled by the trigger plate 56 in response to the depression of the trigger button 16 is connected to one input terminal of the AND gate AST1, and this portion III neither need be described. Also, in FIG. 20, ANDF1 is an AND gate for opening the shutter, and the switch SW2 is connected to one input terminal A1 of the AND gate ANDF1 through the AND gate AST1 and the $\overline{Q}$ output terminal of a flip-flop OLFF, to be described, is connected to the other input terminal A2 of the gate ANDF1. The output terminal of the AND gate ANDF1 is connected to the OR gate ORF1 and open signal may be transmitted to the D1 input terminal of the flip-flop FF1 through the OR gate ORF1. The circuit portion A executes the described start sequence operation in accordance with the open signal.

In FIG. 20, the portion B encircled by dotted line is an overlap sequence operation control circuit for controlling the sequence operation of overlap photography. In the portion B, a switch SW5 is one corresponding to the switch SW5 of FIG. 4 adapted to be closed by the sliding shaft 108 operatively responsive to the depression of the overlap photography starting button 5 shown in FIG. 4. The switch SW5 remains closed during the fade-out operation and during the film reverse operation in the overlap photography and may be opened when the fade-in operation is started. ANDO1 is an AND gate, to the input terminal A1 of which is connected the aforementioned switch SW5. The output terminal of the AND gate AST1 is connected to the A3 input terminal of the ANDO1, and a switch SW7 is connected to the input terminal A2 of the ANDO1, through an inverter INO1. The output terminal of the AND gate ANDO1 is connected to the set terminal of the RS flip-flop OLFF, and the AND gate ANDO1 puts out a signal for setting the flip-flop OLFF when overlap photography is started by the closing of the switch SW5 upon depression of the button 5. The switch SW7 is desiged to detect the shutter opening angle and to be opened only when the shutter opening angle is 0°, namely, the fully closed condition, and it is normally closed because the shutter opening angle is fully open during normal photography. Thus, with such construction, the AND gate ANDO1 puts out high-level signal at the start of overlap photography and sets the flip-flop OLFF. CC2 is a binary counter whose reset input terminal is connected to the $\overline{Q}$ output terminal of the flip-flop OLFF and which is adapted to be set by the $\overline{Q}$ output. The aforementioned switch SW1 is connected to the clock input terminal of the counter CC2, and this counter is designed to count the pulse put out by ON-OFF of the switch SW1, namely, the pulse put out for each one frame. ANDO2 is an AND gate to the input terminals of which are connected the output terminals "2", "8", "16" and "64" of the counter CC2. The AND gate ANDO2 may generate an output when the counter CC2 has counted 90 pulses, and may transmit such output to the set terminal S of an RS flip-flop REVFF. CAC1 is an AND gate to the input terminals of which are connected the output terminals "4", "16", "32" and "128" of the counter CC2. The output terminal of the AND gate CAC1 is connected to the reset input terminal of the RS flip-flop REVFF through the OR gate ORO1. FOA1 is an AND gate to one input terminal of which is connected the Q output terminal of the flip-flop OLFF and to the other input terminal of which is connected the $\overline{Q}$ output terminal of the flip-flop RFVFF. This AND gate FOA1 may put out high-level signal only during the fade-out operation. REVA1 is an AND gate to one input terminal of which is connected the Q output terminal of the flip-flop OLFF and to the other input terminal of which is the Q output terminal of the flip-flop REVFF. The gate REVA1 is an AND gate for transmitting reverse rotation signal to the film motor MF driving circuit and may put out high-level signal during the time from the end of the fade-out operation to the end of the film reverse operation. REVA2 is an AND gate for transmitting reverse rotation signal to the film motor MF driving circuit and to the input terminal A1 of which is connected the output terminal of the AND gate REVA1 and to the other input terminal A2 of which is connected the switch SW7. Further, the $\overline{Q}$ output of the flip-flop CMFF is connected to the input terminal A3 of the AND gate REVA2. In FIG. 20, the portion I encircled by dotted line is a timer circuit for engergizing the electromagnet means FMg only for a predetermined time at the end of the film reverse operation. The timer circuit I comprises an inverter INO2, a binary counter CC3 and an AND gate AFFB. The AND gate AFFB has two input terminals, to one of which is applied the clock pulse CP and to the other is connected the output terminal "32" of the binary counter CC3 through the inverter INO2. The output terminal of the AND gate AFFB is connected to the clock input terminal C of the counter CC3. Also, the reset terminal R of the counter CC3 is connected to the output terminal of the OR gate ORO1, and the output terminal thereof is connected to the input terminal of the OR gate SMgOR. NOR1 is a NOR gate for putting out a close signal for closing the shutter. The $\overline{Q}$ output terminal of the flip-flop OLFF is connected to one input terminal of the NOR1 and the switch SW7 is connected to the other input terminal of the NOR1. In FIG. 20, the circuit portion II encircled by dotted line is a speed control circuit for controlling the execution speed of the fade-in and fade-out. In the circuit II, SW11 is a switch which is ON-OFF-controlled by a cam 82 provided on a worm gear 82 for each full rotation of the motor Mc and operatively associated with the opening angle control motor Mc. The circuit II detects the width of the pulse put out on ON-OFF of the switch SW11 to control the rotational speed of the motor Mc. SCOFF is a D-type flip-flop to the D input terminal of which is connected the switch SW11 and to the clock input terminal of which is applied the clock pulse CP. ASCO1 is an AND gate to one input terminal A1 of which is connected the Q output terminal of the flip-flop SCOFF and to the other input terminal A2 of which is connected the switch SW11. The switch SW11, the flip-flop SCOFF and the AND gate ASCO1 together form a single pulse having a period corresponding to the rotational speed of the motor Mc. CC4 is a binary counter to the reset input terminal of which is connected the output terminal of the AND gate ASCO1. The counter CC4 is reset for each full rotation of the motor Mc. The output terminal of the AND gate ASCO2 is connected to the clock input terminal of the counter CC4. The clock pulse is applied to one input terminal of the AND gate ASCO2 and the other input terminal of the ASCO2 is connected to the output terminal "8" of the counter CC4 through an inverter INSC. The counter CC4, the AND gate ASCO2 and the inverter INSC may put out high-level signal from the output terminal "8" of the counter CC4 when more than a predetermined time (8 mm/s) is taken while the motor Mc effects one full rotation. SCAFF is a D-type flip-flop to one input terminal of which is connected the output terminal of the counter CC4 and to the clock input terminal of which is connected the output terminal of the AND gate ASCO1. The flip-flop SCAFF may put out high-level signal from its Q output terminal while the motor Mc effects next one full rotation when 8 mm/s is taken for the motor Mc to make one full rotation. ANDSC1 is an AND gate to the input terminal A1 of which is connected the output terminal "2" of the counter CC4 through an inverter INSCA and to the other input terminal A2 of which is connected the output terminal "1" of the counter CC4. The gate ANDSC1 is for putting output high-level signal of 1 mm/s only when the counter CC4 has counted one pulse and when the counter CC4 has counted five pulses. SCOR1 is an OR gate to the input terminals of which are connected the AND gate ANDSC1 and the Q output of the flip-flop SCAFF. The OR gate SCOR1 may put out high-level signal while the motor Mc makes next one full rotation when it has taken 8 mm/s or more to make one full rotation, and may cause the AND gate ANDSC1 to put out pulse when the time required for one full rotation is less than 8 mm/s, and by this, the circuit II controls the speed control signal put out from the OR gate SCOR1 in accordance with the rotational speed of the motor Mc. ANDOP1 and ANDCL1 are AND gates connected to the shutter opening angle control motor driving circuit.

Figure 21A:
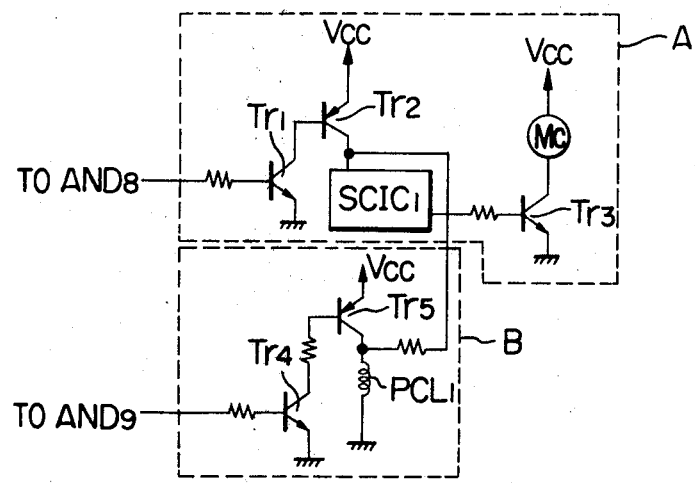
FIG. 21 shows a control circuit controlled by the control circuit of FIG. 20 and individually controlling the various mechanisms shown in FIGS. 2 to 14, FIG. 21A being a circuit diagram of an embodiment of the driving circuit for controlling the drive of the capstan drive motor Mc and the driving circuit for driving the electromagnet device PMg, FIG. 21B being a circuit diagram showing an embodiment of the film motor drive circuit for controlling the drive of the motor MF for operating the film feeding mechanism and the shutter rotation driving mechanism, FIG. 21C being a block diagram showing an embodiment of the sound recording circuit, FIG. 21D being the circuit diagram showing an embodiment of the drive circuit for driving the electromagnet device shown in FIG. 3 for stopping the shutter rotation and in film feeding mechanism at a predetermined position, FIG. 21E showing an embodiment of the drive circuit for controlling the drive of the motor $M_S$ for varying and regulating the angle of opening of the shutter formed by shutter blades 71, 72 and 73 shown in FIG. 6.

FIG. 21A is a circuit diagram showing an embodiment of the capstan motor driving circuit and the pinch roller magnet driving circuit controlled by the sequence control circuit of FIG. 20. These circuits are identical in construction to the embodiment of the driving circuit of FIG. 17A and need not be described.

Figure 21B:
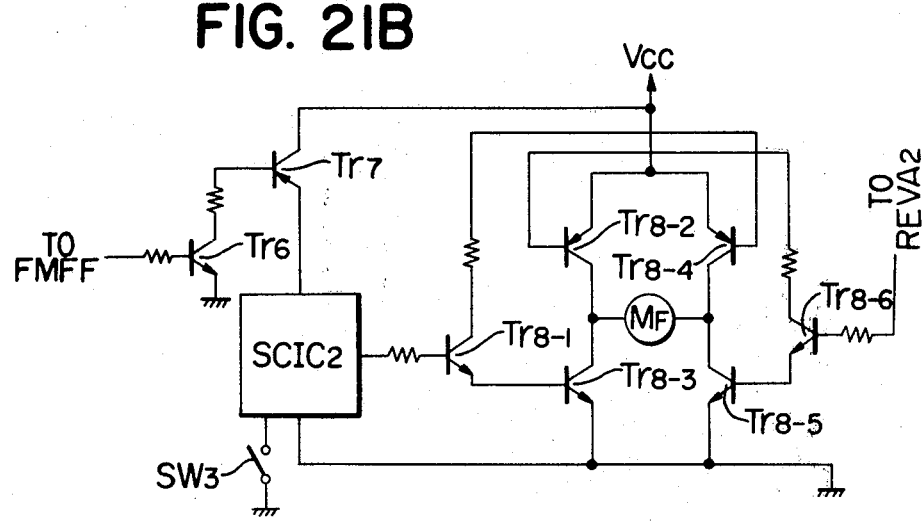

FIG. 21B is a circuit diagram showing an embodiment of the film motor driving circuit. In this circuit, Tr6 is a transistor to the base of which is connected the Q output of the flip-flop FMFF. Tr7 is a transistor to the base of which is connected the collector of the transistor Tr6. The transistor Tr7 together with the transistor Tr6 constitutes a power supply switching circuit to the speed control circuit ICSC1C2 (TCA955). SW3 is a switch controlled by the loop detecting member 33 shown in FIG. 2C. The switch SW3 is closed when the film slack detected is a predetermined amount and is open when the film slack detected is greater than the predetermined amount, and it transmits ON signal to the speed control circuit ICS1C2 to control the film feed speed so as to be 20 frames/sec. and control the intermittent film feed mechanism so that the film feed speed is 16 frames/sec. when the switch is opened.

Tr3-1 to Tr3-6 are transistors which constitute a rotation control circuit for controlling the normal and reverse rotations of the film driving motor MF. Transistors Tr3-1, Tr3-3 and Tr3-4 are switching transistors for forming a power supply path for rotating the film motor MF in the normal direction, and transistors Tr3-6, Tr3-5 and Tr3-2 are switching transistors for forming a power supply path for rotating the film driving motor MF in the reverse direction. The base of the transistor Tr3-6 is connected to the output terminal of the AND gate REVA2 of FIG. 20.

Figure 21C:
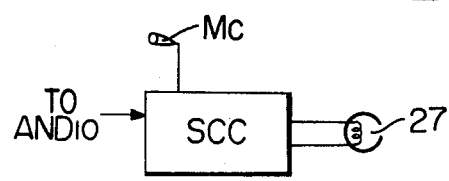

FIG. 21C is a block diagram showing an embodiment of the recording circuit. In the Figure, MC is a microphone and SCC is a known recording circuit for recording the audio signals from the microphone MC on the film F2 through the magnetic head 27. The recording circuit supplies a current to the recording magnetic head 27 in response to the recording signals from the flip-flop SRFF of FIG. 20, and records the sounds from the microphone MC on the magnetic recording zone on the film F2.

Figure 21D:
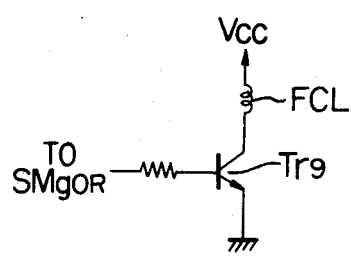

FIG. 21D is a circuit diagram showing an embodiment of the stop magnet driving circuit. Tr9 is a transistor whose base is connected to the output terminal of the OR gate SMgOR of FIG. 20 and whose collector is connected to the magnet coil FCL for driving the stop member 65.

Figure 21E:
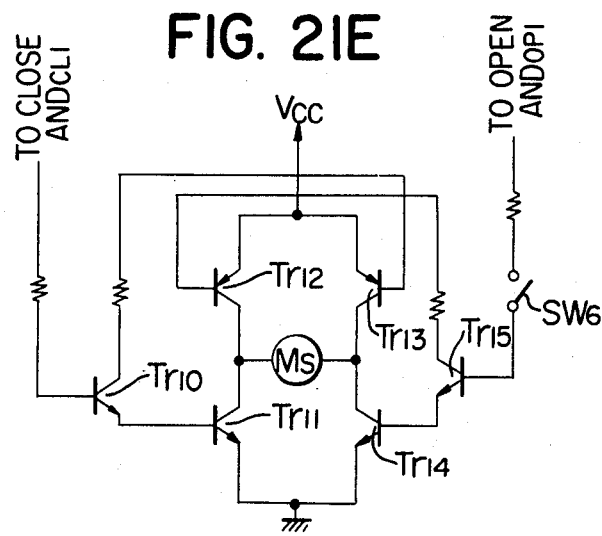

FIG. 21E is a shutter opening angle control motor driving circuit for controlling the shutter opening angle. This circuit is substantially identical in construction to the embodiment of FIG. 17F and the details thereof need not be described. In this embodiment, the base of transistor Tr10 is connected to the AND gate ANDCL1 of FIG. 20 so that the motor Mc is driven by the output of this AND gate in the direction to close the shutter opening angle, while the base of transistor Tr15 is connected to the AND gate ANDOP1 of FIG. 20 so that the motor 121 is driven by the output of this AND gate in the direction to open the shutter opening angle.

Reference is now had to the timing charts of FIGS. 22-27 to describe the operation of the cine camera of FIGS. 2 to 14 by using the control circuits shown in FIGS. 20 and 21.

First, description will be made of the normal photography for recording images and sounds simultaneously on the film F2 by the use of the film cassette C2 shown in FIG. 1B.

In the condition in which the cover 17 is opened to load the film cassette C2 in the film-receiving chamber 1a, when the film cassette C2 is loaded in the chamber 1a, the detecting member 55 projected into the chamber 1a is displaced outwardly of the chamber 1a so that the switch SW10 is closed and the film existing in the exposure opening C2a of the film cassette C2 is disposed on the film gate plate 21a, whereby the detecting piece 22 is displaced downwardly in FIG. 4 to close the switch SW9. In this condition, the cover 17 is open and so, the magnetic head 27 and the pad 26 and the capstan 28 and the pinch roller 32 are greatly spaced apart from each other so that the film F2 existing on the recording opening C2b of the cassette C2 is easily charged into between the magnetic head 27 and the pad 26 and into between the capstan 28 and the pinch roller 32.

When the cover 17 is closed after the cassette has been so loaded in place within the chamber 1a, the projection 39a1 of the pivotable member 39 projected from the aperture 1c of the camera body 1 is pushed by the projection 17b of the cover 17 so that the pivotable member 39 is rotated and as already noted, the pinch roller 32 is brought from its rest position indicated by dot-and-dash line in FIG. 3 to its preparatory position indicated by solid line.

When the main switch SWM is closed after the cover 17 has been closed with the cassette C2 loaded in the chamber 1a, the voltage Vcc of the power source E is applied to one input of each of the AND gates AND-8–AND10. At the same time, the voltage Vcc is applied to the time constant circuit comprising the capacitor C1 and the resistor R1, so that high-level signal is generated at the output terminal of the time constant circuit for a momentary time determined by the time constant of the time constant circuit. This high-level signal is applied to the reset input terminal of the counter CC1 through the OR gate OR1, to reset the counter CC1. Also, the high-level signal from the output terminal of the time constant circuit is transmitted to the reset input terminals R of the flip-flops CMFF, PMgFF, FMFF, SRFF and SMgFF through the OR gates OR3 to OR7, to reset all these flip-flops. In this condition, the trigger button 16 is depressed to displace the trigger plate 56 rightwardly in FIG. 3, whereupon the EE switch SWE is actuated by the step 56b1 of the trigger plate 56 in the first stroke thereof and the switch SWE is closed to operate a known automatic aperture control circuit EE comprising a metering circuit, etc. and the aperture is controlled in accordance with brightness. By the closing of the switch SWE, the counter CT1 is released from its reset condition to count the clock pulses applied through the AND gate TDA. Therefore, as in the above-described embodiment, when the trigger plate 56 is displaced rightwardly in FIG. 3 by depressing the trigger button 16 after the closing of the switch SWE, the switch SW2 is actuated by the end 56b2 of the trigger plate 56 to close the switch SW2 as shown in FIG. 22A. By the closing of this switch SW2, high-level signal is applied to the other input terminal of the AND gate AST1. However, the high-level signal which is a trigger signal is not put out from the AND gate AST1 until after 512 mm/s after the switch SWE has been closed. That is, again in the present embodiment, the cine camera is designed such that the trigger signal is not transmitted to the D1 input terminal of the D-type flip-flop FF1 until the operative condition of the aperture control circuit becomes stable after the switch SWE was closed. After the operation of the aperture control circuit EE becomes stable in this manner, high-level signal as the trigger signal is put out from the output terminal of the AND gate AST1. When the high-level signal is put out from the gate AST1, the high-level signal is applied to the A1 input terminal of the AND gate ANDF1. The $\overline{Q}$ output of the flip-flop OLFF is being applied to the other input terminal A2 of the AND gate ANDF1, but this being normal photography, the switch SW5 controlled by the sliding member 108 is open and the flip-flop OLFF is not set but lies in its initially reset condition. Therefore, the high-level signal is being put out from the $\overline{Q}$ output terminal of the flip-flop OLFF, so that the high-level signal is put out in response to the outputs from the AND gates ANDF1 and AST1 this signal is transmitted to the D1 input terminal of the flip-flop FF1 through the OR gate ORF1. At the same time, the output of the AND gate ANDF1 is transmitted as the open signal to the shutter opening angle control motor driving circuit of FIG. 21E, but this being normal photography, the shutter opening angle has become 220°. Accordingly, the switch SW6 of FIG. 6 is opened by being received in the recess 81d of the cam ring 81, so that the shutter opening angle control motor driving circuit of FIG. 21E remains inoperative. As already noted, the high-level signal is put out from the OR gate ORF1, whereby the high-level signal is applied to the D input terminal of the flip-flop FF1. Therefore, in synchronism with the rising of the clock pulse CP2 of FIG. 22B, the Q1 output terminal of the flip-flop FF1 puts out high-level signal as shown in FIG. 22C, and thereafter the start sequence fully described in connection with the embodiment of FIG. 15 is executed to perform simultaneous recording and photography. In the process during which the simultaneous recording and photography is executed, when the trigger button 16 is released to release the trigger plate 56 from its rightwardly displaced condition in FIG. 3, the switch SW2 is opened as shown in FIG. 23A and low-level signal is applied to the D input terminal of the flip-flop FF1. Therefore, in synchronism with the clock pulse CP1' of FIG. 23B, the signal at the output terminal Q1 of the flip-flop FF1 becomes low-level signal at the point of time t1 as shown in FIG. 23C and this low-level signal is transmitted to the D1 input terminal of the flip-flop FF2, whereupon in synchronism with the pulse CP", the flip-flop FF2 puts out low-level signal from its output terminal Q2 at the point of time t2, as shown in FIG. 23D. Also, at the point of time t1, the output of the flip-flop FF1 becomes low level, whereby high-level signal is applied to the D input terminal of the flip-flop FF3 through the inverter IN2 at the point of time t1. Therefore, when the switch SW1 which is ON-OFF-controlled by the rotation of the shutter is shifted from its ON position to its OFF position, the rising pulse is transmitted to the clock terminal C of the FF3 and at this point of time t3, the flip-flop FF3 puts out high-level signal, namely, the aforementioned stop sequence control signal, from its output terminal Q. Thus, the stop sequence already described in connection with the FIG. 15 embodiment is executed to terminal the simultaneous recording and photography.

Description will now be made of the sequence control of the silent photography effected by the use of a silent film cassette C1 receiving therein a silent film F1 which is capable of recording images alone, as shown in FIG. 1A.

This silent photography is controlled in the same way as the sequence control operation of the already described simultaneous recording and photography of sounds and images, but in case of the silent photography, the film cassette loaded in the chamber 1a of the camera body is the silent film cassette C1 and therefore, the loaded silent film cassette C1 does not push the detecting member 55, which thus remains projected into the chamber 1a by the resiliency of the contact of the switch SW10 which in turn remains open. That is, the switch SW10 remains normally open, and even if the main switch SWM is closed to set the flip-flop CMFF, PMgFF and SRFF, the AND gates AND-3–AND10 do not transmit the outputs of these flip-flops to the capstan driving motor driving circuit, the pinch roller magnet driving circuit and the recording circuit, so that these circuits remain inoperative and only the film driving motor MF and the stop magnet coil FCL are sequence-controlled with the aforementioned timing. That is, in this case, even if the trigger button 16 is depressed and the switch SW2 is closed by the trigger plate 56, no current is supplied to the pinch roller magnet driving circuit and the recording circuit, so that the magnetic head 27 and the capstan driving motor Mc are normally unenergized with the displacement members 35 and 36 remaining at the aforementioned preparatory position. As regards the other points, silent photography is accomplished in the aforementioned sequence.

Description will now be made of overlap photography.

To enable overlap photography, the pointer 8a on the mode change-over operating ring 8 must be registered to the mark "P" of "PS" provided on the circumference of the ring 8, that is, the cut-away 111a of the flange 111 on the shaft 9 studded in the pivotable member 110 pivotally movable with the ring 8 must be disposed at a location corresponding to the engaging portion 119b1 of the pivotable member 119, as shown in FIGS. 2A and 3. In the position of FIG. 3, overlap photography may be made but the starting button 5 for starting overlap photography is not yet depressed, so that the sliding shaft 108 is displaced outwardly of the camera and one end 106b of the sliding lever 106 has ridden on the flange 108a. Since the one end 106b of the sliding level 106 having ridden on the flange 108a is displaced rightwardly in FIG. 3, the pivotable member 119 is rotatively displaced clockwisely about the shaft 120 against the force of the spring 125. Accordingly, the restraining pawl 129a of the restraining arm 119 of the pivotable member 119 is at a position in which it is not engaged with the gear portion 97c of the take-up shaft 97 to permit the rotation of the take-up shaft 97 by the aforementioned means during the rotation of the motor MF. Also, the moving member 126 is rightwardly displaced so that the bent portion 126e of the moving member 126 is positioned to the right of the engaging portion 128b of the pivotable member 128, as shown in FIG. 3. That is, a position in which overlap photography can be effected is provided, but this position is a waiting position for overlap photography because the starting button 5 is not yet depressed.

Considering now the case where the cassette C2 is loaded in the chamber 1a, the start sequence is just the same as already described. When the starting button 5 is depressed to effect overlap photography in the course during which photography is taking place, the sliding shaft 108 is slidingly displaced inwardly of the camera, as shown in FIG. 4, and the switch SW5 is closed by a portion of the sliding shaft 108. Simultaneously therewith, the positional relation between the peripheral surface of the flange 108a and one end 106b of the sliding lever 106 is deviated and cannot be made to correspond to each other. The positional deviation between the peripheral surface of the flange 108a and the sliding lever 106 permits the sliding lever 106 to move toward the sliding shaft 108 and the pivotable member 119 to pivot counter-clockwisely when the cut-away 111a of the flange 111 and the engaging portion 119b1 of the pivotable member 119 are in corresponding positional relation. By the depression of the button 5, the positional relation between the peripheral surface of the flange 108a and the sliding level 106 is deviated, and the sliding lever 106 and the pivotable member 119 are displaced by the force of the spring 125, so that the sliding lever 106 is once disposed between the flange 108 and the button 5, whereupon the button 5 is released to complete the film rewind for overlap photography, and the sliding shaft 108 is prevented from returning to the initial position by the force of the spring 109 until the sliding lever 106 comes out from between the flange 108 and the button 5. By the button 5 being so depressed, the pivotable member 119 is rotated counter-clockwisely, whereupon the restraining pawl 129a1 of the pivotable member 119 is engaged with the gear portion 97c of the take-up shaft 97 to forcibly prevent the take-up shaft 97 from being rotated by the drive of the motor MF, thus stopping the rotation of the take-up shaft 97. At this time, the motor MF is rotating and the gear 102 is rotated by the drive of the motor MF, but the drive transmission between the gear 102 and the take-up shaft 97 is absorbed by the friction member 103, so that the take-up shaft 97 is affected in no way. In this condition, the film F2 is successively transported by the film feeding mechanism but the take-up shaft 97 is stopped and therefore, the film F2 is not taken up on the film take-up shaft in the cassette C2, so that the film is slackened into a space within the cassette C2.

Figure 24:
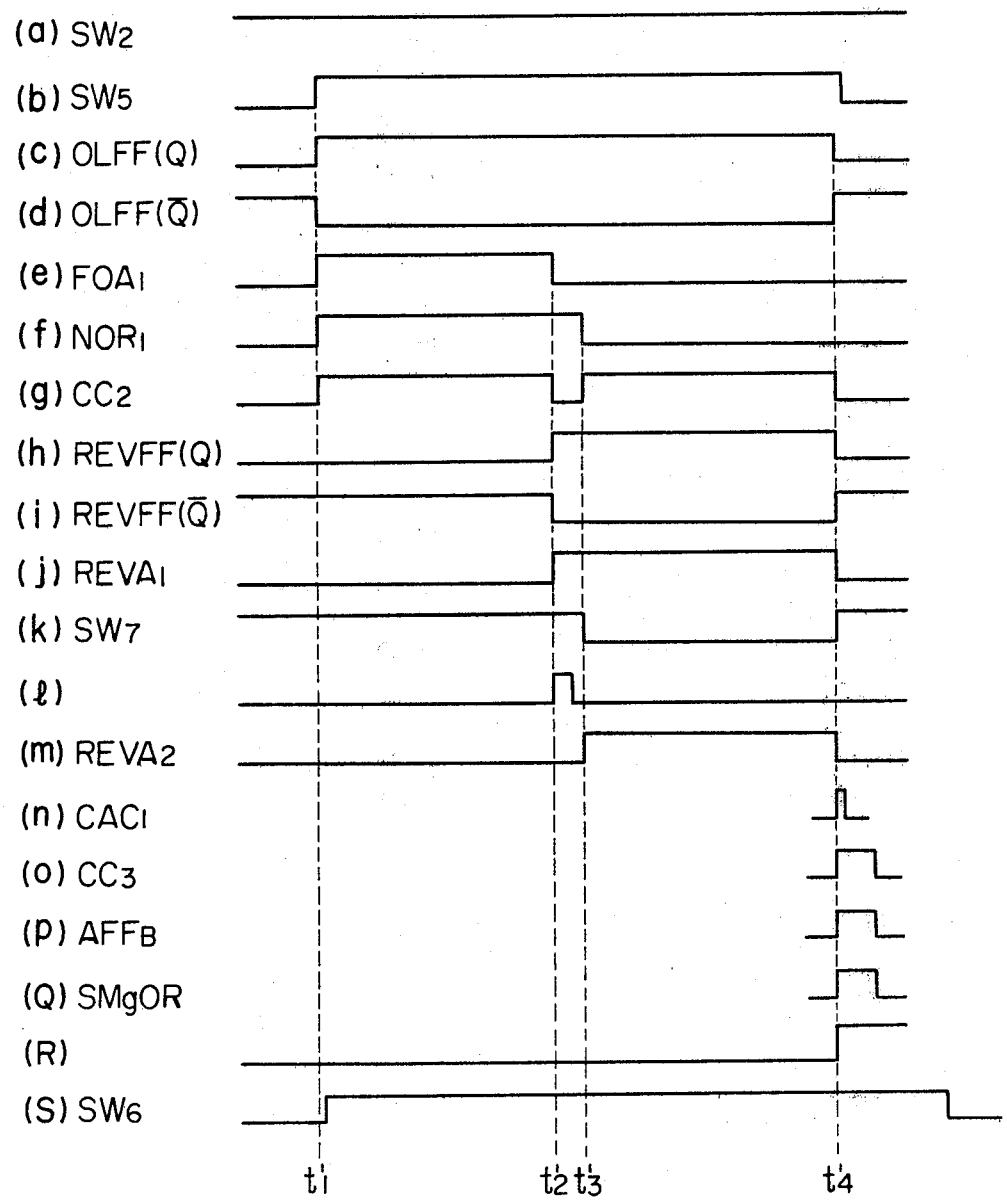
FIGS. 24 and 25 illustrate in overlap sequence operation in the sequence control circuit shown in FIG. 20.
Figure 25:
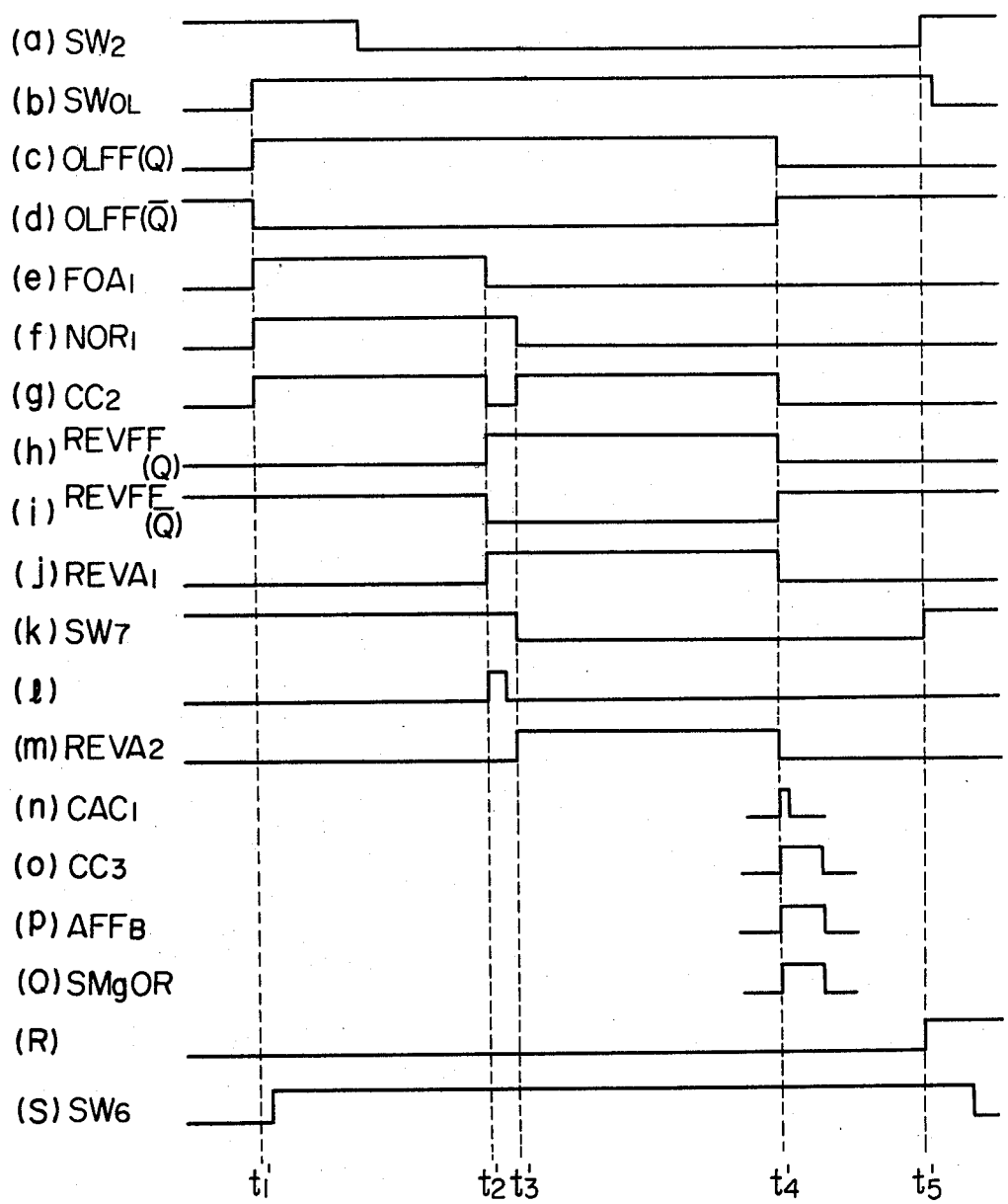

When the switch SW5 is closed upon depression of the button 5, the AND gate ANDO1 is opened and high-level signal is transmitted to the set terminal S of the flip-flop OLFF, which is set at the point of time t'1 whereat the switch SW5 is closed as shown in FIG. 24, and high-level signal is put out from the Q output terminal of the flip-flop OLFF while low-level signal is put out from the $\bar{Q}$ output terminal of the same flip-flop, as shown in FIGS. 24C and 24D. Therefore, the AND gate FOA1 which connects the Q output terminal and one input terminal of the flip-flop OLFF puts out high-level signal, and this high-level signal is transmitted to the D1 input terminal of the flip-flop FF1 through the OR gate ORF1. Thus, even if the trigger button 16 is released to open the switch SW2 after the switch SW5 is closed, the high-level signal from the AND gate FOA1 continues to be applied to the D1 input terminal of the flip-flop FF1, so that the aforementioned stop sequence does not take place but the film drive motor MF continues to rotate in the normal direction. As previously noted, the signal at the $\bar{Q}$ output of the flip-flop OLFF assumes low level at the point of time t'1, whereby low-level signal is applied to one input terminal of the NOR gate NOR1. The other input terminal of the NOR gate NOR1 is connected to the switch SW7, which is designed to be opened by being received in the recess 81e of the cam ring 81 only when the opening angle of the shutter comprising the shutter blades 71, 72 and 73 is 0°, namely, when the shutter is fully closed as shown in FIG. 12. Since the shutter is fully open at the point of time t'1 whereat the overlap operation starting button 5 is depressed, the switch SW7 is closed so that low-level signal is also applied to the other input terminal of the NOR gate NOR1. Therefore, at the point of time t1, the NOR gate NOR1 puts out high-level signal, that is, the aforementioned close signal for rotating the motor Mc in the direction to close the shutter, and turns on the transistor Tr10 of the shutter opening angle control motor driving circuit of FIG. 21E through the AND gate $AND_{CL1}$. Thus, the transistor Tr13 and Tr11 are turned on to form a power supply path of transistor Tr13-motor Ms-transistor Tr11 for the motor Ms, whereby the motor starts rotating in the normal direction. As the motor Ms starts rotating in the normal direction, the rotation of this motor Ms is transmitted through the gears 82, 83, 85, 86, 88, 81b to the cam ring 81, which is thus rotated counter-clockwisely. As the cam ring 81 is rotated in the counter-clockwise direction, the cam groove 81c of the cam ring 81 comes into engagement with the rotatable ring 80, so that the sliding member 76 is moved rightwardly in FIG. 6 and along therewith, the adjust cylinder 75 slides on the auxiliary shutter shaft 74 toward the first base plate 59 because the pin $76_1$ on the sliding member 76 is engaged with the endless groove 75a on the adjust cylinder 75, thus gradually narrowing the opening angle of the shutter to start fade-out operation.

When the fade-out operation is so started, the input signal to the reset input terminal of the counter CC2 changes from high level to low-level, so that the counter CC2 counts the pulse generated by the switch SW1 from the point of time t'1, namely, the pulse generated each time the film feed claw 25 feeds the film F2 by an amount corresponding to one frame. In this manner, the counter CC2 starts counting and when it has counted 90 pulses at the point of time t'2, the AND gate ANDO2 puts high-level signal. Therefore, the flip-flop REVFF is set at the point of time t'2 and puts out high-level signal from its Q output terminal and low-level signal from its $\bar{Q}$ output terminal. Therefore, the AND gate REVA1 puts out high-level signal at the point of time t'2 as shown in FIG. 24J and the AND gate FOA1 puts out low-level signal as shown in FIG. 24E. Thus, low-level signal is applied to the D1 input terminal of the flip-flop FF1 from the point of time t'2 to execute the above-described stop sequence and stop the film driving motor MF and stop the fade-out photography as well as the sound recording operation. When the stop sequence is executed in this manner, the film motor MF is stopped so that no pulse is transmitted to the input terminal C of the counter CC2, which thus stops its coming operation. Also, when the stop sequence is terminated, the output at the $\bar{Q}$ output terminal of the flip-flop CMFF assumes high level as already noted in connection with the stop sequence and this high-level signal is transmitted to the A3 input terminal of the AND gate REVA2. On the other hand, high-level signal which is the output of the AND gate REVA1 is being transmitted to the A1 input terminal of the AND gate and the other input terminal A2 is connected to the switch SW7, so that if the fade-out operation is terminated while the counter CC2 is effecting 90 pulse count, namely, if the shutter opening angle becomes 0°, the switch SW7 is received in the recess 81e of the cam ring 81 and opened, whereby the AND gate REVA2 puts out high-level signal and transmits such signal to the transistor Tr8-6 of FIG. 21B, thus turning on this transistor. Therefore, the transistors Tr8-2 and Tr8-5 are turned on to form a power supply path of transistor Tr8-2-motor MF-transistor Tr8-5 for the motor MF. Thus, next time, the rotation of the film drive motor MF is reversed but, even if the counter CC2 has counted 90 pulses, when the fade-out operation is not yet terminated, the AND gate REVA2 does not put out high-level signal until the shutter is fully closed with the fade-out operation being terminated, and thus the reversing operation is not started. Accordingly, before the shutter is fully closed, the film motor MF never reverses its rotation and this obviates the problem that while the shutter is open to any slight extent, the film F2 is rewound and exposed inconveniently. That is, for example, it is assumed that at the point of time t'2 whereat 90 pulses have been counted by the counter CC2, the fade-out operation has not yet been terminated. Then, at the point of time t'2, the stop sequence is executed as shown in FIG. 24(L), and fade-out photography has already been effected for 90 frames of the film with the film feed terminated, but if the shutter is not fully closed at this time for some reason or other, the switch SW7 is in ON position at this point of time so that the reversing operation does not take place. When at last the shutter has become fully closed, namely, at the point of time t′3 whereat the switch SW7 has been opened as shown in FIG. 24(K), the AND gate REVA2 puts out high-level signal as shown in FIG. 24(M), thus starting the film reversing operation. On the other hand, NOR1 also puts out low-level signal at a point of time t′3 as shown in FIG. 24F, so that the shutter opening angle control motor driving circuit becomes inoperative to maintain the shutter fully closed. When the output of REVA2 becomes high-level signal at the point of time t′3 in this manner, the transistor Tr8-6 of FIG. 21B is turned on to form the power supply path for the reverse rotation of the motor MF, thus reversing the rotation of the film driving motor MF. As the film driving motor MF is reversed in direction of rotation, the gear 93 is rotated clockwisely while the gears 115 and 117 are rotated counter-clockwisely. The clockwise rotation of the gear 93 is not transmitted to the gear 113 by the action of the one-way clutch mechanism 114 while the counter-clockwise rotation of the gear 115 is transmitted to the gear 117 by the action of the one-way clutch mechanism 118 to rotate the gear 117 counter-clockwisely. As the gear 117 is rotated counter-clockwisely, the moving member 126 is displaced leftwardly in FIG. 13 because of the engagement between the gear 117 and the rack portion 126d of the moving member 126, and disengages the gear 117 from the rack portion 126d, and is further displaced until the gear 114 comes into engagement with the rack portion 126c of the moving member 126. Such engagement between the gear 114 and the rack portion 126c of the moving member 126 due to the leftward displacement of the member 126 affects the moving member 126 in no way since the rotation of the gear 116 is not transmitted to the gear 114 by the action of the one-way clutch mechanism 114. Also, during the leftward displacement of the moving member 126 from its position of FIG. 14 to its position of FIG. 13, the engaging portion 128b of the pivotable member 128 strikes against the bent portion 126e of the moving member 126, but because the pivotable member 128 is rotatable counterclockwisely, it is rotated counter-clockwisely about the pin 170 when the engaging portion 128b of the pivotable member 128 is actuated by the bent portion of the moving member 126, so that it affects the pivotable member 119 in no way and so, after displacement, the position of FIG. 13 is provided. In this position, the restraining pawl 119a₁ of the pivotable member 119 is still in engagement with the gear 97c to forcibly stop the rotation of the take-up shaft 98. When the reverse rotation of the film driving motor MF is started, the film F2 slackened into the space within the cassette C2 by the previous fade-out operation is rewound again. When the film F2 is rewound, the rotating shaft 63 is rotated in reverse direction in response to the reverse rotation of the motor MF. When the rotating shaft 63 is so rotated, the switch SW1 repeats ON and OFF irrespective of the direction of the rotation of the rotating shaft 63, so that the counter CC2 starts counting from count 90. In this manner, the counting operation of the counter CC2 is started and when the count reaches 180, namely, when 90 frames of the film F2 is rewound, the AND gate CAC1 put out high-level signal at the point of time t′4 to reset the flip-flop OLFF. Thus, at the point of time t′4, as shown in FIG. 24(C), the $\bar{Q}$ output of the flip-flop OLFF becomes low level and the Q output thereof becomes high level. Accordingly, the counter CC2 is reset and the output of the AND gate CAC1 also becomes low level. By this, the AND gate CAC1 puts out single pulse as shown in FIG. 24(N) to reset the flip-flop REVFF. Therefore, at the point of time t′4, the $\bar{Q}$ output of the flip-flop REVFF becomes low level as shown in FIG. 24(H), and the AND gate REVA1 also puts out low level signal. With the AND gate REVA1 becoming low level, the AND gate REVA2 also becomes low level as shown in FIG. 24(M), so that the transistor Tr8-6 is turned off to cut off the aforementioned power supply path and thus, the film driving motor MF terminates its reverse rotation. Thereby, the 90 frames of the film F2 which has so far been slackened into the space within the cassette C2 by the fade-out photography operation is again rewound. Also, at this point of time t′4, the counter CC3 is reset by the single pulse put out from the AND gate CAC1 as already described and the AND gate AFF$_B$ is opened at the point of time t′4, so that from the time point t′4 the counter CC3 starts counting clock pulses CP and when it has counted 32 pulses, namely, when 32 m.sec. has passed from the starting of the count, high level signal is put out from the output terminal "32" of the counter CC3, and low level signal is transmitted to the AND gate AFF$_B$ through the inverter INO2, thus terminating the counting operation. Accordingly, only for 32 m.sec. after the point of time t′4 whereat the film reversing operation has been terminated, the inverter INO2 puts out high level signal, which turns on the transistor Tr9 of FIG. 21(D) for 32 m.sec. through the OR gate SMgOR to energize the magnet coil FCL for 32 m.sec., so that stop member 65 is operated as already described in connection with the stop sequence, thus stopping at a position in which the shutter closes the aperture 58a. Since the $\bar{Q}$ output of the flip-flop becomes high level at the point of time t′4 as already noted, if the release operation has been effected, the AND gate ANDF1 puts out high level signal at the point of time t′4 and applies the high level signal to the D1 input terminal of the flip-flop FF1 and thus, at the time point t′4 whereat the reversing operation has been terminated, the aforementioned start sequence is executed as shown in FIG. 24(R) and the film driving motor MF starts rotating in the normal direction.

When the motor MF again starts rotating the normal direction, the gear 93 is rotated counter-clockwisely and the gear 115 rotated clockwisely. The clockwise rotation of the gear 93 is transmitted to the gear 113 by the action of the one-way clutch mechanism 114 to rotate the gear 113 clockwisely. However, the counter-clockwise rotation of the gear 115 is not transmitted to the gear 117 by the action of the one-way clutch mechanism 118. As the gear 113 is rotated, the displacement member 126 whose rack portion 126c is in mesh-engagement with the gear 113 is displaced rightwardly. The displacement of the displacement member 126 continues until the engagement between the gear 113 and the rack portion 126c of the displacement member 126 is broken and the gear 117 comes into engagement with the rack portion 126d of the displacement member 126. The engagement between the gear 117 and the rack portion 126d of the displacement member 126 due to the rightward displacement of the member 126 affects the displacement member 126 in no way because the rotation of the gear 115 is not transmitted to the gear 117 by the action of the one-way clutch mechanism 114. As the displacement member 126 is rightwardly displaced, the bent portion 126e of the member 126 strikes against the engaging portion 128b of the pivotable member 128 to try to rotate the pivotable member 128 clockwisely, but the clockwise rotation of the member 128 is limited by the slot 128a and the pin 130 and therefore, the pivotable member 128 is not singly rotated but the pivotable member 119 is rotated with the pivotable member 128 clockwisely about the shaft 120 against the force of the spring 125. When the pivotable member 119 is rotated clockwisely, the engagement between the engaging portion 119a1 of the pivotable member 119 and the gear portion 97c of the take-up shaft 97 is broken to permit the rotation of the take-up shaft 97, and the clockwise rotation of the pivotable member 119 displaces the sliding lever 106 rightwardly to displace the end 106b of the lever 106 outwardly of the flange 108a, so that the sliding member 108 which has so far been prevented from returning by the engagement between the end 106b of the sliding lever 106 and the flange 108a is momentarily returned by the force of the spring 109 to a position whereat the peripheral surface of the flange 108a secured on the shaft 108 as shown in FIG. 3 corresponds to the end 106b of the sliding lever 106, and thus the other end 106b of the lever 106 rides onto the peripheral surface of the frange 108a. Also, the engaging portion 119b1 of the pivotable member 119 comes out of the cut-away 111a of the flange 111. When the displacement member 126 has been completely displaced rightwardly, there is brought about the position of FIG. 3 in which the bent portion 126e of the displacement member 126 rests at the right of the engaging portion 128b of the pivotable member 128, thus starting the fade-in stroke which will hereinafter be described.

On the other hand, the output of the AND gate ANDF1, namely, the open signal, is transmitted to the shutter opening angle control motor driving circuit of FIG. 21(E) and, at the point of time, t'4, the shutter opening angle is fully closed, so that the switch SW6 is closed to turn on the transistor Tr15. Accordingly, as already mentioned, the power supply path to the shutter opening anble control motor Ms which comprises transistor Tr12-121-Tr14, and the motor Ms is rotated in the opposite direction. When the reverse rotation of the motor Ms is started, such rotation of the motor Ms is transmitted to the cam ring 81 through the gears 82, 83, 85, 86, 88 and 81b in the same manner as described with respect to the fade-out photography, thus rotating the cam ring 81 clockwisely. As the cam ring 81 is rotated clockwisely, the adjust cylinder 75 is moved leftwardly in FIG. 6, conversely to the fade-out photography operation. As the adjust cylinder 75 is so moved leftwardly, the opening angle of the shutter comprising the shutter blades 71, 72 and 73 is gradually widened to effect fade-in operation. When the shutter opening angle becomes fully open, namely 220°, then the switch SW6 is received in the recess 81d of the cam ring 81, and thus opened. By the opening of the switch SW6, the motor Mc is stopped to maintain the shutter opening angle at 220°. In this manner, fade-in photography is effected on the same 90 frames of the film on which fade-out photography was effected, thus executing overlap photography. Thereafter, normal photography is effected until the trigger button 16 is released. When the trigger button 16 is released, photography is terminated by the aforementioned stop sequence. When fade-in photography is started, the switch SW7 is closed and high-level signal is transmitted to the A2 input terminal of the AND gate ANDO1, but since the switch SW5 is designed to be opened, as described, when fade-in photography is started, the flip-flop OLFF remains reset. The foregoing description has been made of the case where the trigger button 16 continues to be depressed, but description will now be made of the case where the trigger button 16 is released in the course of overlap photography. In this case, as already noted, even if the trigger button 16 is released, high-level signal is put out from the AND gate FOA1 to the D1 input terminal of the flip-flop FF1 and therefore, the stop sequence is not started until fade-out operation is completed, and the same sequence as that already described is executed, that is, fade-out and reversing operation are executed, but since the AND gate ANDF1 does not put out high-level signal at the point of time t'4 whereat the reversing operation has been terminated, the start sequence is not executed and the film driving motor Mc remains stopped and the open signal is neither put out and thus, the fade-in operation is neither executed and photography is not effected until the trigger button 16 is depressed. At the point of time t'5 the trigger button 16 is again depressed to thereby close the switch SW2 as shown in FIG. 25C and at the time, the AND gate ANDF1 puts out high-level signal so that the start sequence is executed at the point of time t'5 and the open signal is put out, thus effecting the fade-in operation for the first time after depression of the trigger button, as already described. Therefore, even if the trigger button is released during overlap photography, fade-out photography is automatically effected on 90 frames of the film F2, and the 90 frames of the film F2 is automatically rewound by the described operation, so that if the trigger button 16 is depressed, fade-in photography is reliably effected on the frames of the film on which fade-out photography has been effected, thus preventing the photography from being terminated in the course of fade-out.

Description will now be made of the speed control of fade-out and fade-in operation during the fade-out and fade-in operation. Assume that fade-out and fade-in operation are taking place at a steady state speed of the opening angle control motor Ms at which the motor effects one full rotation per 8 m.sec. In this condition, the switch SW11 is adapted to shift from OFF position to ON position per rotation of the motor Ms as shown in FIG. 26A, so that each time the switch SW11 shifts from OFF position to ON position, high-level signal is applied to the D input terminal of the flip-flop SCOFF, and each time the switch SW11 shifts from OFF position to ON position, low-level signal is put out from the output terminal of the flip-flop SCOFF with a time delay corresponding to the clock width, as shown in FIG. 26C. Accordingly, the output of the AND gate ASCO1 assumes high level during the time from when the switch SW11 is closed as shown in FIG. 26C until the $\overline{Q}$ output of the flip-flop SCOFF assumes low level. As described above, the switch SW11 shifts from OFF position to ON position per period of the motor Ms, so that the output pulse of the AND gate ASCO1 is also put out per period of the motor Ms. Also, since the output of the AND gate ASCO1 is being transmitted to the reset input terminal R of the counter CC4, this counter is reset to start counting per rotation of the motor Ms. Since the counter CC4 is so designed that when it counts 8 clock pulses, it renders the AND gate ASCO2 OFF to terminate its counting operation, the counter CC4 can count 8 clock pulses if the period at which the counter CC4 is reset by the output of the AND gate ASCO1, namely, the period of the motor Ms, is 8 m.sec. or more, and the counter CC4 puts out high-level signal from the output terminal "8" thereof until the motor Ms enters the next period of rotation and the counter CC4 is reset by the output of the AND gate ASCO1. Therefore, when the period of the motor Ms is 8 m.sec. or more, high-level signal is put out from the output terminal "8" of the counter CC4, as shown in FIG. 27B, and when pulse RC1 of FIG. 27A is put out from the AND gate ASCO1, the flip-flop SCAFF puts out high-level signal from its output terminal Q, as shown in FIG. 27C, until the next period of rotation of the motor Ms is entered. Accordingly, high-level signal is put out from the OR gate SCOR1 for the said period and so, the AND gates ANDOP1 and ANDCL1 are opened to continue to apply open or close signal to the shutter opening angle control motor driving circuit during one period of the motor Ms, so that the motor Ms increases its rotational speed. In the process wherein the motor Ms is controlled in this manner, when the period of the motor Ms has become less than 8 m.sec., no high-level signal is put out from the output terminal "8" of the counter CC4 and therefore, even if single pulse is put out from the AND gate ASCO1, no high-level signal is put out from the output terminal of the flip-flop SCAFF, as shown at the point of time $t_a$ in FIG. 27C. Therefore, for the period from the point of time $t_a$ to the point of time $t_b$ in FIG. 27, the AND gate ANDCP1 or ANDCL1 is controlled by the output from the AND gate ANDSC1. The AND gate ANDSC1 has its input terminal connected to the output terminal "2" of the counter CC4 through the inverter INSCA and the other input terminal A2 connected to the output terminal "1" of the counter CC4, so that the output of the AND gate ANDSC1 puts out pulse during the period of the motor Ms only when the counter CC1 has counted 1 pulse and when the counter CC1 has counted 5 pulses, so that the open or close signal is transmitted to the shutter opening angle control motor driving circuit only for 2 m.sec. during one period, thus descreasing the rotational speed of the motor Ms. In this manner, the rotational speed of the motor Ms is controlled to execute fade-in and fade-out photography at the steady state rotational speed.

Figure 29:
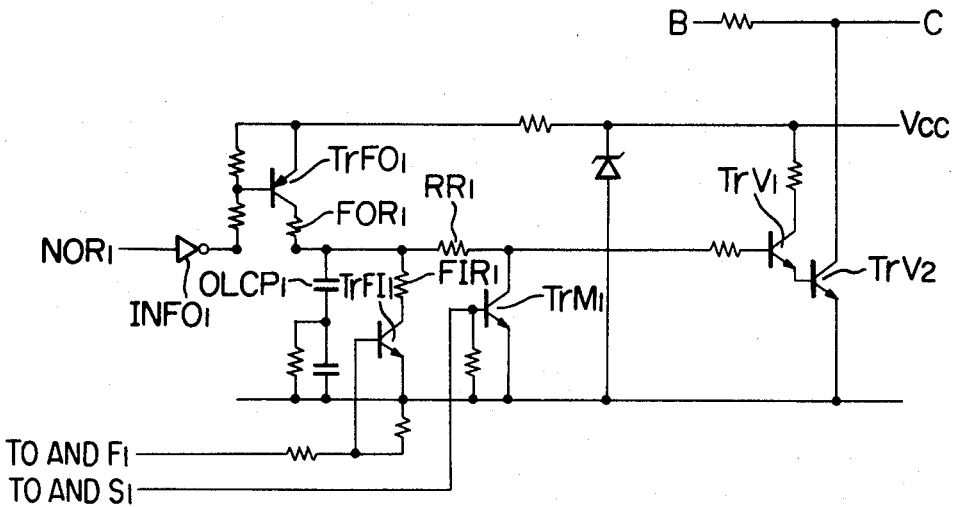
FIG. 29 is a detailed representation of a sound fade control circuit applied to the sequence control circuit of FIG. 28.
Figure 22:
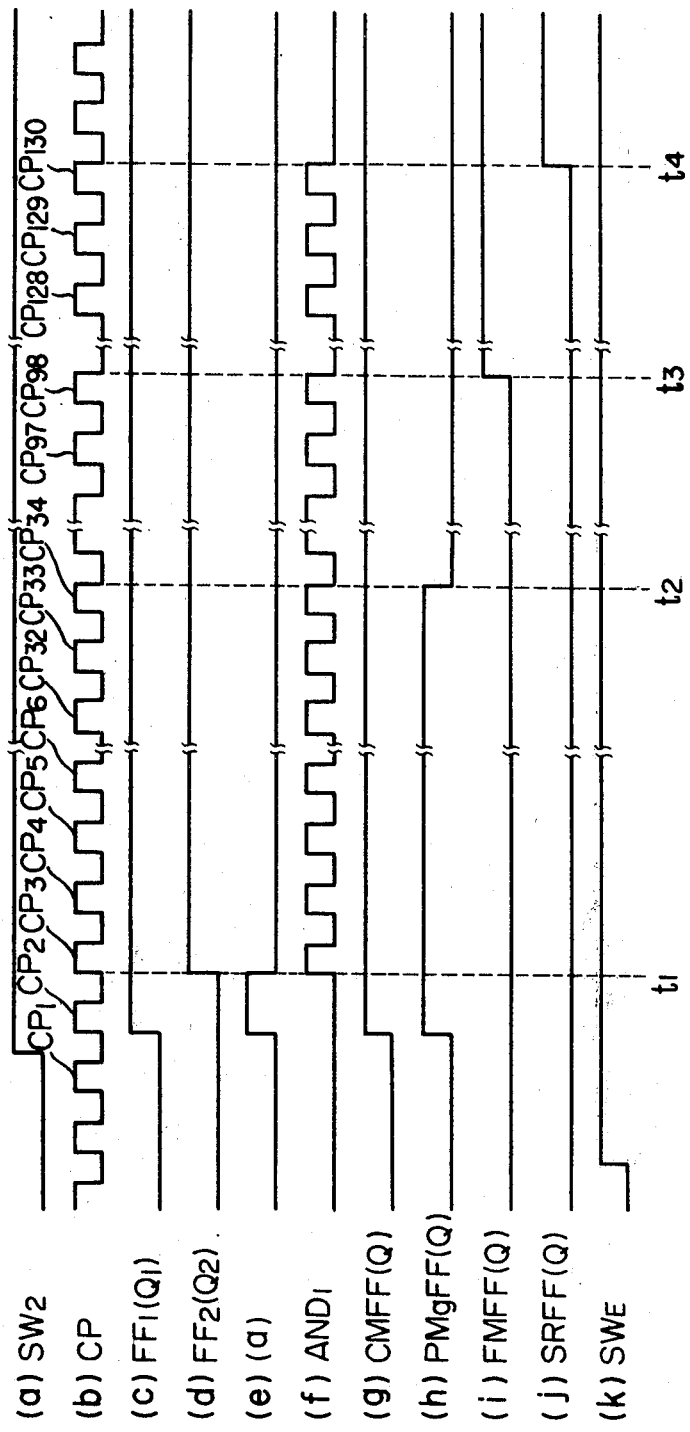
FIG. 22 illustrates the start sequence operation in the sequence control circuit shown in FIG. 20.
Figure 23:
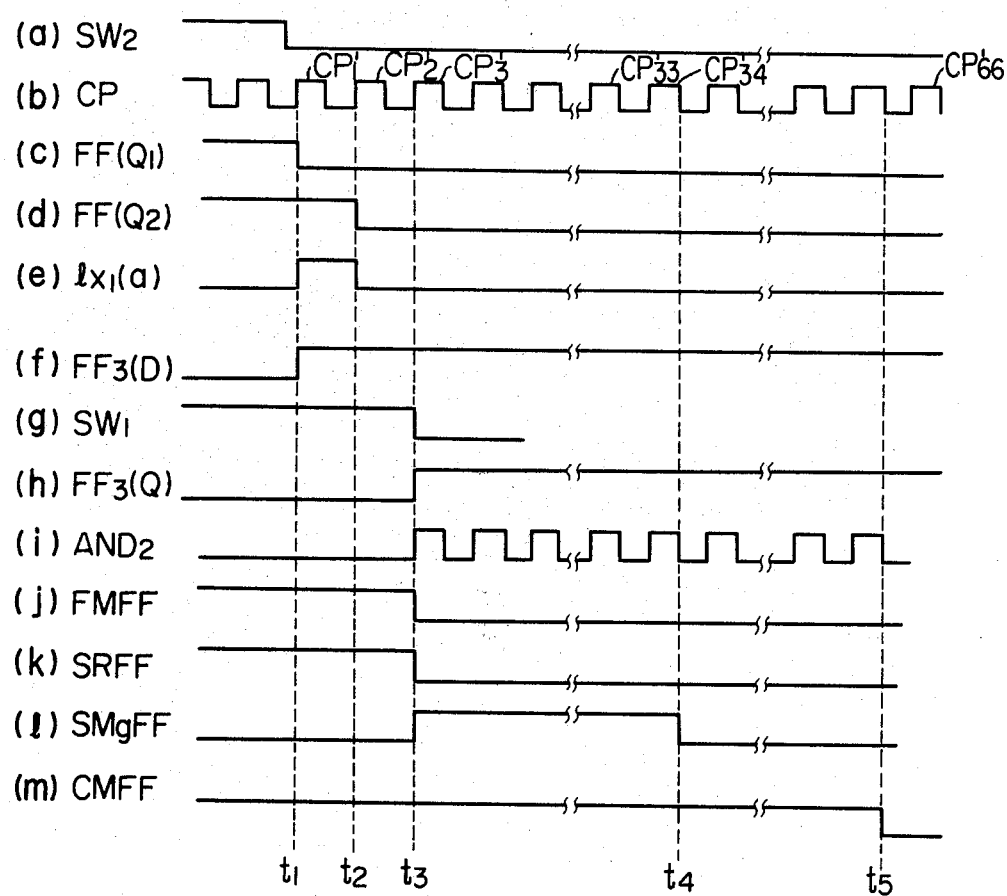
FIG. 23 illustrates the stop sequence operation in the sequence control circuit shown in FIG. 20.
Figure 28A:
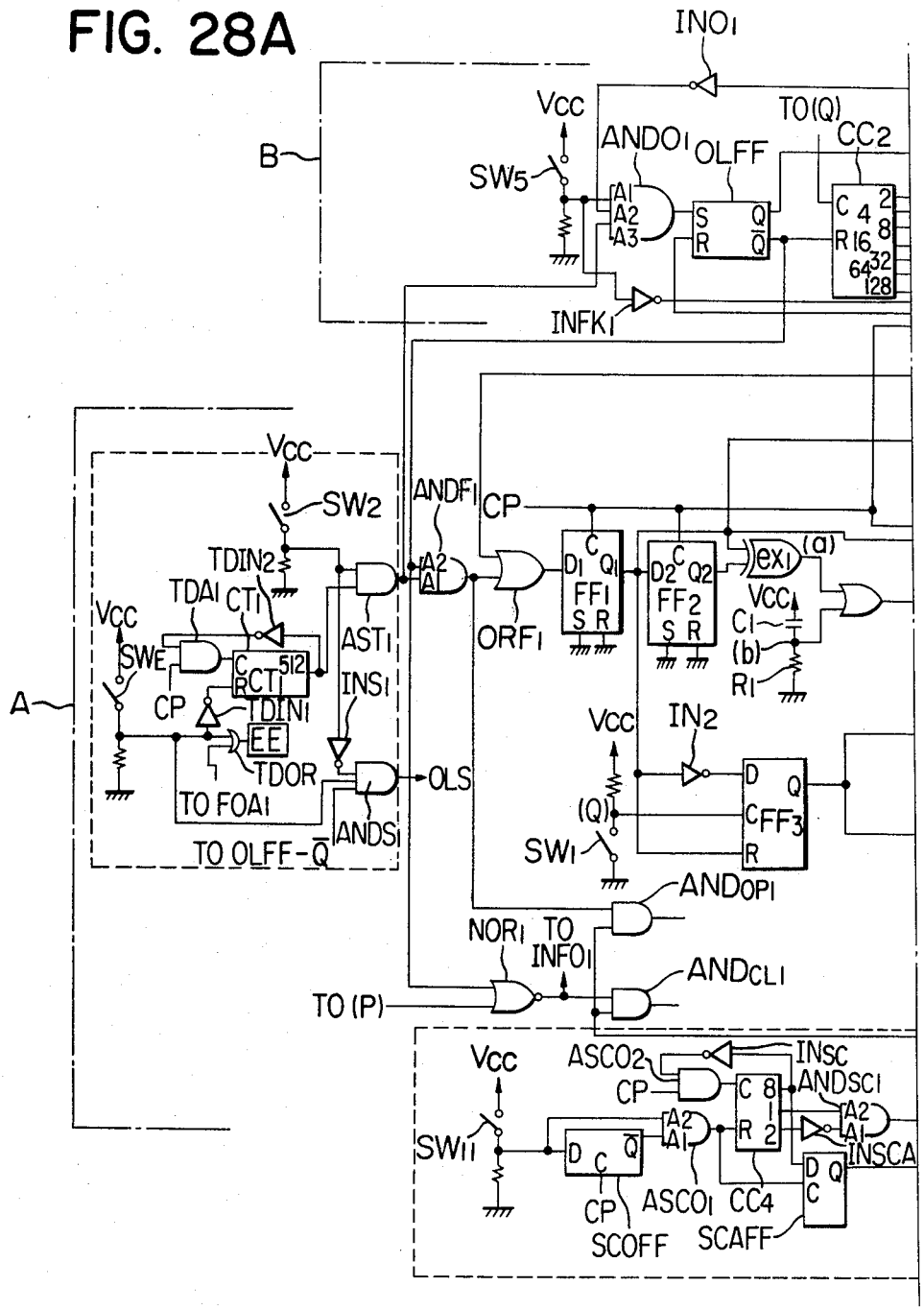
FIG. 28 is a circuit diagram of a modification of the sequence control circuit shown in FIG. 20, this circuit being capable of automatically effecting image and sound overlap photography.
Figure 28B:
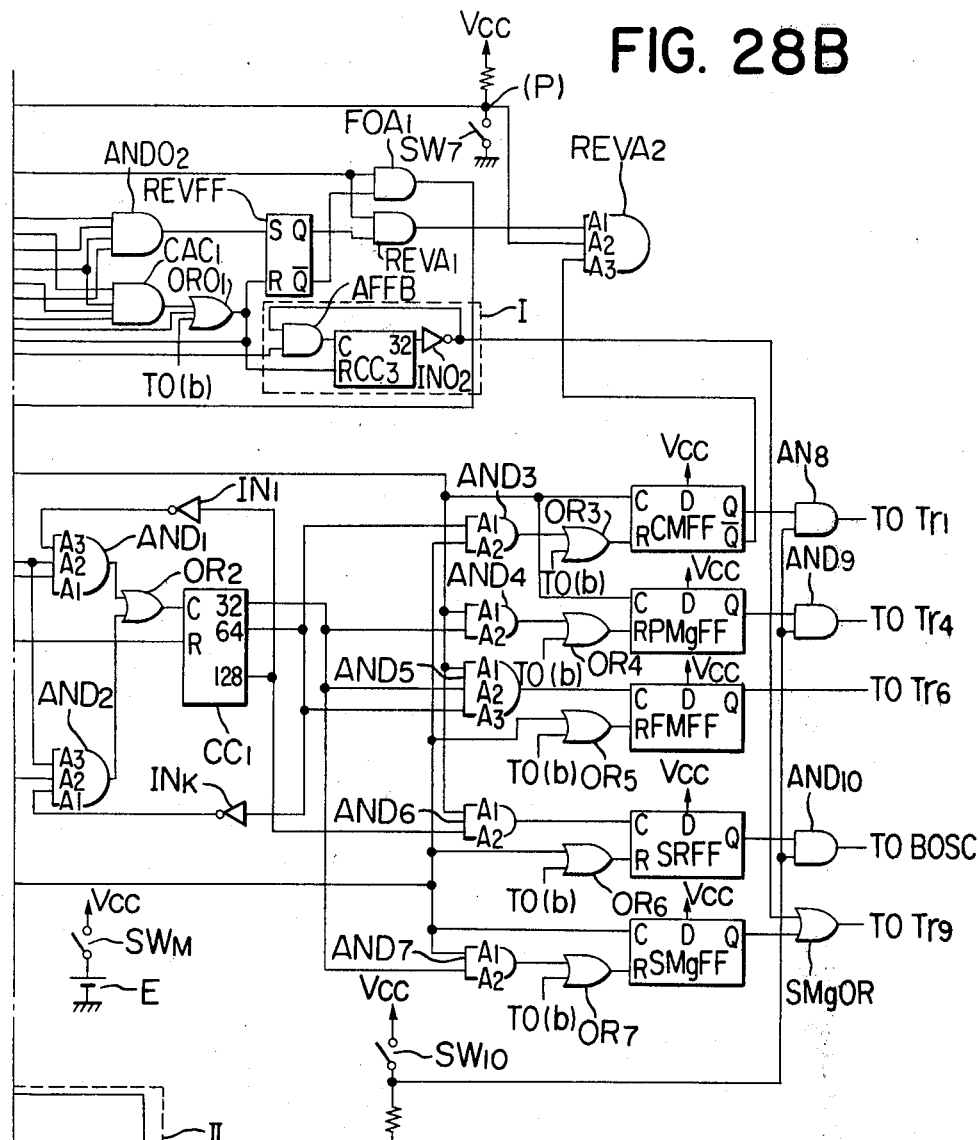
Figure 28:
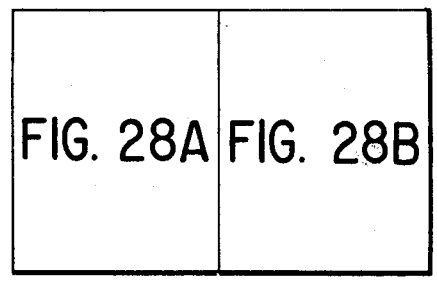

FIG. 28 is a circuit diagram showing an embodiment of the sequence control circuit in a third embodiment of the present invention. This embodiment is substantially identical in construction to the embodiment of FIG. 20, and those parts similar to those in the FIG. 20 embodiment are given similar reference characters. This embodiment differs from the second embodiment in that it can effect sound overlap recording during overlap photography. The capstan motor driving circuit and the pinch roller magnet driving circuit used in the sequence control circuit of this embodiment are the same as those used in FIG. 20, and the film motor driving circuit is the same as that used in FIG. 21B. The recording circuit is the same as that used in FIG. 17C, the stop magnet driving circuit is the same as that used in FIG. 21D, and the shutter opening angle control circuit is the same as that used in FIG. 21E, and these circuits need not be described in detail. The sound fade control circuit SFC forming a recording circuit is shown in FIG. 29. In FIG. 29, INFO1 is an inverter whose input terminal is connected to the output terminal of the NOR gate NOR1 of FIG. 28. TrFO1 is a transistor which is turned on in response to the low-level signal from the inverter INFO1. FOR1 is a resistor, and OLCP1 is a capacitor. By the time constant of the resistor FOR1 and the capacitor OLCP1, the sound fade-out time is determined.

TrFI1 is a transistor whose base is connected to the output terminal of the AND gate ANDF1 of FIG. 28. FIR1 is a resistor for determining the sound fade-in time, and TrM1 is a transistor whose base is connected to the output terminal of the AND gate ANDS1. BR1 is a resistor having a relatively high resistance value. TrV1 and TrV2 are transistors forming variable inpedance elements and designed to exhibit an inpedance value corresponding to the output of the capacitor OLCP1.

Operation of the third embodiment of the present invention shown in FIG. 28 will now be described.

Description will first be made of the normal photography in which images and sounds are recorded simultaneously by the use of the sound film cassette C2 containing therein a sound film F2. In this case, the sound film cassette C2 is first loaded in the chamber 1a and the main switch $SW_M$ is closed. Thereby, as in the embodiment of FIG. 15, high-level signal is generated from the time constant circuit comprising the capacitor C1 and the resistor R1 to reset the counter CC1 and the flip-flop REVFF, CMFF, PMgFF, FMFF, SRFF and SMgFF.

In this state, the trigger button 16 is depressed to displace the trigger plate 56 rightwardly in FIG. 3, whereupon the EE switch SWE is closed in the first stroke of the trigger plate 56 and the known automatic aperture control circuit EE comprising a metering circuit or the like is operated to control the aperture in accordance with brightness. As the trigger button 16 is further depressed, the switch SW2 is closed by the trigger plate 56 in the second stroke. Therefore, in the same manner as described in connection with FIG. 15, high-level signal is put out from the AND gate AST1 after the operation of the aperture control circuit EE has become stable, and this signal is transmitted to the D1 input terminal of the flip-flop FF1 through the AND gate ANDF1 and the OR gate ORF1, as in the embodiment of FIG. 15. Thus, the aforementioned start sequence is executed and simultaneous recording and photography of sounds and images are executed in the same manner as described with respect to the embodiment of FIG. 15. In the process during which the start sequence for normal photography is executed, the flip-flop OLFF is reset and so, the $\overline{Q}$ output of this flip-flop has become high-level signal while the output of the NOR1 is retained at low-level with the transistor TrFO1 of FIG. 29 turned off, and the AND gate ANDF1 puts out high-level signal as long as the switch SW2 is closed, so that the transistor TrFI1 of FIG. 29 is turned on and thus, in this condition, the transistors TrV1 and TrV2 are maintained turned off. Accordingly, the result is that the sound fade control circuit is in inoperative condition and sounds are recorded as they are, without accompanying the fade effect.

When the trigger button 16 is released in the process during which the simultaneous recording and photography are executed in this manner, the switch SW2 becomes open to apply low level signal to the D1 input terminal of the flip-flop FF1. Thus, the stop sequence is executed to terminate the photography.

Description will now be made of the sequence control for the silent photography effected by the use of the silent film cassette C1 containing therein the silent film F1 which is capable of recording images only.

Again in the case of the silent photography, the same control as the sequence control for the simultaneous recording and photography of images and sounds is effected. In the case of the silent photography, however, the film cassette C1 loaded in the chamber 1a of the camera body 1 is one for silent photography, so that the silent film cassette C1 loaded in the chamber 1a does not push the detecting member 55 and therefore, the detecting member 55 is maintained projected into the chamber 1a by the resiliency of the contact of the switch 174 and the switch SW10 remains open. Thus, the switch SW10 is retained open and even if the main switch SWM is closed and the flip-flop CMFF, PMgFF and SRFF are set, the AND gate AND8-AND10 do not transmit the output of these flip-flops to the capstan driving motor drive circuit, the pinch roller magnet driving circuit and the recording circuit of FIGS. 21A and C and therefore, these circuits remain inoperative and only the film driving motor MF and the stop magnet coil FCL are sequence-controlled with the aforementioned timing. Thus, in this case, even if the trigger button 16 is depressed and the switch SW2 is closed by the trigger plate 56, no power is supplied to the pinch roller magnet driving circuit and the recording circuit, so that the displacement members 35 and 36 remain at the aforementioned preparatory position and no current is normally supplied to the magnetic head 27 and the capstan driving motor Mc. As regards the other points, silent photography is accomplished by the aforementioned sequence.

Overlap photography will now be described.

First, consider the case where the sound film cassette C2 is loaded in the chamber 1a. The start sequence is as described previously and in the course of simultaneous recording and photography of images and sounds, the overlap operation starting button 5 is depressed, whereupon the switch SW5 is closed as described in connection with the previous embodiment. By the closing of this switch SW5, the AND gate ANDO1 is opened as in the second embodiment to transmit high-level signal to the set terminal S of the flip-flop OLFF to thereby set the same flip-flop, and high-level signal is put out from the Q output of the flip-flop OLFF while low-level signal is put out from the $\bar{Q}$ output of OLFF. The AND gate FOA1 puts out high-level signal, which is transmitted to the D1 input terminal of the flip-flop FF1 through the OR gate ORF1, so that even if the trigger button 16 is released to open the switch SW2, the high-level signal is continuedly applied from the AND gate FDA to the D1 input terminal of the flip-flop FF1 and thus, the aforementioned stop sequence does not take place but the film driving motor MF continues to rotate in normal direction. The signal at the $\bar{Q}$ output terminal of the flip-flop OLFF assumes low level, whereby the NOR gate NOR1 puts out high-level signal, i.e. the aforementioned close signal and turns on the transistor Tr10 in the shutter opening angle control motor driving circuit of FIG. 21E through the AND gate ANDCL1. Therefore, the transistors Tr13 and Tr11 are turned on to form a power supply path of transistor Tr13-motor Ms-transistor Tr11 for the motor Ms, which thus starts rotating in normal direction. Thus, as already noted, the shutter opening angle is gradually narrowed to start fade-out operation.

Also, when the switch SW5 is closed by the depression of the overlap photography starting button 5, the input signal to the reset terminal of the counter CC2 changes from high level to low level, so that the counter CC2 counts the pulse generated by the switch SW1, namely, the pulse generated for each frame of the film. When the counter CC2 having started counting has counted 90 pulses, namely, when 90 frames of the film has been fed after the fade-out has been started, the AND gate ANDO2 puts out high-level signal. Therefore, the flip-flop REVFF is set and puts out high-level signal from its Q output terminal and low-level signal from its $\bar{Q}$ output terminal. Thus, the AND gate REVA puts out high-level signal while the AND gate FOA1 puts out low-level signal. Therefore, low-level signal is applied to the D1 input terminal of the flip-flop FF1 to execute the aforementioned stop sequence and the film driving motor MF is stopped to terminate the fade-out photography and sound recording. When the stop sequence is so executed, the film motor MF is stopped so that the pulse is no longer transmitted to the input terminal of the counter CC2 and thus, the counter CC2 stops counting. Also, when the stop sequence is terminated, the output at the $\bar{Q}$ output terminal pf the flip-flop CMFF assumes high level as already noted with respect to the stop sequence, and high-level signal is transmitted to the input terminal of the AND gate REVA2. When the fade-out photography is terminated, the AND gate REVA2 puts out high-level signal and transmits it to the transistor Tr8-6 of FIG. 21B to turn on this transistor. Thus, the transistor Tr8-2 and Tr8-5 are turned on and a power supply path of transistor Tr8-2-motor MF-transistor Tr8-5 is formed for the film driving motor MF.

Accordingly, the film driving motor MF reverses its direction of rotation to effect reversing operation. Also, when the fade-out operation is completed, the switch SW7 is opened so that the NOR gate NOR1 puts out low-level signal during the reversing operation and the close signal disappears and therefore, the shutter opening angle is maintained fully closed during the reversing operation. On the other hand, during the fade-out operation, high-level signal as close signal is put out from the NOR gate NOR1 and continues to be put out until the fade-out is completed, so that the high-level signal is transmitted as low-level signal to the transistor TrFO1 through the inverter INFO1 of FIG. 29 and thus, the transistor TrFO1 is turned on from the starting time of the fade-out. Further, the signal from the $\bar{Q}$ output terminal of the flip-flop OLFF becomes low level when the fade-out operation is started and therefore, the AND gate ANDF1 puts out low-level signal to turn off the transistor TrFF1, so that the capacitor OLCP1 starts being charged through the resistor FOR, from the starting time of the fade-out. Therefore, the base potential of the transistor TrV1 becomes higher as a function of time, so that the impedance of the transistor TrV2 is decreased as a function of time. Accordingly, the audio signal level applied to the input terminal B of the sound fade control circuit SFC1 is transmitted to the output terminal C in a condition wherein it is decreased as a function of time, thus executing the sound fade-out recording corresponding to the image fade out. When the fade-out recording and photography is executed in this manner and the fade-out is terminated, the output of the NOR gate NOR1 becomes low level as already noted, so that the transistor TrFO1 is turned off to cut off the power supply path to the capacitor OLCP1, but since the resistor RR1 is high, the change of the capacitor OLCP1 is held. Thus, the sound fade-out is executed at the same time with the fade-out of the shutter opening angle. After the fade-out operation has been completed in the manner described above, high-level signal is put out from the AND gate REVA2 and the film motor MF starts rotating in the reverse direction, whereupon the reversing operation is started, and the switch SW1 again comes to repeat ON and OFF, so that the counter CC2 starts counting the pulse after 90 pulses. The counting operation of the counter CC2 is so started and when the count reaches 180, namely, when 90 frames of the film is rewound, the AND gate CAC1 puts out high-level signal to reset the flip-flop OLFF. Therefore, the Q output of the flip-flop OLFF becomes low level and the $\overline{Q}$ output thereof becomes high level. Accordingly, the counter CC2 is reset and the output of the AND gate CAC1 also becomes low level. By this, the AND gate CAC1 puts out single pulse to reset the flip-flop REVFF. Thus, the Q output of the flip-flop REVFF becomes low level and the AND gate REVA2 also assumes low level, so that the transistor Tr8-6 of FIG. 21B is turned off to cut off the above-mentioned power supply path, and the film driving motor MF terminates its reverse rotation. Thus, only the 90 frames of the film on which the fade-out was effected is rewound. Also, as mentioned previously, the counter CC3 is reset by the single pulse put out from the AND gate CAC1 and the AND gate AFFB becomes open, so that the counter CC3 starts counting the clock pulse CP and when it has counted 32 pulses, namely, after 32 pulses have been counted, high-level signal is put out from the output terminal 32 of the counter CC3 and low-level signal is transmitted to the AND gate AFFB through the inverter INO2, thus terminating the counting operation. Accordingly, only for the time 32 m.sec. after the point of time whereat the film reversing action was terminated, the inverter INO2 puts out high-level signal and turns on the transistor Tr9 of FIG. 21E for 32 m.sec. and thus, energizes the magnet coil FCL for 32 m.sec., whereby the stop member 65 is operated as described in connection with the aforementioned stop sequence, whereby the shutter is stopped at a position in which the aperture 58a is closed. Also, when the $\overline{Q}$ output of the flip-flop OLFF becomes high level as described, the AND gate ANDF1 puts out high-level signal and applies it to the D1 input terminal of the flip-flop FF1, so that the start sequence is executed from the point of time whereat the reversing operation has been terminated, and thus the film driving motor MF again starts rotating in the normal direction.

When the output of ANDF1 becomes high level, the output of the AND gate ANDOP1 also becomes high-level and by this signal, the shutter opening angle control motor driving circuit of FIG. 21A is operated to gradually widen the shutter opening angle and thus execute fade-in operation. When the shutter opening angle becomes fully open, the switch SW6 of FIG. 6 is opened to stop the motor Ms, whereafter normal photography is executed with the shutter opening angle remaining fully open until the trigger button 16 is released. In this manner, fade-in photography is effected on the 90 frames of the film on which fade-out photography was effected, thus accomplishing the overlap photography. If the trigger button 16 is left depressed even after the fade-in photography is terminated, normal photography takes place as long as the trigger button 16 is depressed. When the trigger button 16 is released, the photography comes to an end by the aforementioned stop sequence.

On the other hand, the open signal which is the output of the AND gate ANDF1 put out from the starting time of fade-in operation is transmitted to the transistor TrFI1 of FIG. 29D and turns on this transistor. Therefore, the charge in the capacitor OLCP is discharged through the resistor FIR1 and the base potential of the transistor TrV1 is decreased as a function of time, so that the impedance of the transistor TrV2 is increased also as a function of time from the starting time of fade-in and thus, the sound level applied to the input terminal B of the sound fade control circuit SFC1 is increased as a function of time, whereby the impedance of the transistor TrV2 is put out from the output terminal C of the sound fade control circuit SFC1, thus executing the sound fade-in recording in synchronism with the fade-in of images, whereafter the normal photography continues to take place until the trigger button 16 is released.

When fade-in photography is started, the switch SW7 is closed and high-level signal is transmitted to the A2 input terminal of the AND gate AND01. However, as already noted, the switch SW5 is designed to be opened when fade-in photography is started and therefore, the flip-flop OLFF remains reset. The foregoing description has been made of the case where the trigger button continues to be depressed, and description will now be made of the case where the trigger button 16 is released in the course of overlap photography. In this case, as already noted, high-level signal is put out from the AND gate FOA1 to D1 input terminal of the flip-flop FF1 even if the trigger button 16 is released, so that the stop sequence is not started until the fade-out operation is terminated and thus, just the same sequence as described above is executed and the fade-out and reversing operation are executed, but the AND gate ANDF1 does not put out high-level signal at the point of time whereat the reversing operation has been terminated, so that the start sequence is not executed and the film driving motor MF remains inoperative while the open signal is not put out, and thus the fade-in operation is neither executed, and photography does not take place until the trigger button 16 is again depressed. By depressing the trigger button 16 again, the switch SW2 is closed. At this time, the AND gate ANDF1 puts out high-level signal to execute the start sequence and put out open signal, thus effecting fade-in photography for the first time after the depression of the trigger button 16, as already described. In the sound fade recording at this time, the open signal is not put out from the AND gate ANDF1 at the end of reversing operation, and therefore the transistor TrFI1 is in OFF state. Accordingly, the charge in the capacitor OLCP1 of FIG. 29 is not discharged and the charge is retained until the trigger button 16 is again depressed. The output of the AND gate ANDS1 keeps high level from the termination of the reversing operation until the trigger button 16 is again depressed, and during such period of time, the transistor TrM1 of FIG. 29 is turned on. Therefore, during such period of time, the sound fade control circuit SFC1 of FIG. 17C is inoperative so that the sounds can be monitored at a normal level. Even if the transistor TrM1 is turned on in the described manner from the termination of the reversing operation until the trigger button 16 is again depressed, the charge in the capacitor OLCP1 is retained without being discharged because the resistor RR1 is of a high resistance. Until the trigger button 16 is again depressed, the fade-in recording is not executed and only when the trigger button 16 is depressed to close the switch SW2, the AND gate ANDF1 puts out high-level signal (open signal) and therefore, the sound fade-in recording is executed as already described. Thus, fade-in photography and fade-in recording are effected in synchronism with each other.

During the above-described fade-out operation, if the overlap photography cancel knob 6 is turned and the overlap photography starting button 5 is returned to its initial position, as described previously, the switch SW5 is opened and high-level signal is transmitted to the reset terminals of the flip-flops 12EVFF and OLFF through the inverter INFK1, so that the $\overline{Q}$ output of OLFF becomes high level and therefore, the high-level signal from NOR1 disappears to interrupt the fade-out operation. Also, if the release operation is effected at this time, the AND gate AST1 puts out high-level signal so that the AND gate ANDF1 also puts out high-level signal and thus, high-level signal is put out from the AND gate ANDOP1, whereby this high-level signal is transmitted to the transistor Tr15 through the switch SW6 to turn on this transistor, and therefore the shutter opening angle is immediately controlled in the direction to open the shutter opening angle and restores its fully open condition, whereafter normal photography takes place. At the same time, the transistor TrFI1 of FIG. 29 is turned on by the output of the AND gate ANDF1 and as mentioned above, the high-level signal from the NOR gate NOR1 has disappeared, so that the transistor TrFO1 is turned off and the charge in the capacitor OLCP1 is discharged from the point of time whereat the switch SW5 was opened, and thus the normal recording level is restored to execute normal recording and photography thereafter.

In the process during which the reversing operation is being effected with the fade-out operation terminated, if the switch SW5 is opened to interrupt the overlap photography by operating the cancel knob 6, the flip-flops REVFF and OLFF are reset as already noted, and therefore the outputs of the AND gates REVA1 and REVA2 become low level to immediately stop the reversing operation of the film motor MF. At the same time, if the switch SW2 has been closed, high-level signal is put out from the AND gate ANDF1 as already mentioned, so that the fad-in operation is immediately effected and high-level signal is transmitted to the D1 input terminal of the flip-flop FF1 and thus, the above-described start sequence is executed to execute the normal photography and recording thereafter.

The speed control for the control of the shutter opening angle during the fade-in and fade-out is effected by the circuit portion II encircled by dotted line.

Figure 30A:
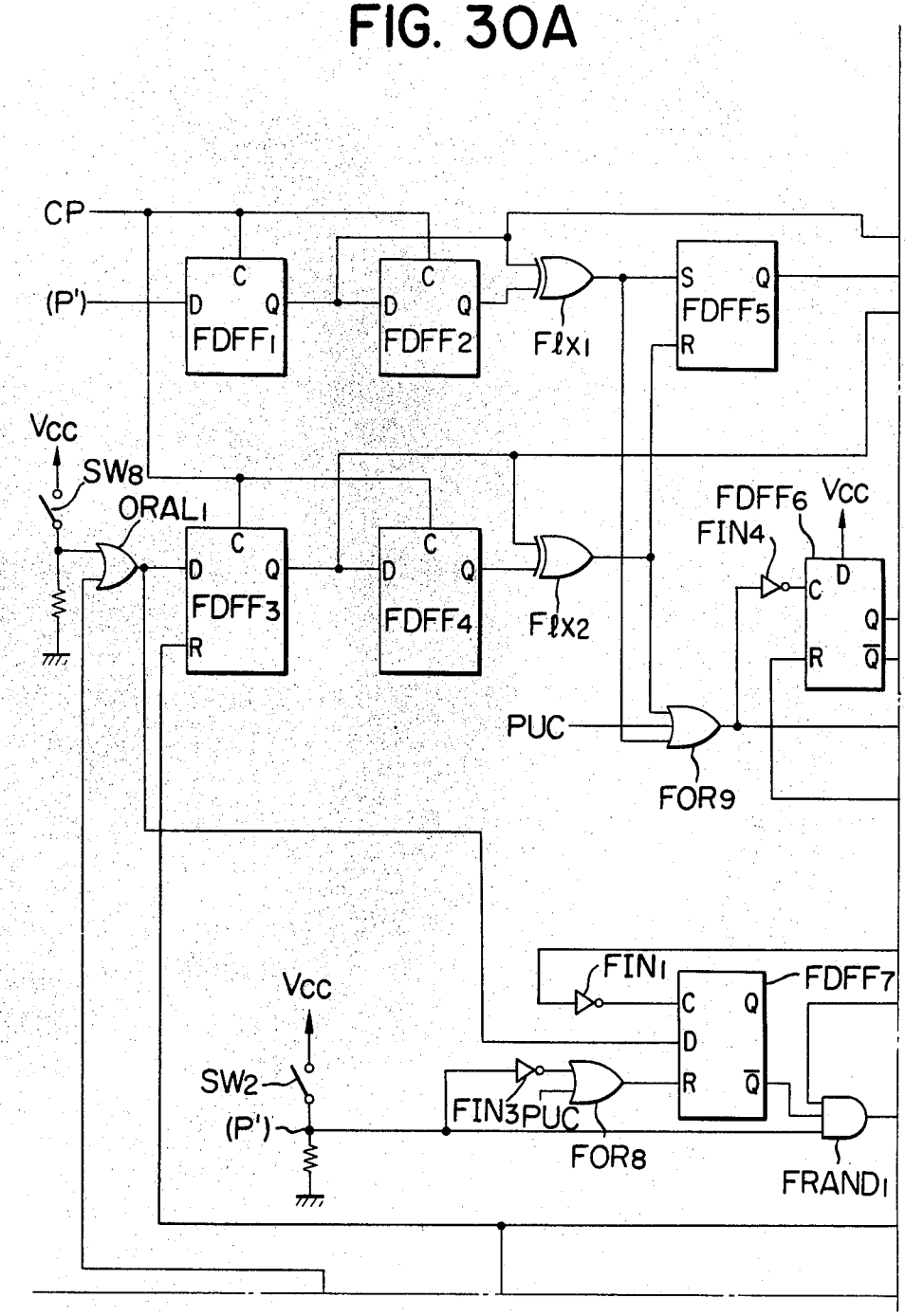
Figure 30C:
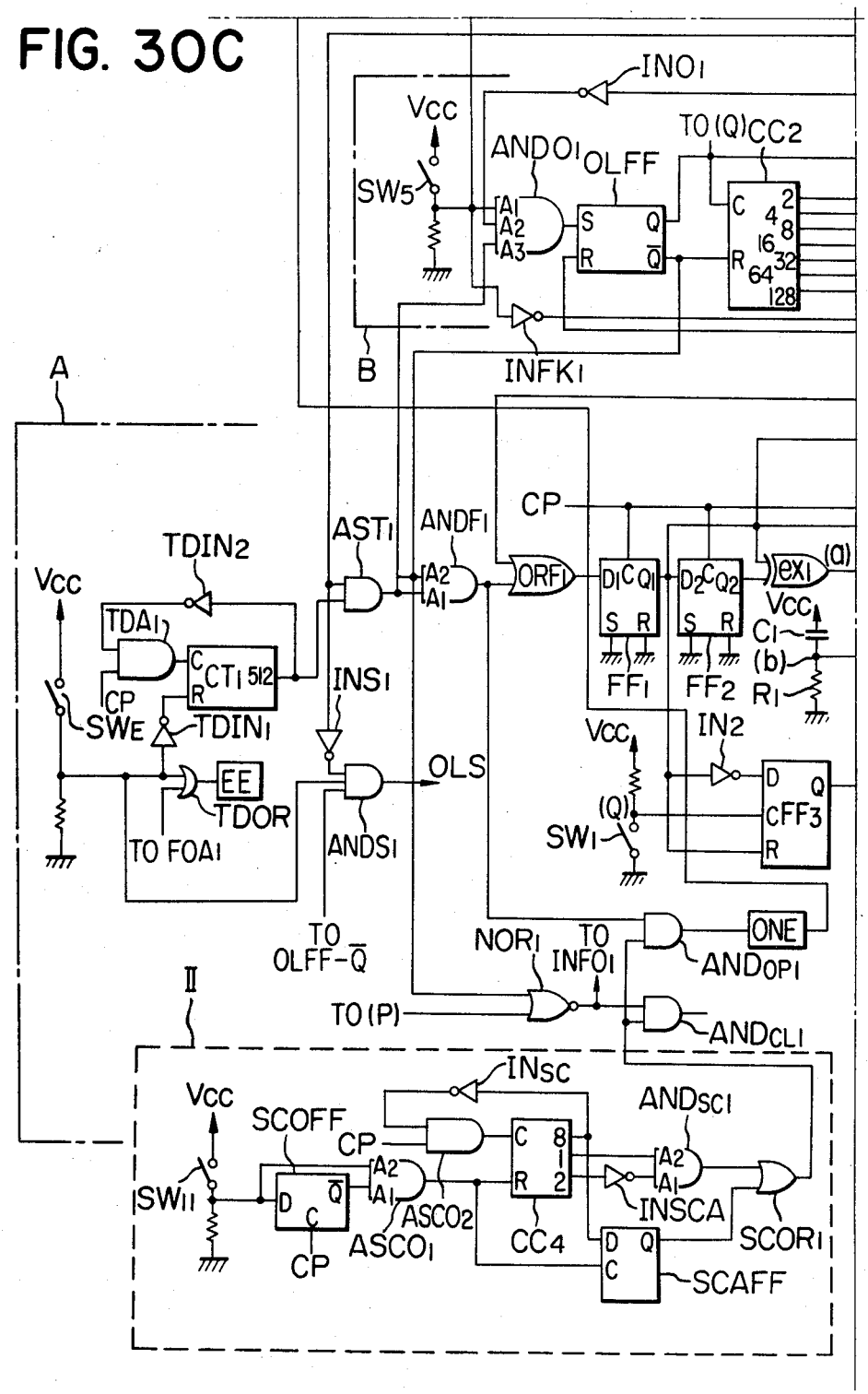
Figure 30D:
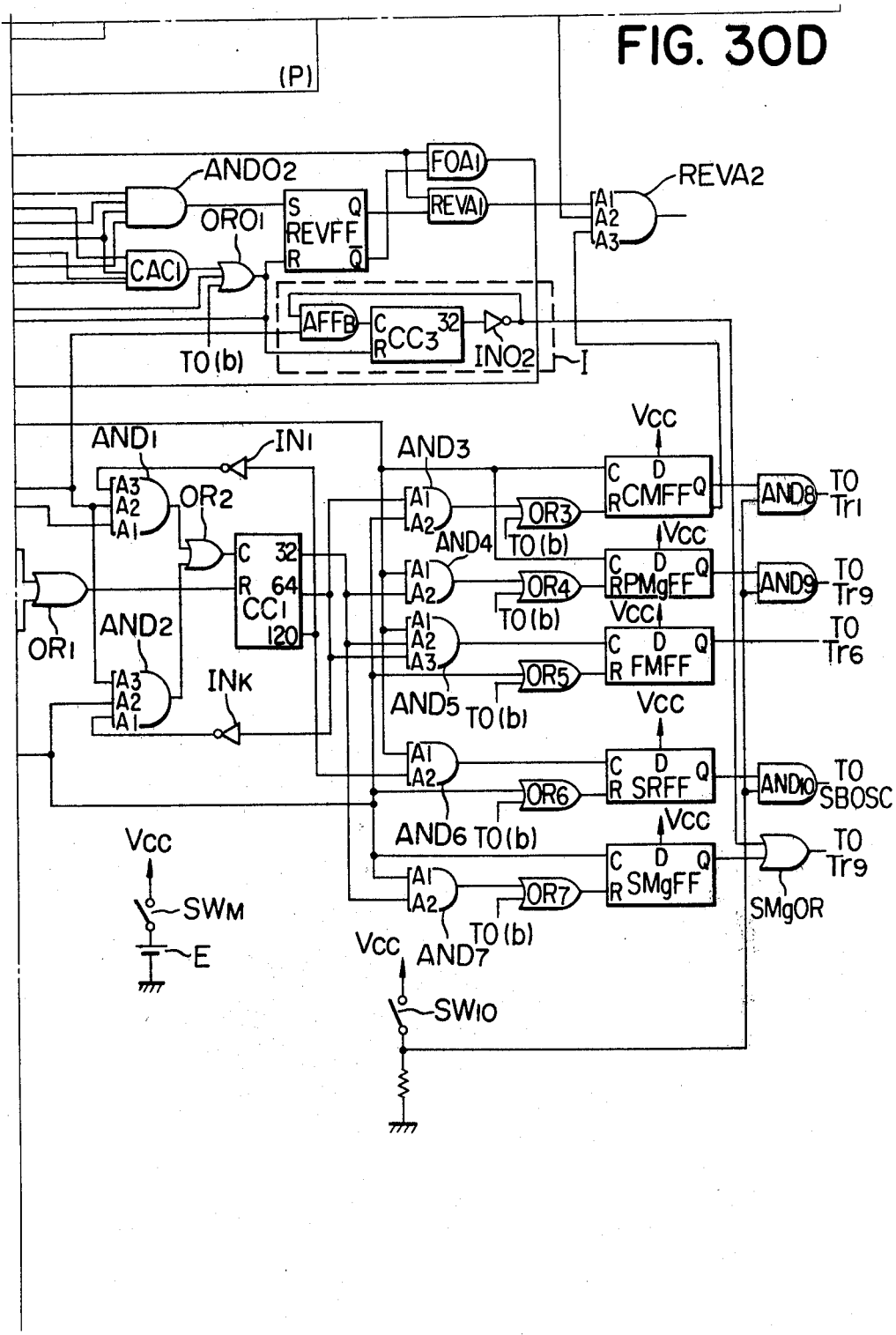
Figure 30E:
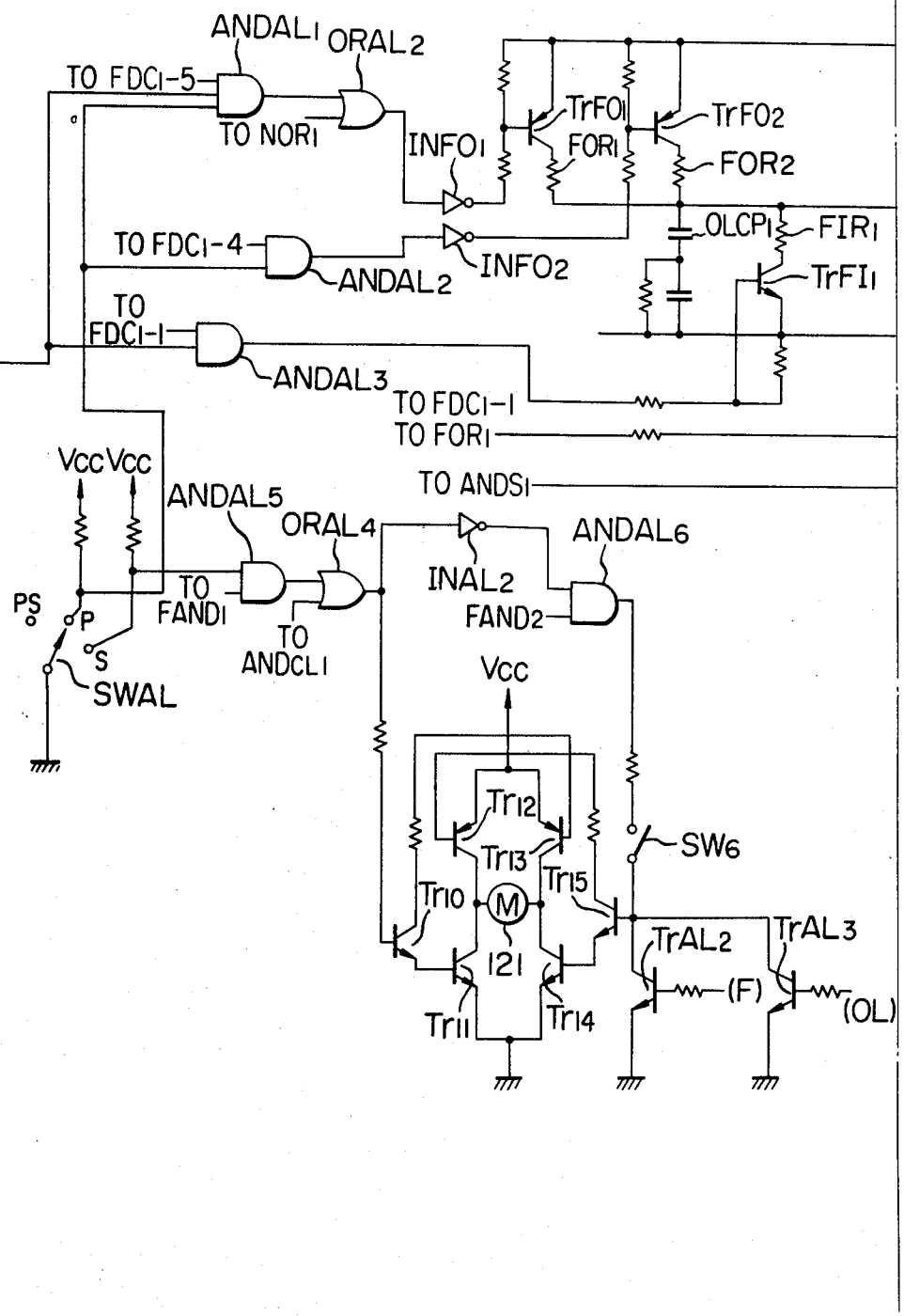
Figures 30F, 31:
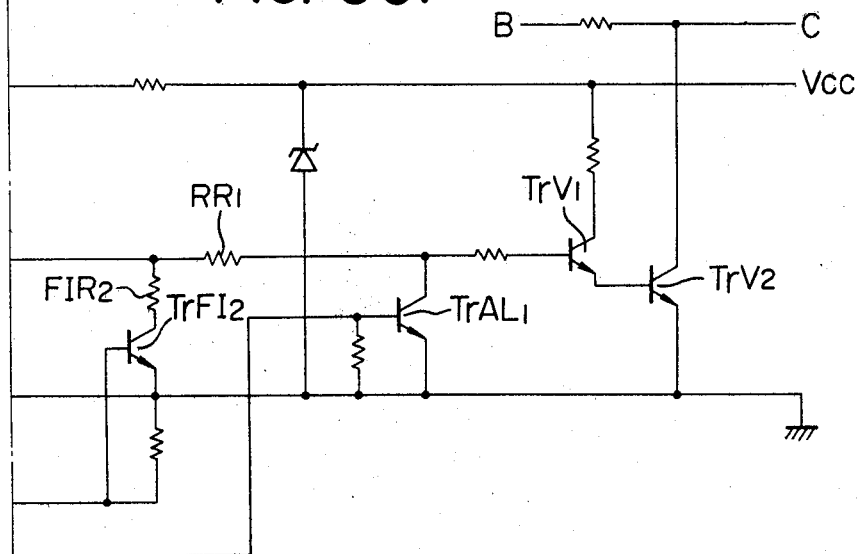

FIG. 30A, B and C are circuit diagrams showing a further embodiment of the present invention. The circuits of FIGS. 30A, B and C are connected together as shown in FIG. 31. The embodiment of FIG. 30 is designed such that all of fade photography, overlap photography and normal photography can be controlled. In this embodiment, FIG. 30A shows a circuit portion for controlling the fade photography which is substantially identical in construction to the circuit of FIG. 16, and those parts similar those in FIG. 16 are given similar reference characters. FIG. 30B shows an overlap sequence control circuit portion which is substantially identical in construction to the embodiment of FIG. 28, and those parts similar to those in FIG. 28 are given similar reference characters. FIG. 30C shows an embodiment of the sound fade control circuit of the recording circuit and the shutter opening angle control motor driving circuit, and those parts similar to those in FIGS. 17D and E are given similar reference characters. The embodiment of FIG. 30 is substantialy in identical construction to the above-mentioned embodiments and need not be described in detail, but it differs from the other embodiments in that a switch SWAL is provided for selecting fade mode and this switch is connectible with one of the contact PS for selecting the fade mode of images and sounds, the contact P for selecting the fade of images only and the contact S for selecting the fade of sounds, to thereby execute a mode of fade selected by a mode selecting logic comprising AND gates ANDAL1, ANDAL2, ANDAL3, ANDAL5, ANDAL6, OR gate ORAL2, ORAL4 and inverter INAL2. In FIG. 30C, TrAL1, TrAL2 and TrAL3 are transistors. ORAL in FIG. 30A is an OR gate and INAL1 is an inverter. In FIG. 30B, ONE shows one shot circuit for putting out a pulse of very short pulse width. The capstan motor driving circuit, the pinch roller magnet driving circuit, the film motor driving circuit, the recording circuit and the stop magnet driving circuit controlled by the embodiment of FIGS. 30A, B and C are identical in construction to those of FIGS. 17A, 21B, 17C and 17B and need not be described.

Operation of the fourth embodiment of the present invention shown in FIG. 30 will now be described. Description will first be made of the normal photography in which image and sounds are recorded simultaneously by the use of a sound film capable of recording both images and sounds. Assume that a sound film casette is loaded in the camera. Thus, the switch SW10 is closed, as already noted. In this state, when the main switch SWM is closed, each flip-flops is reset to bring about a position ready for photography. Thereafter, the release button is depressed and the switch SWE is closed in the first stroke of the release button, and the aperture control circuit EE is operated to control the aperture. Then, in the second stroke of the release button, the switch SW2 is closed, whereupon high-level signal is put out from the AND gate FRAND, is described in connection with FIG. 16, and such signal is applied through the AND gate AST to one input terminal A1 of the AND gate ANDF1. Since this is normal photography, the switch SW5 is opened and the flip-flop OLFF is in reset condition, so that high-level signal is also applied to the A2 input terminla of the AND gate ANDF1, which thus puts out high-level signal. Therefore, high-level signal is applied to the D1 input terminal of the flip-flop FF through the OR gate ORF1 to execute the aforementioned start sequence and execute the simultaneous recording and photography by the described operation. When the release button is released during the simultaneous recording and photography, the switch SW2 is opened and the AND gate FRAND puts out low-level signal, so that low-level signal is also transmitted to the D1 input terminal of the flip-flop FF1, to thereby terminate the aforementioned stop sequence.

Description will now be made of a case where fade-out operation is effected to execute fade-out photography in the course of photography. Fade-out operation of images and sounds will first be described. In this case, the switch SWAL is connected to the contact PS. In this condition, it is assumed that normal photography is taking place. Then, as described with respect to the operation of FIG. 16, the Q outputs of the flip-flops FDFF1 and FDFF5 are putting out high-level signals. Assume that the camera is caused to fade an object to be photographed by fade-out and the fade button 152 has been depressed. By the depression of the fade button, the switch SW8 is closed and high-level signal is transmitted through the OR gate ORAL1 to the D input terminal to the flip-flop FDFF3, whereupon the counter FCC1 starts counting by the operation described in detail with respect to FIG. 16 and decoder FDC1 puts out high-level signal from its output terminal 5. Therefore, as described in connection with FIG. 16, the AND gate FAND1 puts out clock pulse CP and transmits the signal to one input terminal of the AND gate ANDAL5. Since the switch SWAL is connected to the contact PS, high-level signal is transmitted to the other input terminal of the AND gate ANDAL5, and this AND gate ANDAL5 puts out the clock pulse CP which is applied to the transistor Tr10 through the OR gate ORAL4, so that the motor 121 is rotated in the direction to narrow the shutter opening angle as already described in connection with FIG. 17F, thus effecting fade-out of images. On the other hand, the signal from the output terminal 5 of the decoder FDC is applied to one input terminal of the AND gate ANDAL1 and high-level signal is also transmitted to the other two input terminals of the AND gate because the switch SWAL is connected to the contact SP and the switch SW5 is opened, so that the AND gate ANDAL1 puts out high-level signal and thus, the high-level signal from the AND gate ANDAL1 is transmitted to the inverter INF01. Therefore, by the operation described in detail with respect to FIG. 17D, the capacitor OLCP1 is charged to execute fade-out recording. In the process during which fade-out photography and recording are effected in this manner, the counter FCC1 is effecting counting operation as already mentioned, and in about 5 seconds after the starting of the fade-out operation, the counter FCC1 stops counting as already stated in connection with FIG. 16, while the high-level signal from the output terminal 5 of the decoder FDC1 becomes low-level signal to stop the motor 121 and terminate the fade-out photography as well as stop charging of the capacitor OLCP1, thus completing the fade-out recording. When the fade-out photography is completed, the output of the inverter FIN1 becomes high level as described in connection with FIG. 16 and the flip-flop FDFF7 is set, so that the signal at the D1 input terminal of the flip-flop FF1 becomes low level to thereby execute the stop sequence, thus automatically terminating the photography.

The above-described operation is the fade-out operation of both images and sounds, but where the fade-out operation of images only is desired, the switch SWAL may be connected to the contact P so that the AND gate ANDAL1 will put out low-level signal, whereby the capacitor OLCP1 will not be charged and the fade-out of images only will be effected. Conversely, where the fade-out operation of sounds only is to be executed, the switch SWAL may be connected to the contact S so that the AND gate ANDAL5 will continue to put out low-level signal and the motor 121 will not rotate, thus executing fade-out operation of sounds only.

Description will further be made of the case where fade-in photography succeeds to fade-out photography. In this case, the release operating member 151 is first released from its depressed condition and thereafter, the release operating member 151 is again depressed. By this, as described in connection with FIG. 28, the start sequence is executed to start simultaneous recording and photography of images and sounds. Where fade-in photography is desired thereafter, the camera is caused to face the object image and the fade button 152 is depressed to open the switch SW8. By the operation described with respect to FIG. 16, the counter FCC1 starts counting and the decoder FDC1 puts out high-level signal from the output 1. Therefore, the high-level signal from the output terminal 1 of FDC1 is transmitted to one input terminal of the AND gate FAND2 through the OR gate FOR2. Since the other input terminals of the AND gate FAND2 are connected to the OR gate FOR7 and the inverter INAL1, the AND gate FAND2 puts out clock pulse CP which is applied to one input terminal of the AND gate ANDAL6. The other input terminal of the AND gate ANDAL6 is connected through the inverter INAL2 to the OR gate ORAL4, so that high-level signal is applied to the other input terminal of the AND gate ANDAL6. Thus, the AND gate ANDAL6 puts out clock pulse CP to rotate the motor 121 in the direction to widen the shutter opening angle and execute fade-in photography. Since the switches SW5 and SW8 are opened, the transistor TrAL2 is in OFF state and affects the fade-in photography in no way. On the other hand, the high-level signal from the output terminal 1 of the decoder FDC1 is applied to one input terminal of the AND gate ANDAL3. The other input terminal of this AND gate is connected to the inverter INAL1 and the switch SW5 is opened, so that the inverter INAL puts out high-level signal and thus, the AND gate ANDAL3 puts out high-level signal. Therefore, the transistor TrFI1 is turned on and the charge in the capacitor OLCP1 is discharged as described in connection with FIG. 17D, thus executing the fade-in recording of sounds. In the process during which the fade-in photography is being executed in this manner, the counter FCC1 is counting and, in about 5 seconds after the starting of the fade-in operation, as already described in connection with FIG. 16, the counter completes its counting operation and the high-level signal from the output terminal 1 of the decoder becomes low-level signal and thus, the high-level signal from the AND gate FAND2 disappears. Therefore, the AND gate ANDAL6 also puts out low-level signal and the motor 121 stops rotating, thus terminating the fade-in photography. On the other hand, the AND gate ANDAL3 also puts out low-level signal to turn off the transistor TrFI1, thus terminating the fade-in recording. In this manner, the fade-in photography and recording are executed, but the AND gate FAND1 continues to put out high-level signal until the release button is released, so that normal photography is executed after the termination of the fade-in operation.

Where fade-in of images only is desired after the fade-out of images only, the capacitor OLCP1 is not charged from the first irrespective of the position of the switch SWAL and therefore, fade-in of images only is effected with sounds being not recorded. Conversely, where fade-in of sounds only is desired after the fade-out of sounds only, the shutter is fully opened from the first and so, the switch SW6 is closed to effect fade-in of sounds only.

Description will now be made of the case where normal photography immediately follows the fade-out photography. In this case, the release operating member 151 is first released from its depressed condition, whereafter the fade button 152 is released from its depressed condition. Thus, by the operation fully described in connection with FIG. 16, the counter FCC1 starts counting and high-level signal is put out from the output terminal of the decoder FDC1. Therefore, the high-level signal is applied through the OR gates FOR1 and FOR2 to one input terminal of the AND gate FAND1. Also, the high-level signal from the output terminal 0 of the decoder FDC1 is applied through the OR gates FOR1, FOR5 and FOR7 to another input terminal of the AND gate FAND2, and high-level signal is applied to the other input terminal of the AND gate FAND2 through the inverter INAL1. Thus, the AND gate FAND2 puts out high-level signal and transmits it to one input terminal of the AND gate ANDAL6. Therefore, in the same manner as described with respect to the fade-out operation, high-level signal is put out from the AND gate ANDAL6 and the transistor Tr15 is turned on to rotate the motor 121 in the direction to widen the shutter opening angle. On the other hand, the high-level signal from the output terminal 0 of the decoder FDC1 is applied through the OR gate FOR to the transistor TrFI2, so that, as fully described with respect to FIG. 17D, the recording level restores its normal level in about 2.5 seconds. Also, when about 2.5 seconds passes after the starting of the counting operation of the counter FCC1, the counter FCC1 stops its counting operation by the operation fully described in connection with FIG. 16 while the high-level signal put out from the output terminal 0 of the decoder FDC1 disappears, thus stopping rotation of the motor 121. In this case, therefore, the shutter opening angle changes from its fully-closed condition to its fully-open condition in one-half of the time required for the fade-in, namely, 2.5 seconds, and the recording level restores the normal level. After the shutter opening angle and the recording level have restored their conditions for normal photography in this manner, the release operating member 151a is depressed, whereupon the switch SW2 is closed to execute the start sequence for normal photography by the aforementioned operation.

Description will now be made of the case where fade-in photography is effected after normal photography. In this case, after normal photography has been effected, the release switch SW3 is opened to execute the stop sequence and terminate the photographing operation. Thereafter, the fade button 152 is depressed. By this, the switch SW8 is closed and by the operation fully described in connection with FIG. 16, the counter FCC1 starts counting and the output terminal 4 of the decoder FDC1 puts out high-level signal. Thus, as fully described in connection with FIG. 16, high-level signal is put out from the AND gate FAND1 and transmitted to the base of the transistor Tr10 through the AND gate ANDAL5 and OR gate ORAL4. Therefore, the motor 121 rotates in the direction to narrow the shutter opening angle. On the other hand, the signal from the output terminal 4 of the decoder FDC1 is transmitted through the AND gate ANDAL2 to the inverter INFO2 and the recording level becomes zero in about 2.5 seconds as described in connection with FIG. 17D. Also, the counter FCC1 effects counting operation as in the above-described operation and, in about 2.5 seconds after the starting of the counting, it terminates its counting operation and the high-level signal from the output terminal 4 of the decoder FDC1 disappears, so that the motor 121 is stopped after having fully closed the shutter as already noted with respect to FIG. 17 and the recording level is retained at zero. Thereafter, the release button is depressed and the fade button 152 is released from its depressed condition, whereupon the fade-in operation takes place to execute fade-in photography and recording immediately after the normal photography.

Overlap operation will now be considered. Assume that simultaneous recording and photography of images and sounds is being effected in normal photography mode. In this condition, when the overlap operating button 140 is depressed, the switch SW5 is closed. By this, as fully described with respect to FIG. 28, high-level signal is put out from the AND gate ANDCL1 and transmitted to the base of the transistor Tr10 through the AND gate ORAL4 to rotate the motor 121 in the direction to narrow the shutter opening angle while, at the same time, high-level signal is applied to the OR gate ORAL2 through the NOR gate NOR1 and the output of the inverter INFO1 becomes low level to charge the capacitor OLCP1, thus gradually reducing the recording level as already noted. By this, fade-out photography and recording are executed and when 90 frames of the film has been fed after the starting of fade-out photography, the count by the counter CC2 reaches 90, thus setting the flip-flop REVFF, as already noted. Therefore, as fully described in connection with FIG. 28, fade-out is executed on the 90 frames of the film and the shutter becomes fully closed, whereupon the high-level signal applied to the D1 input terminal of the flip-flop FF1 through the AND gate FOA and the OR gate ORF1 disappears to execute the aforementioned stop sequence and terminate the photography and recording, and high-level signal is put out from the AND gate REVA to effect the aforementioned reversing operation. Thus, the film motor reverses its direction of rotation and rewinds 90 frames of the film, whereupon, as fully described in connection with FIG. 28, the flip-flop OLFF and REVFF are reset to put out high-level signal from their Q output terminals. Therefore, the film motor stops rotating to thereby terminate the rewind, and at the same time, the AND gate ANDF1 puts out high-level signal and applied it to the D1 input terminal of the flip-flop FF1 to execute the aforementioned start sequence and start the simultaneous recording and photography. At the same time therewith, the high-level signal from the AND gate ANDF1 is transmitted to the one shot circuit ONE through the AND gate ANDOP1 and pulse of short pulse width is put out from the one shot circuit and transmitted to the D input terminal of the flip-flop FEFF3 through the OR gate ORAL1. Thus, the flip-flops FDFF3 and FDFF4 are set and single pulse is put out from the exclusive or gate Fex2 to reset the flip-flops FDFF5. Since the pulse from the one shot circuit ONE is very short, the flip-flops FDFF3 and FDFF4 are reset immediately after they have been set, and again single pulse is put out from the exclusive or gate Fex2, whereupon this pulse resets the counter FCC1 through the OR gate FOR9. Thus, the counter FCC1 starts counting and low-level signal is applied to the D input terminal of the detector FDC1. Accordingly, high-level signal is applied only to the A input terminal of the decoder FDC1, so that the decoder FDC1 puts out high-level signal from its output terminal 1, and by the high-level signal from the output terminal of the decoder FDC1, fade-in photography is effected in the manner already described and normal photography is executed after termination of the fade-in photography. Thus, overlap photography is executed.

What we claim is:
1. A motion picture camera comprising:
 (a) a power source circuit;
 (b) a photographing operation control circuit for controlling a photographing operation including a film feeding operation;
 (c) a power source operating member;

(d) means for applying power from said power source circuit to said photographing operation control circuit, in response to the operation of said power source operating member, said control circuit assuming an operative state by the power application;

(e) trigger operation means, said photographing operation control circuit with the power applied thereto being operated in response to the operation of said trigger operation means;

(f) fade means for performing a fade-out operation for gradually decreasing, from a normal level, the quantity of light incident on the film, or a fade-in operation for gradually increasing, to the normal level, the quantity of the incident light;

(g) fade operating means, said fade means being operated in response to the operation of said fade operating means;

(h) a signal forming circuit for forming a power connection signal when power is applied to said photographic operation control circuit; and (i) a control circuit responsive only to the power connection signal to perform, independently of the operation of said fade operating means, the fade-in operation through said fade means.

2. A motion picture camera comprising:

(a) a circuit for controlling a photographic operation;

(b) manually operated trigger means for triggering said circuit;

(c) a switch which assumes a first state in response to the operation of said trigger means and a second state in response to the release of said trigger means, said circuit becoming operative when said switch assumes the first state to thereby start the photographing operation and becoming inoperative when said switch assumes the second state to thereby stop the photographing operation;

(d) fade means for performing a fade-out operation for gradually decreasing, from a normal level, the quantity of light to a film or a fade-in operation for gradually increasing the quantity of light;

(e) a manually operated fade operating member for operating said fade means;

(f) signal forming means for forming a return signal when said switch changes over from the first state to the second state; and (g) a control circuit responsive to the return signal to perform, independently of the operation of said fade operating member, the fade-in operation through said fade means.

3. A motion picture camera comprising:

(a) a circuit for controlling a photographing operation;

(b) manually operated trigger means for triggering said circuit;

(c) a switch which assumes a first state in response to the operation of said trigger means and a second state in response to the release of said trigger means, said circuit becomes operative when said switch assumes the first state to thereby start the photographing operation and becomes inoperative, when said switch assumes the second state to thereby stop the photographic operation;

(d) a sound recording circuit;

(e) an operating member for performing sound recording with fade effect;

(f) a level control circuit for controlling the sound recording level to perform sound recording with fade effect when said operating member is operated;

(g) signal forming means for forming a return signal when said switch changes over from the first state to the second state; and (h) a circuit responsive to the return signal to perform, independently of the operation of said operating member, the fade-in operation through said level control circuit.

4. A motion picture camera comprising:

(a) a shutter opening angle control motor;

(b) shutter opening angle control means operatively coupled to said motor for controlling the opening angle of the shutter;

(c) a motor control circuit connected to said motor, said circuit being responsive to an open signal to rotate said motor in a direction to widen the shutter opening angle and responsive to a close signal to rotate said motor in a direction to narrow the shutter opening angle;

(d) a power source;

(e) a main switch;

(f) a main switch operating member, said main switch being closed by the operation of said operating member;

(g) a power source connecting signal forming circuit for forming a power source connecting signal when said main switch is closed;

(h) a photographic circuit for performing a photographic operation including film feeding operation, said photographic circuit receiving power from said power source when said main switch is closed and assuming thereby an operative state;

(i) a trigger operation member, said photographing circuit with the power applied thereto from said power source starting its operation in response to the operation of said trigger operation member;

(j) a fade operating member for effecting fade-in and fade-out operations;

(k) a signal forming circuit for forming said open signal when said fade operating member is operated to effect the fade-in operation and for forming said close signal when said fade operating member is operated to effect the fade-out operation so that said motor control circuit controls the rotational direction of said motor in response to said open or close signal for performing the fade-in or fade-out operation; and (l) a circuit responsive to the power source connecting signal to produce an open signal; independently of the operation of said fade operating member, and applying the open signal to said motor control circuit.

5. A motion picture camera comprising:

(a) a power source;

(b) a circuit for controlling a photographing operation including sound recording circuit;

(c) a power source operating member for appplying power from said power source to said photographing circuit, said photographing circuit assuming an operative state when power is applied thereto from said power source;

(d) a trigger operation member, said photographing circuit operating in response to the operation of said trigger operation member to perform sound recording and image recording;

(e) an operating member for performing sound recording with fade effect;

(f) a signal forming circuit for forming a fade signal when said operating member is operated;

(g) a level control circuit for controlling the sound recording level in response to said fade signal to perform sound recording with fade effect when said photographing circuit is operated;

(h) a signal forming circuit for forming a power connection signal when the power from said source is applied to said photographing circuit by the operation of said power source operating member; and (i) a circuit responsive only to the power connection signal to supply, independently of the operation of said fade operating member, a signal to said level control circuit for returning the sound recording level to a normal level.

6. A sound recording circuit for a motion picture camera, comprising:

(a) a fade operating member for performing photographic with fade-out effect;

(b) a sound recording circuit;

(c) a level control circuit for controlling a sound recording level of said sound recording circuit, said level control circuit being adapted to decrease, in accordance with the operation of said fade operating member, the sound recording level so as to produce the fade-out effect;

(d) monitor means connected to said sound recording circuit to monitor the sound recording level;

(e) a detecting circuit for detecting the completion of fade-out photographing to produce a detection signal; and (f) a circuit responsive to said detection signal to automatically return the monitoring level of said monitor means to a level for normal photographic operation, independently of the operation of said operating member.

7. A motion picture camera comprising:

(a) a shutter opening angle control motor;

(b) shutter opening angle control means operatively coupled to said motor for controlling the opening angle of the shutter;

(c) a motor control circuit connected to said notor, said circuit being responsive to fade signal to drive said motor and effect fade operation;

(d) a fade operating member for effecting fade operation;

(e) a trigger operating member for effecting photographying operation;

(f) a detecting circuit for detecting the operating conditions of said trigger operating member and fade operating member, said detecting circuit producing a first signal when only said fade operating member is operated and producing a second signal when both said fade operating member and trigger operating member are operated;

(g) a timer circuit for effecting time counting operation, said timer circuit effecting, in response to said second signal, time counting operation for a predetermined period, and effecting, in response to said first signal, time counting operation for a period shorter than said predetermined period; and (h) a fade signal forming circuit for forming said fade signal for a period controlled by said timer circuit.

8. A motion picture camera according to claim 7, further comprising a sound recording circuit and a level control circuit for controlling the sound recording level, said level control circuit controlling in response to said fade signal the recording level as a function of time.

9. A motion picture camera, comprising:

(a) a power source circuit;

(b) rotatable shutter means having main and secondary shutter blade means forming an adjustable aperture;

(c) adjusting means for varying the relative position of said secondary shutter blade means to said main shutter blade means and varying said aperture from its fully closed condition to a predetermined maximum opening;

(d) driving means for driving said adjusting means, said driving means, having a motor operatively coupled with said adjusting means;

(e) a photographing operation control circuit for controlling the photographing operation;

(f) switch means for supplying power to said control circuit from said power source circuit;

(g) a power source connection signal generating circuit for generating a power source connection signal when power is supplied to said control circuit;

(h) fading operation means;

(i) a fading signal forming circuit responsive to said power source connection signal to form a first fade-in signal, said fading signal forming circuit forming a second fade-in signal when the fade-in operation has been designated by said fading operating means;

(j) a timer circuit responsive to said signal from said fading signal forming circuit and effecting time count for a predetermined time in response to said second fade-in signal and effecting time count for a time shorter than said predetermined time in response to said first fade-in signal; and (k) an open signal forming circuit for forming an open signal for driving said motor in a direction for said ajjusting means to open said aperture of said shutter means, said circuit putting out said open signal to said motor only when said timer circuit is counting.

10. A motion picture camera comprising:

(a) a shutter opening angle control means;

(b) driving means for driving said control means, said driving means being responsive to a close signal to drive said control means to narrow the shutter opening angle;

(c) a film motor for controlling a film feeding operation;

(d) an operating member for effecting a fade-out operation;

(e) a timer circuit operating in response to the operation of said operating member and generating a stop signal after time counting for a predetermined period;

(f) a close signal forming circuit operative to put out said close signal for a period controlled by said timer circuit;

(g) a film motor control circuit for stopping said film motor in response to said stop signal; and (h) detecting means for detecting the opening angle controlled by said shutter opening angle control means, said detecting means producing said stop signal independently of the operation of said timer circuit when the shutter opening angle is set to a fully closed condition.

11. A motion picture camera according to claim 10, further comprising a sound recording circuit including a recording level control circuit, said level control circuit decreasing the sound recording level as a function of the time controlled by said timer circuit.

12. A motion picture camera comprising:
(a) a film motor for controlling the film feeding operation, said motor being responsive to a reverse signal to rotate in a direction to rewind the film;
(b) a film feeding mechanism operatively coupled to said film motor;
(c) a shutter opening angle control motor responsive to an open signal to rotate in a direction to widening the shutter opening angle and responsive to a close signal to rotate in a direction to narrow the shutter opening angle;
(d) shutter opening angle control means operatively coupled to said shutter opening angle control motor;
(e) operating means for effecting overlap;
(f) pulse forming means for forming a number of pulses corresponding to the frames of the film fed by said film feeding mechanism;
(g) a counter for counting the pulses formed by said pulse forming means, said counter starting counting operation when said operating means has been operated and puts out a reverse signal when the count by said counter has reached a predetermined value, and counts the pulses generated by said pulse forming means when the film is rewound by said reverse signal and extinguishes said reverse signal when the count during the rewind of the film has become coincident with said count; and
(h) a close signal forming circuit for putting out a close signal when said operating means has been operated, said circuit putting out said close signal until said reverse signal is extinguished.

13. A motion picture camera according to claim 12, further comprising an open signal forming circuit connected to said counter circuit and putting out an open signal when said reverse signal has been extinguished.

14. A motion picture camera according to claim 13, further comprising a trigger operating member for forming a release signal for effecting photography, and transmission means responsive to said release signal to transmit said open signal to said shutter opening angle control motor.

15. A motion picture camera comprising:
(a) a trigger member;
(b) a sequence control circuit for putting out control signals in a sequence for starting photographying operation upon operation of said trigger member and for putting out control signals in a sequence for terminating the photographying operation upon release of said trigger member;
(c) a plurality of camera elements whose operation is controlled by the control signals from said sequence control circuit;
(d) fade operating means;
(e) a fade signal forming circuit for forming a fade signal upon operation of said fade operating means;
(f) a timer circuit operative in response to said fade signal;
(g) a fade-out signal forming circuit for forming a fade-out signal during the time controlled by said timer circuit;
(h) a fade-out motor operative in response to said fade-out signal, said motor being rotated by said fade-out signal in a direction to gradually decrease the quantity of incident light;
(i) fade control means operatively coupled to said motor, said means effecting fade-out operation by the rotation of said motor; and
(j) a stop signal forming circuit for detecting said fade-out signal and forming a stop signal upon extinction of the fade-out signal, said circuit being connected to said sequence control circuit which is responsive to the stop signal to put out a control signal for terminating said photographying operation.

16. A motion picture camera comprising:
(a) a photographing operation controlling circuit for effecting the control of photographing operation, said circuit including at least a film feeding motor;
(b) a trigger switch for rendering said photographing operation controlling circuit operative;
(c) pulse forming means for detecting the film feeding operation and forming a number of pulses corresponding to the number of film frames fed;
(d) signal forming means for forming overlap signal during overlap operation;
(e) a counter becoming operative in response to said overlap signal to count the pulses from said pulse forming means;
(f) a fade out signal forming circuit responsive to said overlap signal to put out a fade-out signal and detect the count of said counter and put out the fade-out signal until the count reaches a predetermined value;
(g) a stop signal forming circuit for detecting said fade-out signal and putting out a signal rendering said photographing operation control circuit inoperative when said fade-out signal has been extinguished;
(h) a reverse signal forming circuit for putting out a reverse signal when said fade-out signal has been extinguished, said circuit counts the count of said counter and putting out the reverse signal until said count reaches a predetermined value, said film motor being responsive to said reverse signal independently of the control by said photographing operation control circuit to rotate in a direction to rewind the film;
(i) a start signal forming circuit for putting out a signal for operating said photographing operation controlling circuit when said reverse signal has been extinguished; and
(j) a fade-out control circuit for effecting the control of fade-out operation in response to said fade-out signal.

17. A motion picture camera according to claim 16, wherein said photographing operation controlling circuit is responsive to the fade-out signal to be retained operative independently of said trigger switch.

18. A motion picture camera according to claim 16, wherein said start signal forming circuit generates an output signal when said trigger switch is in its triggered condition.

19. A motion picture camera according to claim 16, further comprising a fade-in signal forming circuit responsive to the signal from said start signal forming circuit to put out a fade-in signal, and a fade-in control circuit responsive to the fade-in signal to effect the control of the fade-in operation.

20. A motion picture camera according to claim 19, wherein said fade-in signal forming circuit puts out fade-in signal when said trigger switch is in its triggered condition.

21. In a motion picture camera having an aperture arranged to expose a film loaded therein, a device for adjusting the aperture opening angle, comprising:
   (a) a rotatable shutter shaft means including a main shaft, a secondary shaft and a coupling means having at least portions thereof overlapping and disposed concentrically;
   said secondary shaft being rotatively displaceable singly with respect to said main shaft, said main shaft and said secondary shaft being provided with cam means which contributes for said secondary shaft to be rotatively displaced singly with respect to said main shaft;
   said coupling means being slidable with respect to said main shaft and said secondary shaft and including:
   a pin slidably engaged with the cam means of each of said main shaft and said secondary shaft, said pin operatively coupling said main shaft and said secondary shaft so that these shafts are rotated together, said pin contributing for said secondary shaft to be rotatively displaced with respect to said main shaft in accordance with said cam means of said main shaft and said secondary shaft when said coupling means causes said main shaft to slide with respect to said secondary shaft;
   (b) a shutter means having a main shutter blade and a secondary shutter blade forming said aperture opening;
   said main shutter blade being operatively fixed with said main shaft;
   said secondary shutter blade being operatively fixed with said secondary shaft;
   (c) a first driving means for actuating said rotatable shutter shaft means, said first driving means including a motor operatively coupled with said shutter shaft means;
   (d) control means including;
   a rotatable hollow cylindrically shaped cam means having a cam provided on the peripheral surface thereof for controlling the amount of sliding movement of said coupling means; and
   a first connecting means operatively connecting said coupling means and said hollow cylindrically shaped cam means;
   (e) a second driving means for actuating said hollow cylindrically shaped cam means, said second driving means including:
   a motor disposed in said hollow cylindrically shaped cam means; and
   a second connecting means operatively connecting said motor and said hollow cylindrically shaped cam means.

22. A motion picture camera according to claim 21, wherein said shutter means continuously varies its aperture opening angle from a predetermined angle to a fully closed condition in accordance with the amount of rotation of said secondary shutter blade with respect to said main shaft.

23. A motion picture camera according to claim 21, wherein said shutter means is provided with a second secondary shutter blade means having one or more shutter blades, said second secondary shutter blade means being rotatably mounted on said rotatable shaft means between said main shutter blade and said secondary shutter blade means.

24. In a motion picture camera having an aperture arranged to expose a film loaded therein, a device for adjusting the aperture opening angle, comprising:
   (a) a rotatable shutter shaft means including a main shaft, a secondary shaft and a coupling means having at least portions thereof overlapping and disposed concentrically;
   said secondary shaft being rotatively displaceable with respect to said main shaft, said main shaft and said secondary shaft being provided with a cam means which contributes for said secondary shaft to be rotatively displaced singly with respect to said main shaft;
   said coupling means being slidable with respect to said main shaft and said secondary shaft and including:
   a pin slidably engaged with the cam means of each of said main shaft and said secondary shaft, said pin operatively coupling said main shaft and said secondary shaft so that these shafts are rotated together, said pin contributing for said secondary shaft to be rotatively displaced with respect to said main shaft in accordance with said cam means of said main shaft and said secondary shaft when said coupling means causes said main shaft to slide with respect to said secondary shaft;
   (b) a shutter means having a main shutter blade and a secondary shutter blade means forming said aperture opening;
   said main shutter blade being operatively fixed with said main shaft;
   said secondary shutter blade means having a first shutter blade operatively fixed with said secondary shaft, and at least one second shutter blade rotatively disposed between said main shutter blade and said first shutter blade and with respect to said main shaft and said secondary shaft, said second shutter blade and said first shutter blade being correlated such that said second shutter blade is rotated in response to said first shutter blade when said first shutter blade has been rotated for a predetermined amount or more;
   (c) a first driving means for actuating said rotatable shutter shaft means, said first driving means including a motor operatively coupled with said shutter shaft means;
   (d) control means including:
   a rotatable hollow cylindrically shaped cam means having a cam provided on the peripheral surface thereof for controlling the amount of sliding movement of said coupling means; and
   a first connecting means operatively connecting said coupling means and said hollow cylindrically shaped cam means;
   (e) a second driving means for actuating said hollow cylindrically shaped cam means, said second driving means including:
   a motor disposed in said hollow cylindrically shaped cam means; and
   a second connecting means operatively connecting said motor and said hollow cylindrically shaped cam means.

25. A fading mechanism in a motion picture camera, comprising:
   (a) a rotatable shutter means having a main shutter blade and a secondary shutter blade means;

(b) first driving means for actuating said shutter means, said first driving means including a motor operatively coupled with said shutter means;

(c) an adjusting means including a control means for varying the relative position of said secondary shutter blade means to said main shutter blade and varying said aperture from its fully closed condition to a predetermined maximum opening, and second driving means for actuating said control means, said second driving means having a motor operatively coupled with said control means;

(d) fading operating means including:

selection operating means for selectively effecting fade-out and fade-in operation;

a signal generating means for generating a signal of a predetermined period;

a counter responsive to the operation of said selection operating means to count said signal from said signal generating means and generate an output signal when its count has reached a predetermined value;

a fade signal forming circuit for forming a first digital code signal representing fade-out mode when fade-out operation has been designated by said selection operating means and for forming a second digital code signal representing fade-in mode when fade-in operation has been designated by said selection operating means;

a decoder having a first input terminal electrically connected to the output terminal of said fade signal forming circuit, second input terminal electrically connected to the output terminal of said counter, and an output terminal connected to the input terminal of said second driving means;

said decoder being responsive to said first digital code signal from said fade signal forming circuit to put out a fade-out signal from the output terminal thereof and apply the same to said second driving means and responsive to the output signal from said counter to stop the output of said fade-out signal;

said decoder being responsive to said second digital code signal from said fade-signal forming circuit to put out a fade-in signal from the output terminal thereof and apply the same to said second driving means and responsive to the output signal from said counter to stop the output of said fade-in signal.

26. A mechanism according to claim 25, wherein said fade signal forming circuit includes detection control means for detecting when said aperture of said shutter means has become fully closed by said adjusting means and when said aperture has become a maximum opening and for forming a stop signal for stopping the output of said digital code signal.

27. A motion picture camera comprising:

(a) film feed means for transporting a film loaded in said camera;

(b) first drive means for actuating said film feed means, said drive means having at least one reversible motor;

(c) shutter means for selectively exposing said film loaded in said camera, said shutter means having a first and a second shutter blade means forming an adjustable aperture for exposing said film therethrough;

(d) shutter opening angle varying means for varying the opening angle of said aperture of said shutter means;

(e) second drive means for actuating said shutter opening angle varying means, said second drive means having a motor;

(f) overlap photography operating means;

(g) pulse forming means for forming a number of pulses corresponding to the number of frames of the film transported by said film feed means;

(h) a counter circuit for counting said pulse signals formed by said pulse forming means, said counter circuit starting its counting operation when said overlap photography operating means has been operated, said counter circuit generating a reverse signal for rotating said motor of said first drive means in the negative direction when the count by said counter circuit has reached a predetermined value and counts pulses generated by said pulse forming means when said film is rewound by said reverse signal, and extinguishes said reverse signal when the count during the film rewind has become coincident with said count; and (i) a close signal forming circuit for putting out a close signal for operating said shutter opening angle varying means in a direction for said shutter opening angle varying means to close the opening angle of said aperture of said shutter means when overlap operating means has been operated.

28. A motion picture camera according to claim 27, further comprising an open signal forming circuit for putting out an open signal for operating said shutter opening angle varying means in a direction for said shutter opening angle varying means to open the opening angle of said aperture of said shutter means when said reverse signal from said close signal forming circuit has been extinguished.

29. A motion picture camera comprising:

(a) film feed means for transporting a film loaded in said camera;

(b) first drive means for actuating said film feed means, said drive means having at least one reversible motor;

(c) shutter means for selectively exposing said film loaded in said camera, said shutter means having a first and a second shutter blade means forming an adjustable aperture for exposing said film therethrough;

(d) shutter opening angle varying means for varying the opening angle of said aperture of said shutter means;

(e) second drive means for actuating said shutter opening angle varying means, said second drive means having a motor;

(f) overlap photography operating means;

(g) trigger operating means for controlling the start and stoppage of said camera;

(h) a trigger signal forming circuit responsive to said trigger operating means to put out a trigger signal;

(i) pulse forming means for forming a number of pulses corresponding to the number of frames of the film transported by said film feed means;

(j) a counter circuit for counting said pulse signals formed by said pulse forming means, said counter circuit starting its counting operation when said overlap photography operating means has been operated, said counter circuit generating a reverse signal for rotating said motor of said first drive means in the negative direction when the count by said counter circuit has reached a predetermined value and counts pulses generated by said pulse forming means when said film is rewound by said reverse signal, and extinguishes said reverse signal when the count during the film rewind has become coincident with said count;

(k) a close signal forming circuit for putting out a close signal for operating said shutter opening angle varying means in a direction for said shutter opening angle varying means to close the opening angle of said aperture of said shutter means when overlap operating means has been operated; and (l) a trigger circuit responsive to said close signal from said close signal forming circuit to put out said trigger signal until said close signal is extinguished, independently of said trigger signal forming circuit.

* * * * *

UNITED STATES PATENT AND TRADEMARK OFFICE
CERTIFICATE OF CORRECTION

PATENT NO. : 4,365,875                    Page 1 of 6

DATED : December 28, 1982

INVENTOR(S) : NORITSUGU HIRATA, ET AL.

It is certified that error appears in the above-identified patent and that said Letters Patent is hereby corrected as shown below:

```
On the Title Page, Abstract of Disclosure,
         line 4, "form" should read --from--;
         line 5, "on" should read --the--.

Column 1, line 45, delete "in" before "conventional".

Column 2, line 3, "nullifying" should read --nullify--;
         line 13, "or/and" should read --and/or--;
         line 15, "or/and" should read --and/or--;
         line 18, "Other" should read --Another--.

Column 3, line 37, "shown" should read --showing--;
         line 41, "shown" should read --showing--.

Column 4, line 23, "or/and" should read --and/or--;
         line 58, "cancell" should read --cancel--;
         line 61, "botton" should read --button--;
         line 62, "botton" should read --button--;
         line 62, insert --to-- after "is".

Column 5, line 2, "botton" should read --button--;
         line 19, "as in" should read --as is--;
         line 30, "th" should read --the--;
         line 37, "i3" should read --13--;
         line 44, insert --window-- after "display".

Column 6, line 8, insert --an-- before "unshown";
         line 32, "formation" should read --function--;
         line 34, "property" should read --properly--.
```

UNITED STATES PATENT AND TRADEMARK OFFICE
CERTIFICATE OF CORRECTION

PATENT NO. : 4,365,875  Page 2 of 6
DATED : December 28, 1982
INVENTOR(S) : NORITSUGU HIRATA, ET AL.

It is certified that error appears in the above-identified patent and that said Letters Patent is hereby corrected as shown below:

Column 8, line 10, "its" should read --it--;
        line 62, "rotately" should read --rotatably--;
        line 67, "linkel" should read --linked--.

Column 13, line 7, "70" should read --72--;
        line 67, "buttom" should read --bottom--; "three" should read --there--.

Column 14, line 3, "buttom" should read --bottom--;
        line 10, "worn" should read --worm--;
        line 17, "MSa" should read --Msa--.

Column 15, line 66, "74d" should read --73d--.

Column 16, line 38, delete "in" before "rotation".

Column 23, line 66, "or" should read --OR--.

Column 24, line 13, "or" should read --OR--;
        line 30, "or" should read --OR--;
        line 32, "or" should read --OR--;
        line 33, "or" should read --OR--.

Column 25, line 25, "others" should read --other--;
        line 43, delete "to" before "one".
        line 61, "TRAND1" should read --FRAND1--.

UNITED STATES PATENT AND TRADEMARK OFFICE
CERTIFICATE OF CORRECTION

PATENT NO. : 4,365,875          Page 3 of 6
DATED      : December 28, 1982
INVENTOR(S): NORITSUGU HIRATA, ET AL.

It is certified that error appears in the above-identified patent and that said Letters Patent is hereby corrected as shown below:

Column 27, line 28, "7K" should read --17lc--.

Column 28, line 54, "into between" should read --in between--.

Column 30, line 37, "TrF12" should read --TrFI2--;
          line 38, "TrF12" should read --TrFI2--.

Column 31, line 28, "gate" should read --gates--.

Column 32, line 34, "PCL2" should read --PCL1--.

Column 33, line 37, "or" should read --OR--;
          line 38, "or" should read --OR--.

Column 34, line 30, "it" should read --its--.

Column 35, line 55, "or" should read --OR--;
          line 57, "or" should read --OR--;
          line 59, "or" should read --OR--.

Column 36, line 6, "or" should read --OR--;
          line 34, "or" should read --OR--;
          line 36, "or" should read --OR--;
          line 50, "or" should read --OR--; before "low" insert --and--.

Column 38, line 50, "or" should read --OR--;
          line 52, "or" should read --OR--;
          line 68, "or" should read --OR--.

UNITED STATES PATENT AND TRADEMARK OFFICE
CERTIFICATE OF CORRECTION

PATENT NO. : 4,365,875  Page 4 of 6
DATED : December 28, 1982
INVENTOR(S) : NORITSUGU HIRATA, ET AL.

It is certified that error appears in the above-identified patent and that said Letters Patent is hereby corrected as shown below:

Column 39, line 2, "or" should read --OR--;
          line 3, "There upon" should read --Thereupon--;
          line 51, "and so, or" should read --or so, and--.

Column 40, line 27, "FAND1" should read --FRAND1--;
          line 39, "FAND1" should read --FRAND1--;
          line 62, "or" should read --OR--;
          line 68, "FDff6" should read --FDFF6--.

Column 41, line 28, delete "in" (first occurrence);
          line 35, "2048 and "512" should read --"2048" and "512"--;
          line 67, "where after" should read --whereafter--;
          "made" should read --mode--.

Column 42, line 16, "photographying" should read --photographing--;
          line 43, "fate" should read --gate--;
          line 44, "fate" should read --gate--;
          line 49, insert --be-- before "fully".

Column 43, line 31, "transistor" should read --resistor--.

Column 44, line 2, "eilminating" should read --eliminating--;
          line 55, "desiged" should read --designed--.

Column 45, line 34, "engergizing" should read --energizing--.

Column 46, line 29, "output" should read --out--.

Column 47, lines 61,62, "into between" should read --in between--;
          lines 62,63, "into between" should read --in between--.

UNITED STATES PATENT AND TRADEMARK OFFICE
CERTIFICATE OF CORRECTION

PATENT NO. : 4,365,875

DATED : December 28, 1982

INVENTOR(S) : NORITSUGU HIRATA, ET AL.

It is certified that error appears in the above-identified patent and that said Letters Patent is hereby corrected as shown below:

Column 49, line 39, "terminal" should read --terminate--.

Column 50, line 21, "level" should read --lever--.

Column 52, line 30, "coming" should read --counting--.

Column 53, line 66, "$\overline{Q}$" should read --$Q$--;
            line 67, "Q" should read --$\overline{\overline{Q}}$--.

Column 55, line 23, "frange" should read --flange--;
            line 39, "anble" should read --angle--.

Column 57, line 39, "descreasing" should read --decreasing--.

Column 58, lines 7,8, "inpedance" should read --impedance--.

Column 63, line 39, "fad-in" should read --fade-in--;
            line 56, "similar those" should read --similar to those--.

Column 64, line 3, "contact PS" should read --contacts PS--;
            line 42, "terminla" should read --terminal--.

Column 68, line 30, "flip-flop" should read --flip-flops--;
            line 31, "Q output" should read --$\overline{Q}$ output--;
            line 45, "or gate" should read --OR gate--;
            line 53, "detector" should read --decoder--.

Column 70, line 50, Claim 4, ";" should read --,--.

UNITED STATES PATENT AND TRADEMARK OFFICE
CERTIFICATE OF CORRECTION

PATENT NO. : 4,365,875

DATED : December 28, 1982

INVENTOR(S) : NORITSUGU HIRATA, ET AL.

It is certified that error appears in the above-identified patent and that said Letters Patent is hereby corrected as shown below:

Column 71, line 43, Claim 7, "notor" should read --motor--;
lines 48,49, Claim 7, "photographying" should read --photographing--.

Column 72, line 40, Claim 9, "ajjusting" should read --adjusting--.

Column 73, lines 13,14, Claim 11, "widening" should read --widen--;
line 51, Claim 15, "photographying" should read --photographing--;
line 54, Claim 15, "photographying" should read --photographing--.

Column 74, line 11, Claim 15, "photographying" should read --photographing--.

Signed and Sealed this

Eighteenth Day of September 1984

[SEAL]

Attest:

GERALD J. MOSSINGHOFF

Attesting Officer

Commissioner of Patents and Trademarks